（12）United States Patent
Yu et al.

(10) Patent No.: US 9,063,829 B2
(45) Date of Patent: Jun. 23, 2015

(54) ENERGY CONSERVATION SYSTEMS AND METHODS

(71) Applicant: Fuel Saving Technologies, LLC, Honolulu, HI (US)

(72) Inventors: Jeffrey N. Yu, Honolulu, HI (US); Gregory W. Davis, Frakenmuth, MI (US); Gwynn R. Williams, Castletown (IM)

(73) Assignee: FUEL SAVING TECHNOLOGIES, LLC, Honolulu, HI (US)

( * ) Notice: Subject to any disclaimer, the term of this patent is extended or adjusted under 35 U.S.C. 154(b) by 47 days.

(21) Appl. No.: 13/656,522

(22) Filed: Oct. 19, 2012

(65) Prior Publication Data

US 2013/0103238 A1    Apr. 25, 2013

Related U.S. Application Data

(60) Provisional application No. 61/549,163, filed on Oct. 19, 2011.

(51) Int. Cl.
*B60L 9/00* (2006.01)
*B60L 11/00* (2006.01)
(Continued)

(52) U.S. Cl.
CPC ............. *G06F 17/00* (2013.01); *B60W 10/06* (2013.01); *B60W 10/08* (2013.01); *B60W 20/108* (2013.01); *Y10S 903/93* (2013.01); *Y02T 10/6286* (2013.01); *B60W 50/10* (2013.01);
(Continued)

(58) Field of Classification Search
CPC ....... G06F 17/00; B60W 10/06; B60W 10/08; B60W 20/108; B60W 20/104; B60W 20/00; B60W 30/1882; B60W 20/1082; B60W 50/10; B60W 2540/10; B60W 2550/22; B60W 2550/402; Y10S 903/93; Y02T 10/6286
USPC .......................................................... 701/22
See application file for complete search history.

(56) References Cited

U.S. PATENT DOCUMENTS 4,062,419 A    12/1977    Kadota
4,078,631 A    3/1978    Kadota et al.
(Continued)

FOREIGN PATENT DOCUMENTS

CN          102144085 A      8/2011
DE    10 2004 017 115 A1 *  10/2005  ............ B60K 31/00
(Continued)

OTHER PUBLICATIONS

Kolmanovsky et al., "Coordinated Control of Lean Burn Gasoline Engines with Continuously Variable Transmissions", Proceedings of the Am. Control Conf., Jun. 1999.
(Continued)

*Primary Examiner* — Calvin Cheung
*Assistant Examiner* — Paula L Schneider
(74) *Attorney, Agent, or Firm* — Knobbe, Martens, Olson & Bear, LLP

(57) ABSTRACT

Methods and systems are described for conserving energy used by an energy consuming device. In certain embodiments, an energy conservation system can be configured to deliver energy to the energy consuming device for a period, followed by a period where energy delivery is dampened and/or cut. By cycling the delivery of energy in this fashion, the energy conservation can achieve a pulsed efficiency.

20 Claims, 37 Drawing Sheets

(51) Int. Cl.

| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B60W 10/06* | (2006.01) | |
| *B60W 10/08* | (2006.01) | |
| *B60W 20/00* | (2006.01) | |
| *B60W 50/10* | (2012.01) | |
| *B60W 30/188* | (2012.01) | |

(52) U.S. Cl.
CPC .......... *B60W 20/00* (2013.01); *B60W 30/1882* (2013.01); *B60W 2540/10* (2013.01); *B60W 2550/22* (2013.01); *B60W 2550/402* (2013.01); *B60W 20/1082* (2013.01); *B60W 20/104* (2013.01)

(56) References Cited

U.S. PATENT DOCUMENTS

| | | | |
|---|---|---|---|
| 4,408,293 A | | 10/1983 | Avins |
| 4,473,882 A | | 9/1984 | Suzuki et al. |
| 5,722,359 A | | 3/1998 | Chubachi et al. |
| 5,806,617 A | | 9/1998 | Yamaguchi |
| 5,832,400 A | * | 11/1998 | Takahashi et al. ............... 701/53 |
| 5,841,201 A | | 11/1998 | Tabata et al. |
| 5,842,534 A | | 12/1998 | Frank |
| 5,907,191 A | | 5/1999 | Sasaki et al. |
| 5,936,312 A | | 8/1999 | Koide et al. |
| 5,991,683 A | | 11/1999 | Takaoka et al. |
| 6,009,965 A | | 1/2000 | Takanohashi et al. |
| 6,016,457 A | | 1/2000 | Toukura et al. |
| 6,054,844 A | | 4/2000 | Frank |
| 6,087,734 A | | 7/2000 | Maeda et al. |
| 6,098,733 A | | 8/2000 | Ibaraki et al. |
| 6,314,359 B1 | | 11/2001 | Janic et al. |
| 6,401,022 B2 | | 6/2002 | Kubota et al. |
| 6,702,053 B2 | | 3/2004 | Nogi et al. |
| 6,745,747 B2 | | 6/2004 | Surnilla |
| 6,809,429 B1 | | 10/2004 | Frank |
| 6,902,021 B2 | | 6/2005 | Kikuchi et al. |
| 6,945,905 B2 | | 9/2005 | Tamai et al. |
| 6,991,052 B2 | | 1/2006 | Nogi et al. |
| 6,998,727 B2 | | 2/2006 | Gray |
| 7,237,634 B2 | | 7/2007 | Severinsky |
| 7,591,130 B2 | | 9/2009 | Ito |
| 7,983,830 B2 | | 7/2011 | Yu et al. |
| 8,214,122 B2 | | 7/2012 | Krupadanam et al. |
| 8,280,570 B2 | | 10/2012 | Masuda |
| 8,315,775 B2 | | 11/2012 | Biondo |
| 8,340,884 B1 | | 12/2012 | He et al. |
| 8,380,421 B2 | | 2/2013 | Yu et al. |
| 8,494,737 B2 | | 7/2013 | Maier et al. |
| 8,521,379 B2 | | 8/2013 | Wurthner et al. |
| 8,542,844 B2 | | 9/2013 | Bowden et al. |
| 8,639,430 B2 | | 1/2014 | Yu et al. |
| 2001/0037905 A1 | | 11/2001 | Nogi et al. |
| 2004/0084237 A1 | | 5/2004 | Petrie, Jr. |
| 2006/0100057 A1 | | 5/2006 | Severinsky et al. |
| 2006/0211446 A1 | * | 9/2006 | Wittmann et al. ......... 455/552.1 |
| 2007/0105689 A1 | | 5/2007 | Arai |
| 2007/0124046 A1 | * | 5/2007 | Ayoub et al. .................... 701/36 |
| 2008/0229226 A1 | | 9/2008 | Rowbottom et al. |
| 2009/0063007 A1 | * | 3/2009 | Masuda ........................ 701/102 |
| 2009/0118939 A1 | | 5/2009 | Heap et al. |
| 2009/0259354 A1 | | 10/2009 | Krupadanam et al. |
| 2010/0020572 A1 | * | 1/2010 | Hashimoto et al. ............. 363/37 |
| 2010/0204896 A1 | | 8/2010 | Biondo et al. |
| 2011/0125294 A1 | | 5/2011 | Yu et al. |
| 2011/0251780 A1 | | 10/2011 | Yu et al. |
| 2012/0215405 A1 | * | 8/2012 | Matsuno et al. ................. 701/36 |
| 2013/0211686 A1 | | 8/2013 | Shono et al. |
| 2013/0226420 A1 | | 8/2013 | Pedlar et al. |
| 2013/0345947 A1 | | 12/2013 | Yu et al. |
| 2014/0324320 A1 | | 10/2014 | Yu et al. |

FOREIGN PATENT DOCUMENTS

| | | |
|---|---|---|
| DE | 102004017115 | 10/2005 |
| EP | 2 315 929 | 5/2011 |
| EP | 2476572 | 7/2012 |
| JP | 2007-187090 | 7/2007 |
| JP | 2012-047148 | 3/2012 |
| KR | 10-2009-0118352 | 11/2009 |
| WO | WO 2007/092711 | 8/2007 |
| WO | WO 2010/003136 | 1/2010 |
| WO | WO 2013/059682 | 4/2013 |

OTHER PUBLICATIONS

Jeffrey N. Yu et al., U.S. Appl. No. 13/742,676, filed Jan. 16, 2013, Energy Conservation Systems and Methods.
Jeffrey N. Yu et al., U.S. Appl. No. 14/137,156, Dec. 20, 2013, Energy Conservation Systems and methods.
Supplementary European Search Report for European Application No. EP 096774585, dated May 27, 2013, by Frederic Granier.
International Search Report and Written Opinion for PCT application No. PCT/US2012/061146, mailed on Mar. 18, 2013, by Joong Sub Han.
International Preliminary Report on Patentability for Appln. No. PCT/US2012/061146, issued on Apr. 22, 2014.
International Search Report and Written Opinion PCT application PCT/US2009/049640, dated Aug. 27, 2009, in 8 pages.
International Preliminary Report on Patentability and Written Opinion for PCT application PCT/US2009/049640, dated Jan. 5, 2011, in 6 pages.

* cited by examiner

ENERGY CONSERVATION SYSTEMS AND METHODS

CROSS-REFERENCE TO RELATED APPLICATIONS

This application claims the benefit of U.S. Provisional Application No. 61/549,163, filed on Oct. 19, 2011. This application relates to U.S. patent application Ser. No. 12/986,128, entitled "Energy Conservation Systems and Methods," filed on Jan. 6, 2011, which claims benefit to U.S. Provisional Patent Application Ser. No. 61/292,823, entitled "Energy Conservation Systems and Methods," filed on Jan. 6, 2010, and which is a continuation-in-part of U.S. patent application Ser. No. 12/497,507, now U.S. Pat. No. 7,983,830, entitled "Fuel Conservation Systems and Methods," filed on Jul. 2, 2009, which claims the benefit of U.S. Provisional Patent Application Ser. No. 61/078,281, entitled "Fuel Conservation Systems and Methods," filed on Jul. 3, 2008; this application is also related to U.S. patent application Ser. No. 13/163,652, entitled "Fuel Conservation Systems and Methods," filed Jun. 17, 2011, which is a continuation of U.S. patent application Ser. No. 12/497,507, now U.S. Pat. No. 7,983,830, entitled "Fuel Conservation Systems and Methods," filed on Jul. 2, 2009, which claims the benefit of U.S. Provisional Patent Application Ser. No. 61/078,281, entitled "Fuel Conservation Systems and Methods," filed on Jul. 3, 2008. All of the foregoing applications are hereby incorporated herein by reference in their entirety for all purposes.

FIELD

The embodiments disclosed herein generally relate to energy-consuming devices and, in particular, to energy conservation systems and methods.

BACKGROUND

Energy, whether it be electricity, fossil fuels, or the like, allow for production and delivery of food and products worldwide. From cargo ships to diesel locomotives, tractor-trailers, and the everyday automobile, the world runs on combustible gas, and typically fossil fuel or other energy sources. As nations move toward securing prosperity for their people, as attempts are made for an increased standard of living, as machines of industry continue to produce articles of need and want, the market for oil steadily grows. Gasoline prices will continue to rise if demand depletes oil reserves. A rise in fuel costs comes with staggering consequences, including a corresponding rise in the cost to make and deliver food and products. Many rational observers argue that the safety, security, and well-being of entire generations hangs at a precipice of near-total reliance upon fossil fuels.

Internal combustion engines depend upon the availability of fossil fuels. The first internal combustion engine was perhaps contemplated by Al-Jazari in 1206. In *The Book of Knowledge of Ingenious Mechanical Devices*, he described a reciprocating pump and crankshaft device. Leonardo da Vinci described a compressionless engine in the 16th century. A patent for an internal combustion engine for industrial applications was granted to Samuel Brown in 1823. A modern search of patents and patent applications reveals a proliferation of interest in the field of internal combustion engines, yet another metric useful for describing the demands that are pressing in from all sides, causing the price of gas to reach astronomical heights.

SUMMARY

In accordance with certain embodiments, an energy conservation system and method for devices or energy consuming devices is provided. In some embodiments, the energy may comprise fuel. In some embodiments, the device or energy consuming device may comprise an engine such as an internal combustion engine. In certain embodiments the energy conservation system and method may apply to a cruise control module, a programmable logic controller, and/or a device control unit. Certain embodiments may dampen and/or cut energy delivery to a device or an energy consuming device. In certain embodiments an electric motor may substantially maintain a horsepower or torque output of an internal combustion engine when reducing, moderating, tapering, oscillating, cycling, cutting and/or dampening energy delivery to a device or an energy consuming device. Certain embodiments may be selectively tunable, and may include a feedback loop to display information relative to the possibility of and/or achievement of energy savings. Certain embodiments of the inventions may include a user-selectable override, causing the device or energy consuming device to make available, on demand from a user, the greatest amount of output power possible from the device.

In a certain embodiment, a method is provided for conserving energy used by a device. The method includes receiving as an input to a device power module a first function comprising a user-specified power output of a device over a time duration. In certain embodiments, the input may come from an accelerator pedal or throttle position. In certain embodiments, the time duration may be instantaneous. The method includes processing the first function into a second function comprising a directive power output of the device over the time duration. The second function has at least one region of equal or increased device power output relative to the user-specified device power output, and the second function also has at least one region of decreased device power output relative to the user-specified device power output, so that, if the device outputs power equal to the directive power output of the device over the time duration, the device consumes less energy than the device would have consumed if the device outputted power equal to the user-specified power output of the device over the time duration. The method includes outputting, to a device control module, the second function, such that the device outputs power according to the directive power output of the device over the time duration.

In a certain embodiment, the method includes displaying to a user an indication of a possibility or achievement of energy savings by the device if the device outputs power according to the directive power output of the device. In a certain embodiment, the method includes providing an actuator that permits the user to override the energy savings. In a certain embodiment, the method includes the aspect of the input to the device power module including a cruise-control setting by a user. In a certain embodiment, the method includes the aspect of the user-specified power output of the device being based on a cruise-control setting by a user. In a certain embodiment, the method includes supplementing an output of the device with output generated by an electric motor while the device outputs power according to the directive power output of the device. In a certain embodiment, the method includes supplementing a power output of the device with power from an electric motor while the device outputs power according to the directive power output of the device. In a certain embodiment, the method includes processing the second function for smoothness. In a certain embodiment, the method includes supplementing a power output of the device with power from a motor different from the device while the device outputs power according to the directive power output of the device. In a certain embodiment, the processing of the first function into the second function includes application of a transform T, such that $F_2(n)=T\ F_1(n)$, where $F_2$ is the second function; $F_1$ is the first function; n is an ordered index number of an nth discrete sample, where $n \in \{0, 1, 2, \ldots \infty\}$; and wherein T comprises $(ke^{-2\pi i \Omega(n-d)}-Z)$, where k is a constant; e is an exponential; i is the imaginary number $\sqrt{-1}$; $\Omega$ is a frequency of cycles per sample interval (e.g., the time interval between the nth and the n+1th sample); Z is a constant; and d is a delay constant.

In a certain embodiment, a device control system includes means for receiving, as an input, a first function comprising a user-specified power output of a device over a time duration. In some embodiments, the system includes means for processing the first function into a second function comprising a directive power output of the device over the time duration. The system includes the second function having at least one region of equal or increased device power output relative to the user-specified device power output, and at least one region of decreased device power output relative to the user-specified device power output, such that, if the device outputs power equal to the directive power output of the device over the time duration, the device consumes less energy than the device would have consumed if the device outputted power equal to the user-specified power output of the device over the time duration. The system includes means for outputting, to a device control module, the second function, such that the device outputs power according to the directive power output of the device over the time duration.

In a certain embodiment, the system includes means for informing the user of a possibility or achievement of energy saving by the device if the device outputs power according to the directive power output of the device. In a certain embodiment, the system includes means for supplementing an output of the device with output generated by a motor different from the device during outputting of the second function. In a certain embodiment, the motor comprises an electric motor. In a certain embodiment, the system includes the aspect that the input comprises a cruise-control setting by a user. In a certain embodiment, the system includes the aspect that the user-specified power output of the device is based on a cruise-control setting by a user. In a certain embodiment, the system includes means for outputting the second function for a duration of time greater than a duration of time that the input is input to the means for receiving. In a certain embodiment, the system includes means for processing the second function for smoothness. In a certain embodiment, the system includes means for supplementing an output of the device with output generated by a motor different from the device during outputting of the second function. In a certain embodiment the system includes an electric motor. In a certain embodiment, the means for processing the first function into the second function comprises application of a transform T, such that $F_2(n)=T\ F_1(n)$, where $F_2$ is the second function; $F_1$ is the first function; and n is an ordered index number of an nth discrete sample, where $n \in \{0, 1, 2, \ldots \infty\}$; and wherein T comprises $(ke^{-2\pi i \Omega(n-d)}-Z)$, where k is a constant; e is an exponential; i is the imaginary number $\sqrt{-1}$; $\Omega$ is a frequency in cycles per sample interval; Z is a constant; and d is a delay constant.

In a certain embodiment, a device control system includes a processing module that couples to a device, the processing module configured to receive a first function comprising a user-specified power output of the device over a time duration, and to process the first function into a second function comprising a directive power output of the device over the time duration. The second function has at least one region of equal or increased device power output and at least one region of decreased device power output, relative to the user-specified device power output, such that, if the device outputs power equal to the directive power output of the device over the time duration, the device consumes less energy than the device would have consumed if the device outputted power equal to the user-specified power output of the device over the time duration. The system includes providing the second function to a device control module, such that the device outputs power according to the directive power output of the device over the time duration.

In a certain embodiment, the system includes an information module configured to inform a user of a possibility or achievement of energy saving by the device if the device outputs power according to the directive power output of the device. In a certain embodiment, the system includes an override switch configured to allow a user to select an override of the energy savings. In a certain embodiment, the system includes the aspect that the user-specified power output of the device is based on a cruise-control setting by a user. In a certain embodiment, the system includes the aspect that the second function is processed for smoothness. In a certain embodiment, the system includes a generator that supplements an output of the device. In a certain embodiment, the generator comprises an electrical generator. In a certain embodiment, the generator comprises a motor. In a certain embodiment, the processing the first function into the second function includes application of a transform T, such that $F2(n)=T\ F1(n)$, where F2 is the second function; F1 is the first function; and n is an ordered index number of an nth discrete sample, where $n \in \{0, 1, 2, \ldots \infty\}$; and wherein T comprises $(ke^{-2\pi i \Omega(n-d)}-Z)$, where k is a constant; e is an exponential; i is the imaginary number $\sqrt{-1}$; $\Omega$ is a frequency in cycles per sample interval; Z is a constant; and d is a delay constant.

In a certain embodiment, a method is provided for conserving energy used by a device. The method includes receiving as an input to a device power module a first function comprising a user-specified power output of a device over a time duration. The method includes using a computer-executable instruction to process the first function into a second function comprising a directive power output of the device over the time duration. The second function has at least one region of equal or increased device power output relative to the user-specified device power output, and the second function also has at least one region of decreased device power output relative to the user-specified device power output, so that, if the device outputs power equal to the directive power output of the device over the time duration, the device consumes less energy than the device would have consumed if the device outputted power equal to the user-specified power output of the device over the time duration. The method includes outputting, to a device control module, the second function, such that the device outputs power according to the directive power output of the device over the time duration.

In a certain embodiment, a device control system includes a processing module that couples to a device, the processing module configured to receive a first function comprising a user-specified power output of the device over a time duration, and uses a computer-executable instruction to process the first function into a second function comprising a directive power output of the device over the time duration. The second function has at least one region of equal or increased device power output and at least one region of decreased device power output, relative to the user-specified device power output, such that, if the device outputs power equal to the directive power output of the device over the time duration, the device consumes less energy than the device would have consumed if the device outputted power equal to the user-specified power output of the device over the time duration. The system includes providing the second function to a device control module, such that the device outputs power according to the directive power output of the device over the time duration.

According to certain embodiments, a method of conserving energy used by a device is provided. The method comprises receiving as an input to an energy controller a first function comprising a first work output of a device over a time period. The method also comprises processing, by a processor, the first function into a second function comprising a second work output of the device over the time period. The second function has at least one region of equal or increased work output relative to the first work output. The second function has at least one region of decreased work output relative to the first work output. In some embodiments, when the device outputs work equal to the second work output over the time period, the device consumes less energy than the device would consume if the device outputted work equal to the first work output over the time period. In some embodiments, the device performs substantially the same amount of work under the second work output over the time period as the device would perform under the first work output over the time period. The method also comprises directing the device to output work according to the second work output over the time period.

According to certain embodiments, the method comprises displaying to a user an indication of a possibility or achievement of energy savings by the device if the device outputs work according to the second work output. In some embodiments, the method comprises supplementing an output of the device with output generated by a generator while the device outputs work according to the second work output. In some embodiments, the method comprises supplementing a work output of the device with work from a second device different from the device while the device outputs work according to the second work output. In some embodiments, the method comprises processing the second function for smoothness.

According to certain embodiments, the device comprises at least one of a display screen, a computer, an electronic device, an appliance, an air conditioning system, a heating system, a pump system, and a light emitter. In some embodiments, the second work output oscillates during the time period.

According to certain embodiments, the processing of the first function into the second function comprises application of a transform T, such that $F_2(n)=T\,F_1(n)$, where $F_2$ is the second function, $F_1$ is the first function, and n is an ordered index number of an nth discrete sample, where $n \in \{0, 1, 2, \ldots \infty\}$. T comprises $ke^{-2\pi i \Omega(n-d)}-Z$, where k is a scalar, e is an exponential, i is the imaginary number $\sqrt{-1}$, $\Omega$ is a frequency in cycles per sample interval, Z is a scalar, and d is a delay scalar.

According to certain embodiments, the processing of the first function into the second function comprises application of a transform T, such that $F_2(n)=T+F_1(n)$, where $F_2$ is the second function, $F_1$ is the first function, and n is an ordered index number of an nth discrete sample, where $n \in \{0, 1, 2, \ldots \infty\}$. T comprises $$\frac{a_0}{2} + \sum_{j=1}^{\infty} [a_j \cos(j2\pi\Omega n) + b_j \sin(j2\pi\Omega n)],$$

where j is an ordered index number, where $j \in \{1, 2, \ldots \infty\}$; $a_0$ is a real number; $a_j$ is a series of real numbers; $b_j$ is a series of real numbers; and $\Omega$ is a frequency in cycles per sample interval.

In some embodiments, the processing of the first function into the second function comprises application of a transform T, such that $F_2(n)=T+F_1(n)$, where $F_2$ is the second function, $F_1$ is the first function, and n is an ordered index number of an nth discrete sample, where $n \in \{0, 1, 2, \ldots \infty\}$. T comprises $$\begin{cases} q, & \text{when } n = s_1 \\ r, & \text{when } n = s_2, \end{cases}$$

where q is a scalar, r is a scalar different from q, $s_1$ is a first set of samples of n, and $s_2$ is a second set of samples of n different from $s_1$. In some embodiments, the weighted average of $F_2(n)$ over $s_1+s_2$ is approximately equal to the weighted average of $F_1(n)$ over $s_1+s_2$. In some embodiments, members of the first set of samples alternate with members of the second set of samples. In some embodiments, q is greater than or equal to 0 and r is less than 0. In some embodiments, q is greater than 0 and r is less than or equal to 0. In some embodiments, q is greater than 0 and r is less than 0.

According to certain embodiments, a control system comprises a processing module that couples to a device. The processing module is configured to receive a first function comprising a first work output of the device over a time period. The processing module is also configured to process the first function into a second function comprising a second work output of the device over the time period. The second function has at least one region of equal or increased work output and at least one region of decreased work output, relative to the first work output. In some embodiments, when the device outputs work equal to the second work output over the time period, the device consumes less energy than the device would have consumed if the device outputted work equal to the first work output over the time period. In some embodiments, the device performs substantially the same amount of work under the second work output over the time period as the device would perform under the first work output over the time period. The processing module is also configured to output the second function such that the device outputs work according to the second work output over the time period.

In some embodiments, the control system further comprises an information module configured to inform a user of a possibility or achievement of energy savings by the device if the device outputs work according to the second work output. In some embodiments, the control system further comprises an override switch configured to allow a user to select an override of the energy savings. In some embodiments, the control system further comprises a generator that supplements an output of the device.

According to certain embodiments, the second function is processed for smoothness. In some embodiments, the device comprises at least one of a display screen, a computer, an electronic device, an appliance, an air conditioning system, a heating system, a pump system, and a light emitter. In some embodiments, the second work output oscillates during the time period.

According to certain embodiments, the processing of the first function into the second function comprises application of a transform T, such that $F_2(n)=T\,F_1(n)$, where $F_2$ is the second function, $F_1$ is the first function, and n is an ordered index number of an nth discrete sample, where $n \in \{0, 1, 2, \ldots \infty\}$. T comprises $ke^{-2\pi i \Omega(n-d)}-Z$, where k is a scalar, e is an exponential, i is the imaginary number $\sqrt{-1}$, $\Omega$ is a frequency in cycles per sample interval, Z is a scalar, and d is a delay scalar.

According to certain embodiments, the processing of the first function into the second function comprises application of a transform T, such that $F_2(n)=T+F_1(n)$, where $F_2$ is the second function, $F_1$ is the first function, and n is an ordered index number of an nth discrete sample, where $n\epsilon\{0, 1, 2, \ldots \infty\}$. T comprises $$\frac{a_0}{2} + \sum_{j=1}^{\infty} [a_j\cos(j2\pi\Omega n) + b_j\sin(j2\pi\Omega n)],$$

where j is an ordered index number, where $j\epsilon\{1, 2, \ldots \infty\}$; $a_0$ is a real number; $a_j$ is a series of real numbers; $b_j$ is a series of real numbers; and $\Omega$ is a frequency in cycles per sample interval.

In some embodiments, the processing of the first function into the second function comprises application of a transform T, such that $F_2(n)=T+F_1(n)$, where $F_2$ is the second function, $F_1$ is the first function, and n is an ordered index number of an nth discrete sample, where $n\epsilon\{0, 1, 2, \ldots \infty\}$. T comprises $$\begin{cases} q, \text{ when } n = s_1 \\ r, \text{ when } n = s_2 \end{cases},$$

where q is a scalar, r is a scalar different from q, $s_1$ is a first set of samples of n, and $s_2$ is a second set of samples of n different from $s_1$. In some embodiments, the weighted average of $F_2(n)$ over $s_1+s_2$ is approximately equal to the weighted average of $F_1(n)$ over $s_1+s_2$. In some embodiments, members of the first set of samples alternate with members of the second set of samples. In some embodiments, q is greater than or equal to 0 and r is less than 0. In some embodiments, q is greater than 0 and r is less than or equal to 0. In some embodiments, q is greater than 0 and r is less than 0.

According to certain embodiments, a control system comprises means for receiving as an input to an energy controller a first function comprising a first work output of a device over a time period. The control system also comprises means for processing the first function into a second function comprising a second work output of the device over the time period. The second function has at least one region of equal or increased work output relative to the first work output. The second function has at least one region of decreased work output relative to the first work output. In some embodiments, when the device outputs work equal to the second work output over the time period, the device consumes less energy than the device would consume if the device outputted work equal to the first work output over the time period. In some embodiments, the device performs substantially the same amount of work under the second work output over the time period as the device would perform under the first work output over the time period. The control system also comprises means for directing the device to output work according to the second work output over the time period.

According to certain embodiments, a method, of conserving energy used by a device, is provided. The method comprises receiving as an input to an energy controller a first function comprising a first work output of a device over a time period. The method also comprises using a computer-executable instruction, processing the first function into a second function comprising a second work output of the device over the time period. The second function has at least one region of equal or increased work output relative to the first work output. The second function has at least one region of decreased work output relative to the first work output. In some embodiments, when the device outputs work equal to the second work output over the time period, the device consumes less energy than the device would have consumed if the device outputted work equal to the first work output over the time period. In some embodiments, the device performs substantially the same amount of work under the second work output over the time period as the device would perform under the first work output over the time period. The method also comprises directing the device to output work according to the second work output over the time period.

In some embodiments, a fuel efficiency engine control system for a vehicle comprises an input module configured to access from an accelerator pedal position sensor a first function corresponding to a user-specified power output of an engine of the vehicle over a time duration. The fuel efficiency engine control system further can further comprise a global positioning system module configured to determine a geographical location of the vehicle. The fuel efficiency engine control system can further comprise an engine power control module in communication with the input module, the global positioning system module, and an engine control unit. The engine power control module can be configured to transmit a second function corresponding to a directive power output of the engine over the time duration to the engine control unit for controlling engine power output according to the directive power output of the engine over the time duration. The second function can correspond to an oscillating directive power output of the engine over the time duration based on the global positioning system module detecting a first geographic location of the vehicle. The second function can include a plurality of regions of equal or increased engine power output relative to the user-specified power output of the engine over the time duration and a plurality of regions of decreased engine power output relative to the user-specified power output of the engine over the time duration. The second function can correspond to the user-specified power output of the engine over the time duration based on the global positioning system detecting a second geographic location of the vehicle. The fuel efficiency engine control system can include an electronic memory configured to store modules and a computer processor configured to execute the modules.

In some embodiments, the first geographic location of the vehicle comprises a highway. The highway can include driving speeds of the vehicle being greater than about 30 to about 50 miles per hour. In some embodiments, the second geographic location of the vehicle comprises a city road. The city road can include driving speeds of the vehicle being less than or equal to about 20 to about 40 miles per hour. The city road can include a number of at least one of stoplights or stop signs is greater than a threshold S per mile. The threshold S can be about 0.5 to about 10 of at least one of stoplights or stop signs. In some embodiments, the second function corresponds to the user-specified power output of the engine over the time duration based on the global positioning system module detecting the first geographic location of the vehicle and the engine power control module detecting a congested driving pattern. The congested driving pattern can include the vehicle stopping more than once per a traveled distance X. The traveled distance X can be about 25 to about 100 yards. The congested driving pattern can include driving speeds of the vehicle being less than or equal to about 20 to about 40 miles per hour. In some embodiments, the global positioning system module is configured to receive real-time traffic information. The second function can correspond to the user-specified power output of the engine over the time duration based on the global positioning system module detecting the first geographic location of the vehicle and detecting a congested road based on the real-time traffic information. The congested road can correspond to the vehicle stopping more than once per a traveled distance X. The traveled distance X can be about 25 to about 100 yards. The congested road can correspond to driving speeds of the vehicle being less than or equal to about 20 to about 40 miles per hour. In some embodiments, the first geographic location of the vehicle comprises a road being traveled on by the vehicle with an incline gradient less than or equal to about $Z_i$. The second geographic location of the vehicle can comprise a road being traveled on by the vehicle with an incline gradient greater than about $Z_i$. The incline gradient $Z_i$ can be about 1 to about 60 degrees. In some embodiments, first geographic location of the vehicle comprises a road being traveled on by the vehicle with a decline gradient less than or equal to about $Z_d$. In some embodiments, the second geographic location of the vehicle comprises a road being traveled on by the vehicle with a decline gradient greater than about $Z_d$. The decline gradient $Z_d$ can be about 1 to about 60 degrees. In some embodiments, the global positioning system module includes a topographical database. The global positioning system module can be configured to detect an upcoming gradient of a road being traveled on by the vehicle. The first geographic location of the vehicle can comprise the upcoming gradient of the road being an incline gradient of less than or equal to about $Z_i$. The second geographic location of the vehicle can comprise the upcoming gradient of the road being an incline gradient greater than about $Z_i$ and a geographic location of a start point of the upcoming gradient being less than a distance U from the geographical location of the vehicle. The incline gradient $Z_i$ can be about 1 to 60 degrees. The first geographic location of the vehicle can comprise the upcoming gradient of the road being a decline gradient of less than or equal to about $Z_d$. In some embodiments, the second geographic location of the vehicle comprises the upcoming gradient of the road being a decline gradient greater than about $Z_d$ and a geographic location of a start point of the upcoming gradient being less than a distance U from the geographical location of the vehicle. The decline gradient $Z_d$ can be about 1 to 60 degrees. In some embodiments, the global positioning system module is configured to store gradient information of a road being traveled on by the vehicle based on the geographic location. In some embodiments, the global positioning system module is configured to determine between the first geographic location of the vehicle and the second geographic location of the vehicle based on the stored gradient information and the geographic location of the vehicle. The first geographic location of the vehicle can comprise an incline gradient of the road being less than or equal to about $Z_i$. The second geographic location of the vehicle can comprise an incline gradient of the road being greater than about $Z_i$. The decline gradient $Z_i$ can be about 1 to 60 degrees. The first geographic location of the vehicle can comprise a decline gradient of the road being less than or equal to about $Z_d$. The second geographic location of the vehicle can comprise a decline gradient of the road being greater than about $Z_d$. The decline gradient $Z_d$ can be about 1 to 60 degrees. The first geographic location of the vehicle can comprise an upcoming gradient of the road being an incline gradient of less than or equal to about $Z_i$. The second geographic location of the vehicle can comprise an upcoming gradient of the road being an incline gradient greater than about $Z_i$ and a geographic location of a start point of the upcoming gradient being less than a distance U from the geographical location of the vehicle. The decline gradient $Z_i$ can be about 1 to 60 degrees. The first geographic location of the vehicle can comprise an upcoming gradient of the road being a decline gradient of less than or equal to about $Z_d$. The second geographic location of the vehicle can comprise the upcoming gradient of the road being a decline gradient greater than about $Z_d$ and a geographic location of a start point of the upcoming gradient being less than a distance U from the geographical location of the vehicle. The decline gradient $Z_d$ can be about 1 to 60 degrees. In some embodiments, the second function corresponds to the user-specified power output of the engine over the time duration when the global positioning system module cannot detect the geographic location of the vehicle. The global positioning system module can be configured to receive a satellite signal. The global positioning system module might not be able to detect the geographic location of the vehicle when the global positioning system module is not receiving the satellite signal. Software stored on the electronic memory of fuel efficiency engine control system can be updated. The software update can download using a satellite connection of the global positioning system. The software update can be downloaded using at least one of Ethernet, Wi-Fi, or cellular data network. In some embodiments, the engine power control module activates a kill switch based on the global positioning system module detecting the second geographical location.

In some embodiments, a fuel efficiency engine control system for a vehicle comprises an input module configured to access from an accelerator pedal position sensor a first function corresponding to a user-specified power output of an engine of the vehicle over a time duration. The fuel efficiency engine control system can further comprise a level sensor module configured to determine a gradient of a road being traveled on by the vehicle. The fuel efficiency engine control system can further comprise an engine power control module in communication with the input module, the level sensor module, and an engine control unit. The engine power control module can be configured to transmit a second function corresponding to a directive power output of the engine over the time duration to the engine control unit for controlling engine power output according to the directive power output of the engine over the time duration. The second function can correspond to an oscillating directive power output of the engine over the time duration based on the level sensor module detecting a first gradient of the road. The second function can include a plurality of regions of equal or increased engine power output relative to the user-specified power output of the engine over the time duration and a plurality of regions of decreased engine power output relative to the user-specified power output of the engine over the time duration. The second function can correspond to the user-specified power output of the engine based over the time duration on the level sensor module detecting a second gradient of the road. The fuel efficiency engine control system can include an electronic memory configured to store modules and a computer processor configured to execute the modules.

In some embodiments, the first gradient of the road comprises a road being traveled on by the vehicle with an incline gradient less than or equal to about $Z_i$. The second gradient of the road can comprise a road being traveled on by the vehicle with an incline gradient greater than about $Z_i$. The incline gradient $Z_i$ can be about 1 to 60 degrees. In some embodiments, the first gradient of the road comprises a road being traveled on by the vehicle with a decline gradient less than or equal to about $Z_d$. The second gradient of the road can comprise a road being traveled on by the vehicle with a decline gradient greater than about $Z_d$. The decline gradient $Z_d$ can be about 1 to 60 degrees. In some embodiments, the engine power control module can activate a kill switch based on detecting the second gradient of the road.

In some embodiments, a fuel efficiency engine control system for a vehicle comprises an input module configured to access from an accelerator pedal position sensor a first function corresponding to a user-specified power output of an engine of the vehicle over a time duration. The fuel efficiency engine control system can further comprise an object sensor module configured to determine a position and a change in position of a nearby object relative to the vehicle. The fuel efficiency engine control system can further comprise an engine power control module in communication with the input module, the object sensor module, and an engine control unit. The engine power control module can be configured to transmit a second function corresponding to a directive power output of the engine over the time duration to the engine control unit for controlling engine power output according to the directive power output of the engine over the time duration. The second function can correspond to an oscillating directive power output of the engine over the time duration based on the object sensor module detecting a first position and a first change in position relative to the vehicle. The second function can include a plurality of regions of equal or increased engine power output relative to the user-specified power output of the engine over the time duration and a plurality of regions of decreased engine power output relative to the user-specified power output of the engine over the time duration. The second function can correspond to the user-specified power output of the engine over the time duration based on the object sensor module detecting at least one of a second position relative to the vehicle or a second change in position relative to the vehicle. The fuel efficiency engine control system can include an electronic memory configured to store modules and a computer processor configured to execute the modules.

In some embodiments, the object sensor module is in communication with vehicle sensors configured to detect the position and the change in position of the nearby object relative to the vehicle. The vehicle sensors can comprise at least one of a radar, a LIDAR, or a camera. The radar can be configured to have a narrow-width and long-distance working range to detect the position and the change in position of the nearby object relative to the vehicle. The LIDAR can be configured to have a wide-width and short-distance working range to detect the position and the change in position of the nearby object relative to the vehicle. The camera can be configured to determine a stationary object from a mobile object. In some embodiments, the first position of the nearby object comprises a distance greater than or equal to about X from the vehicle. The second position of the nearby object can comprise a distance less than about X from the vehicle. The distance X can be about 5 to about 100 feet when the vehicle is an automobile. The distance X can be about 30 to about 2,000 feet when the vehicle is an airplane. In some embodiments, the first change in position of the nearby object comprises a change in position less than or equal to about Y relative the vehicle. The second change of the nearby object in position can comprise a change in position less than or equal to about Y relative the vehicle. The change in position Y can be about 0.3 to about 200 feet per second when the vehicle is an automobile. The change in position Y can be about 30 to about 3,000 feet per second when the vehicle is an airplane. In some embodiments, the engine power control module activates a kill switch based on detecting the second position or the second change in position.

In some embodiments, a fuel efficiency engine control system for a vehicle comprises an input module configured to access from an accelerator pedal position sensor a first function corresponding to a user-specified power output of an engine of the vehicle over a time duration. The fuel efficiency engine control system can further comprise a vehicle sensor module configured to determine a cruise parameter of the vehicle. The fuel efficiency engine control system can further comprise an engine power control module in communication with the input module, the vehicle sensor module, and an engine control unit. The engine power control module can be configured to transmit a second function corresponding to a directive power output of the engine over the time duration to the engine control unit for controlling engine power output according to the directive power output of the engine over the time duration. The second function can correspond to an oscillating directive power output of the engine over the time duration based on the vehicle sensor module detecting a first cruise parameter. The second function can include a plurality of regions of equal or increased engine power output relative to the user-specified power output of the engine over the time duration and a plurality of regions of decreased engine power output relative to the user-specified power output of the engine over the time duration. The second function can correspond to the user-specified power output of the engine over the time duration based on the vehicle sensor module detecting a second cruise parameter. The fuel efficiency engine control system can include an electronic memory configured to store modules and a computer processor configured to execute the modules.

In some embodiments, the cruise parameter comprises at least one of speed of the vehicle or acceleration of the vehicle. In some embodiments, the first cruise parameter includes speeds of the vehicle greater than about 30 to about 50 miles per hour and the second cruise parameter includes speeds of the vehicle less than or equal to about 20 to about 40 miles per hour when the vehicle is an automobile. In some embodiments, the first cruise parameter includes speeds of the vehicle greater than about 100 to about 400 miles per hour and the second cruise parameter includes speeds of the vehicle less than or equal to about 100 to about 300 miles per hour when the vehicle is an airplane. In some embodiments, the first cruise parameter includes acceleration of the vehicle less than about 0.3 to about 15 feet per square second. The second cruise parameter can include acceleration of the vehicle greater than or equal to about 3 to about 20 feet per square second when the vehicle is an automobile. In some embodiments, the first cruise parameter includes acceleration of the vehicle less than about 0.3 to about 20 feet per square second. The second cruise parameter can include acceleration of the vehicle greater than or equal to about 3 to about 30 feet per square second when the vehicle is an airplane. In some embodiments, the engine power control module activates a kill switch based on detecting the second cruise parameter.

In some embodiments, a fuel efficiency engine control system for a vehicle comprises an input module configured to access from an accelerator pedal position sensor a first function based on an accelerator pedal position corresponding to a user-specified power output of an engine of the vehicle over a time duration. The fuel efficiency engine control system can further comprise an engine power control module in communication with the input module and an engine control unit. The engine power control module can be configured to transmit a second function corresponding to a directive power output of the engine over the time duration to the engine control unit for controlling engine power output according to the directive power output of the engine over the time duration. The second function can correspond to an oscillating directive power output of the engine over the time duration based on the input module detecting a first accelerator pedal position. The second function can include a plurality of regions of equal or increased engine power output relative to the user-specified power output of the engine over the time duration and a plurality of regions of decreased engine power output relative to the user-specified power output of the engine over the time duration. The second function can correspond to the user-specified power output of the engine over the time duration based on the input module detecting a second accelerator pedal position. The fuel efficiency engine control system can include an electronic memory configured to store modules and a computer processor configured to execute the modules.

In some embodiments, the first accelerator pedal position comprises an accelerator pedal position less than about 10% to about 90% from a minimum to a maximum of a range of accelerator pedal positions. The second accelerator pedal position can comprise an accelerator pedal position greater than about 60% to about 90% from the minimum to the maximum of the range of the accelerator pedal positions. In some embodiments, the second accelerator pedal position can correspond to an accelerator pedal position rate change of greater than A % per a unit C of time. A % can be about 10% to about 90% and time C can be about 0.2 to about 2 seconds. In some embodiments, the engine power control module activates a kill switch based on detecting the second accelerator pedal position. In some embodiments, the input module is further configured to receive from a brake pedal position sensor a brake pedal position. The second function can correspond to the oscillating directive power output of the engine over the time duration based on the input module detecting a first brake pedal position. The second function can correspond to the user-specified power output of the engine over the time duration based on the input module detecting a second brake pedal position. The first brake pedal position can comprise a brake pedal position less than about 10% to about 40% from a minimum to a maximum of a range of brake pedal positions. The second brake pedal position can comprise a brake pedal position greater than about 30% to about 80% from the minimum to the maximum of the range of the brake pedal positions. The second brake pedal position can correspond to a brake pedal position rate change of greater than B % per a unit C of time. B % can be about 10% to about 90% and time C can be about 0.2 to about 2 seconds. In some embodiments, the engine power control module activates a kill switch based on detecting the second brake pedal position.

In some embodiments, a fuel efficiency engine control system for a vehicle comprises an input module configured to access from an accelerator pedal position sensor a first function corresponding to a user-specified power output of an engine of the vehicle over a time duration. The fuel efficiency engine control system can further comprise a trailer hitch module configured to determine a speed of a hitch relative to the vehicle when the hitch is connected to the vehicle. The fuel efficiency engine control system can further comprise an engine power control module in communication with the input module, the trailer hitch module, and an engine control unit. The engine power control module can be configured to transmit a second function corresponding to a directive power output of the engine over the time duration to the engine control unit for controlling engine power output according to the directive power output of the engine over the time duration. The second function can correspond to an oscillating directive power output of the engine over the time duration based on the trailer hitch module detecting a first speed of the hitch relative to the vehicle. The second function can include a plurality of regions of equal or increased engine power output relative to the user-specified power output of the engine over the time duration and a plurality of regions of decreased engine power output relative to the user-specified power output of the engine over the time duration. The second function can correspond to the user-specified power output of the engine over the time duration based on the trailer hitch module detecting a second speed of the hitch relative to the vehicle. The fuel efficiency engine control system can include an electronic memory configured to store modules and a computer processor configured to execute the modules.

In some embodiments, the first speed of the hitch relative to the vehicle includes speeds less than about 0.5 to about 5 miles per hour. The second speed of the hitch relative to the vehicle can include speeds of the vehicle greater than or equal to about 1 to about 10 miles per hour. In some embodiments, the trailer hitch module is configured to decrease a shock range of travel of an active trailer hitch system to dampen lurching of the hitch relative to the vehicle. In some embodiments, the engine power control module activates a kill switch based on detecting the second speed of the hitch relative to the vehicle.

In some embodiments, the engine control unit, in response to receiving the second function, is configured to instruct the engine to lessen quantities of fuel to an internal combustion chamber of the engine during the plurality of regions of decreased engine power output of the oscillating directive power output. In some embodiments, the engine control unit, in response to receiving the second function, is configured to instruct the engine to provide additional quantities of fuel to an internal combustion of the engine chamber during the plurality of regions of equal or increased engine power output of the oscillating directive power output. In some embodiments, the oscillating directive power output is imperceptible to a driver. In some embodiments, the plurality of regions of decreased engine power output are less than 50 milliseconds. In some embodiments, the plurality of regions of equal or increased engine power output are greater than 250 milliseconds. In some embodiments, the power output of the engine is supplemented with a second power output from an electric motor while the engine outputs power according to the oscillating directive power output over the time duration. The second power output of the electric motor can be configured to compensate for the plurality of regions of decreased engine power output such that modulations of the oscillating directive power output of the engine are dampened. In some embodiments, a change in shift ratios by a continuously variable transmission mitigates variations in momentum caused by the oscillating directive power output of the engine over the time duration. In some embodiments, the oscillating directive power output of the engine over the time duration between the plurality of regions of equal or increased engine power output and the plurality of regions of decreased engine power output comprises cyclical oscillations that comprise a same waveform. In some embodiments, the oscillating directive power output of the engine over the time duration between the plurality of regions of equal or increased engine power output and the plurality of regions of decreased engine power output comprises cyclical oscillations that are equal in frequency and amplitude. In some embodiments, the engine power control module processes the second function for smoothness. In some embodiments, an indication of a possibility or achievement of fuel savings by the engine if the engine outputs power according to the directive power output of the engine is displayed to a user. In some embodiments, an actuator permits the user to override the fuel savings.

In some embodiments, the engine power control module processes the first function into the second function, the processing comprising application of a transform T, such that $F_2(n)=T\ F_1(n)$, where
- $F_2$ is the second function;
- $F_1$ is the first function; and
- n is an ordered index number of an nth discrete sample, where $n\epsilon\{0, 1, 2, \ldots \infty\}$; and
  wherein T comprises $(ke^{-2\pi i\Omega(n-d)}-Z)$, where
- k is a constant;
- e is an exponential;
- i is the imaginary number $\sqrt{-1}$;
- $\Omega$ is a frequency in cycles per sample interval;
- Z is a constant; and
- d is a delay constant.

In some embodiments, the engine power control module processes the first function into the second function, the processing comprising application of a transform T, such that $F2(n)=T\ F1(n)$, where
- $F_2$ is the second function;
- $F_1$ is the first function; and
- n is an ordered index number of an nth discrete sample, where $n\epsilon\{0, 1, 2, \ldots \infty\}$; and
  wherein T comprises $$\frac{a_0}{2} + \sum_{j=1}^{\infty} [a_j\cos(j2\pi\Omega n) + b_j\sin(j2\pi\Omega n)],$$

where
- j is an ordered index number, where $j\epsilon\{0, 1, 2, \ldots \infty\}$;
- $a_j$ is a series of real numbers;
- $a_0$ is a real number,
- $b_j$ is a series of real numbers; and
- $\Omega$ is a frequency in cycles per sample interval.

In some embodiments, the engine power control module processes the first function into the second function, the processing comprising application of a transform T, such that $F2(n)=T\ F1(n)$, where
- $F_2$ is the second function;
- $F_1$ is the first function; and
- n is an ordered index number of an nth discrete sample, where $n\epsilon\{0, 1, 2, \ldots \infty\}$; and
  wherein T comprises $$\begin{cases} q, \text{ when } n = s_1 \\ r, \text{ when } n = s_2 \end{cases},$$

where
- q is a scalar;
- r is a scalar different from q;
- $s_1$ is a first set of samples of n; and
- $s_2$ is a second set of samples of n different from $s_1$.

A weighted average of $F_2(n)$ over $s_1+s_2$ can be approximately equal to a weighted average of $F_1(n)$ over $s_1+s_2$. Members of the first set of samples can alternate with members of the second set of samples. q can be greater than or equal to 0 and r is less than 0. q can be greater than 0 and r is less than or equal to 0. q can be greater than 0 and r is less than 0.

In some embodiments, a fuel efficiency engine control system for a vehicle comprises an input module configured to access from an accelerator pedal position sensor a first function corresponding to a user-specified power output of an engine of the vehicle over a time duration. The fuel efficiency engine control system can further comprise an auxiliary system module configured to detect a power demand of an auxiliary system. The auxiliary system can be configured to control electrical power to one or more auxiliary devices of the vehicle. The fuel efficiency engine control system can further comprise a power control module in communication with the input module, the auxiliary system module, and an engine control unit. The power control module can be configured to transmit a second function corresponding to a directive power output of the engine over the time duration to the engine control unit for controlling engine power output according to the directive power output of the engine over the time duration and can be configured to transmit a third second function corresponding to a directive output of the auxiliary device over the time duration to the auxiliary system for controlling device output according to the directive output of the auxiliary device over the time duration. The second function can include a plurality of regions of equal or increased engine power output relative to the user-specified power output of the engine over the time duration and a plurality of regions of decreased engine power output relative to the user-specified power output of the engine over the time duration. The third second function can include a plurality of regions of equal or increased auxiliary device output relative to auxiliary device power demand and a plurality of regions of decreased auxiliary device output relative to auxiliary device power demand. The plurality of regions of equal or increased auxiliary device power output can be in-phase over the time duration with the plurality of regions of equal or increased engine power output. The plurality of regions of decreased auxiliary device power output can be in-phase over the time duration with the plurality of regions of decreased engine power output. The fuel efficiency engine control system can include an electronic memory configured to store modules and a computer processor configured to execute the modules.

In some embodiments, the one or more auxiliary devices comprise at least one of an air conditioner, an air heater, a vehicle stereo, or vehicle lights. In some embodiments, the power control module is configured to increase the directive output of the auxiliary device over the time duration relative to the directive power output of the engine over the time duration during periods of reduced engine load over the time duration. The periods of reduced engine load over the time period can include at least one of highway driving or downhill driving. Highway driving can include driving speeds of the vehicle being greater than about 30 to about 50 miles per hour. Downhill driving can comprise a road being traveled on by the vehicle with a decline gradient greater than about $Z_d$. The decline gradient $Z_d$ can be about 1 to about 60 degrees. In some embodiments, the power control module is configured to decrease the directive power output of the auxiliary device over the time duration relative to the directive power output of the engine over the time duration during periods of increased engine load over the time duration. The periods of increased engine load over the time duration can include at least one of city driving, uphill driving, or congested driving. City driving can include driving speeds of the vehicle being less than or equal to about 20 to about 40 miles per hour. Uphill driving can comprise a road being traveled on by the vehicle with an incline gradient greater than about $Z_i$. The incline gradient $Z_i$ can be about 1 to about 60 degrees. Congested driving can include the vehicle stopping more than once per a traveled distance X and/or the traveled distance X is about 25 to about 100 yards.

In some embodiments, the engine control unit, in response to receiving the second function, is configured to instruct the engine to lessen quantities of fuel to an internal combustion chamber of the engine during the plurality of regions of decreased engine power output of the directive power output. In some embodiments, the engine control unit, in response to receiving the second function, is configured to instruct the engine to provide additional quantities of fuel to an internal combustion of the engine chamber during the plurality of regions of equal or increased engine power output of the directive power output. In some embodiments, the directive power output is imperceptible to a driver. In some embodiments, the plurality of regions of decreased engine power output are less than 50 milliseconds. In some embodiments, the plurality of regions of equal or increased engine power output are greater than 250 milliseconds. In some embodiments, the power output of the engine is supplemented with a second power output from an electric motor while the engine outputs power according to the directive power output over the time duration. The second power output of the electric motor can be configured to compensate for the plurality of regions of decreased engine power output such that modulations of the directive power output of the engine are dampened. In some embodiments, a change in shift ratios by a continuously variable transmission mitigates variations in momentum caused by the directive power output of the engine over the time duration. In some embodiments, the directive power output of the engine over the time duration between the plurality of regions of equal or increased engine power output and the plurality of regions of decreased engine power output comprises cyclical oscillations that comprise a same waveform. In some embodiments, the directive power output of the engine over the time duration between the plurality of regions of equal or increased engine power output and the plurality of regions of decreased engine power output comprises cyclical oscillations that are equal in frequency and amplitude. In some embodiments, the power control module processes the second function for smoothness. In some embodiments, an indication of a possibility or achievement of fuel savings by the engine if the engine outputs power according to the directive power output of the engine is displayed to a user. In some embodiments, an actuator permits the user to override the fuel savings.

In some embodiments, the power control module processes the first function into the second function, the processing comprising application of a transform T, such that $F_2(n)=T F_1(n)$, where $F_2$ is the second function;

$F_1$ is the first function; and n is an ordered index number of an nth discrete sample, where $n \in \{0, 1, 2, \ldots \infty\}$; and wherein T comprises $(ke^{-2\pi i \Omega(n-d)} - Z)$, where k is a constant;

e is an exponential;

i is the imaginary number $\sqrt{-1}$;

$\Omega$ is a frequency in cycles per sample interval;

Z is a constant; and d is a delay constant.

In some embodiments, the power control module processes the first function into the second function, the processing comprising application of a transform T, such that $F2(n)=T F1(n)$, where $F_2$ is the second function;

$F_1$ is the first function; and n is an ordered index number of an nth discrete sample, where $n \in \{0, 1, 2, \ldots \infty\}$; and wherein T comprises $$\frac{a_0}{2} + \sum_{j=1}^{\infty} [a_j \cos(j2\pi\Omega n) + b_j \sin(j2\pi\Omega n)],$$

where j is an ordered index number, where $j \in \{0, 1, 2, \ldots \infty\}$;

$a_j$ is a series of real numbers;

$a_0$ is a real number, $b_j$ is a series of real numbers; and $\Omega$ is a frequency in cycles per sample interval.

In some embodiments, the power control module processes the first function into the second function, the processing comprising application of a transform T, such that $F2(n)=T F1(n)$, where $F_2$ is the second function;

$F_1$ is the first function; and n is an ordered index number of an nth discrete sample, where $n \in \{0, 1, 2, \ldots \infty\}$; and wherein T comprises $$\begin{cases} q, \text{ when } n = s_1 \\ r, \text{ when } n = s_2 \end{cases},$$

where q is a scalar;

r is a scalar different from q;

$s_1$ is a first set of samples of n; and $s_2$ is a second set of samples of n different from $s_1$.

A weighted average of $F_2(n)$ over $s_1+s_2$ can be approximately equal to a weighted average of $F_1(n)$ over $s_1+s_2$. Members of the first set of samples can alternate with members of the second set of samples. q can be greater than or equal to 0 and r is less than 0. q can be greater than 0 and r is less than or equal to 0. q can be greater than 0 and r is less than 0.

In some embodiments, a fuel efficiency engine control system for a vehicle comprises an input module configured to access a sensor voltage values from a first accelerator pedal position sensor based on a position of an accelerator pedal of the vehicle. The fuel efficiency engine control system can further comprise a user-output module configured to output instructions to place the accelerator pedal in a first position and a second position. The fuel efficiency engine control system can further comprise a calibration module in communication with the input module and the user-output module. The calibration module can be configured to determine a first maximum voltage level and a first minimum voltage level of the sensor voltage values from the first accelerator pedal position sensor for generating a compatible directive power output for transmitting to an engine control unit that controls power output of an engine of the vehicle. The first maximum voltage level and the first minimum voltage level can be set based on the sensor voltage values detected at the first position and the second position of the accelerator pedal. The fuel efficiency engine control system can include an electronic memory configured to store modules and a computer processor configured to execute the modules.

In some embodiments, the engine control unit is configured to receive a user-specified power output of the engine based on the sensor voltage values received from the first accelerator pedal position sensor. In some embodiments, the first position of the accelerator pedal includes the accelerator pedal being fully released. In some embodiments, the second position of the accelerator pedal includes the accelerator pedal being fully depressed. In some embodiments, the engine control unit is configured to substantially reduce power output of the engine when the sensor voltage values received from the first accelerator pedal position sensor is greater than the first maximum voltage level. The engine control unit can be configured to substantially reduce power output of the engine when the sensor voltage values received from the first accelerator pedal position sensor is less than the first minimum voltage level. Substantially reducing power output of the engine can include reducing power output of the engine to zero. In some embodiments, the input module can be configured to receive sensor voltage values from a second accelerator pedal position sensor based on the position of the accelerator pedal of the vehicle. The calibration module can be configured to determine a second maximum voltage level and a second minimum voltage level of the sensor voltage values from the second accelerator pedal position sensor for generating the compatible directive power output for transmitting to the engine control unit that controls power output of the engine of the vehicle. The first maximum voltage level and the second minimum voltage level can be set based on the sensor voltage values detected at the first position of the accelerator pedal. The first minimum voltage level and the second maximum voltage level can be set based on the sensor voltage values detected at the second position of the accelerator pedal. The engine control unit can be configured to substantially reduce power output of the engine when the sensor voltage values received from the first accelerator pedal position sensor is greater than the first maximum voltage level or the second maximum voltage level. The engine control unit can be configured to substantially reduce power output of the engine when the sensor voltage values received from the first accelerator pedal position sensor is less than the first minimum voltage level or the second minimum voltage level. Substantially reducing power output of the engine can include reducing power output of the engine to zero. In some embodiments, the compatible directive power output is imperceptible to a driver. In some embodiments, the power output of the engine is supplemented with a second power output from an electric motor while the engine outputs power according to the compatible directive power output over the time duration. The second power output of the electric motor can be configured to compensate for the plurality of regions of decreased engine power output such that modulations of the compatible directive power output of the engine are dampened. In some embodiments, a change in shift ratios by a continuously variable transmission mitigates variations in momentum caused by the compatible directive power output of the engine over the time duration. In some embodiments, the compatible directive power output of the engine over the time duration between the plurality of regions of equal or increased engine power output and the plurality of regions of decreased engine power output comprises cyclical oscillations that comprise a same waveform. In some embodiments, the compatible directive power output of the engine over the time duration between the plurality of regions of equal or increased engine power output and the plurality of regions of decreased engine power output comprises cyclical oscillations that are equal in frequency and amplitude. In some embodiments, an indication of a possibility or achievement of fuel savings by the engine if the engine outputs power according to the directive power output of the engine is displayed to a user. An actuator can permit the user to override the fuel savings.

In some embodiments, a fuel efficiency engine control system for a vehicle comprises an input module configured to access from an accelerator pedal position sensor a first function corresponding to a user-specified power output of an engine of the vehicle over a time duration. The fuel efficiency engine control system can further comprise a motor power control module in communication with the input module, a combustion engine control unit, and an electric motor control unit. The motor power control module can be configured to transmit a second function corresponding to a directive power output of the combustion engine over the time duration to the combustion engine control unit for controlling combustion engine power output according to the directive power output of the combustion engine over the time duration and can be configured to transmit a third second function corresponding to a directive power output of an electric motor of the vehicle over the time duration to the electric motor control unit for controlling electric motor power output according to the directive power of the electric motor over the time duration. The second function can include a plurality of regions of equal or increased combustion engine power output relative to the user-specified power output of the engine over the time duration and a plurality of regions of decreased combustion engine power output relative to the user-specified power output of the engine over the time duration. The third second function can include a plurality of regions of equal or increased electric motor power output relative to the user-specified power output of the engine over the time duration and a plurality of regions of decreased electric motor power output relative to the user-specified power output of the engine over the time duration. The plurality of regions of equal or increased electric motor power output relative to the user-specified power output of the engine over the time duration can be configured to compensate for the plurality of regions of decreased combustion engine power output relative to the user-specified power output of the engine over the time duration to dampen oscillations of the directive power output of the combustion engine over the time duration. The fuel efficiency engine control system can include an electronic memory configured to store modules and a computer processor configured to execute the modules.

In some embodiments, the plurality of regions of equal or increased electric motor power output are out-of-phase over the time duration with the plurality of regions of equal or increased combustion engine power output. The plurality of regions of decreased electric motor power output can be out-of-phase over the time duration with the plurality of regions of decreased combustion engine power output. The plurality of regions can be out-of-phase by $\pi$ or 180 degrees. In some embodiments, the plurality of regions of equal or increased combustion engine power output and the plurality of regions of decreased combustion engine power output are a sine wave. In some embodiments, the plurality of regions of equal or increased electric motor power output and the plurality of regions of decreased electric motor power output are a sine wave. In some embodiments, the combustion engine control unit, in response to receiving the second function, is configured to instruct the engine to lessen quantities of fuel to an internal combustion chamber of the engine during the plurality of regions of decreased engine power output of the directive power output. In some embodiments, the combustion engine control unit, in response to receiving the second function, is configured to instruct the engine to provide additional quantities of fuel to an internal combustion of the engine chamber during the plurality of regions of equal or increased engine power output of the directive power output. In some embodiments, the directive power output is imperceptible to a driver. In some embodiments, the plurality of regions of decreased engine power output are less than 50 milliseconds. In some embodiments, the plurality of regions of equal or increased engine power output are greater than 250 milliseconds. In some embodiments, the power output of the engine is supplemented with a second power output from an electric motor while the engine outputs power according to the directive power output over the time duration. The second power output of the electric motor can be configured to compensate for the plurality of regions of decreased engine power output such that modulations of the directive power output of the engine are dampened. In some embodiments, a change in shift ratios by a continuously variable transmission mitigates variations in momentum caused by the directive power output of the engine over the time duration. In some embodiments, the directive power output of the engine over the time duration between the plurality of regions of equal or increased engine power output and the plurality of regions of decreased engine power output comprises cyclical oscillations that comprise a same waveform. In some embodiments, the directive power output of the engine over the time duration between the plurality of regions of equal or increased engine power output and the plurality of regions of decreased engine power output comprises cyclical oscillations that are equal in frequency and amplitude. In some embodiments, the motor power control module processes the second function for smoothness. In some embodiments, an indication of a possibility or achievement of fuel savings by the engine if the engine outputs power according to the directive power output of the engine is displayed to a user. In some embodiments, an actuator permits the user to override the fuel savings.

In some embodiments, the motor power control module processes the first function into the second function, the processing comprising application of a transform T, such that $F_2(n)=T\,F_1(n)$, where
 $F_2$ is the second function;
 $F_1$ is the first function; and
 n is an ordered index number of an nth discrete sample, where $n \in \{0, 1, 2, \ldots \infty\}$; and
 wherein T comprises $(ke^{-2\pi i\Omega(n-d)} - Z)$, where
 k is a constant;
 e is an exponential;
 i is the imaginary number $\sqrt{1}$;
 $\Omega$ is a frequency in cycles per sample interval;
 Z is a constant; and
 d is a delay constant.

In some embodiments, the motor power control module processes the first function into the second function, the processing comprising application of a transform T, such that $F2(n)=T\,F1(n)$, where
 $F_2$ is the second function;
 $F_1$ is the first function; and
 n is an ordered index number of an nth discrete sample, where $n \in \{0, 1, 2, \ldots \infty\}$; and
 wherein T comprises $$\frac{a_0}{2} + \sum_{j=1}^{\infty} [a_j \cos(j2\pi\Omega n) + b_j \sin(j2\pi\Omega n)],$$

where
 j is an ordered index number, where $j \in \{0, 1, 2, \ldots \infty\}$;
 $a_j$ is a series of real numbers;
 $a_0$ is a real number,
 $b_j$ is a series of real numbers; and
 $\Omega$ is a frequency in cycles per sample interval.

In some embodiments, the motor power control module processes the first function into the second function, the processing comprising application of a transform T, such that $F2(n)=T\,F1(n)$, where
 $F_2$ is the second function;
 $F_1$ is the first function; and
 n is an ordered index number of an nth discrete sample, where $n \in \{0, 1, 2, \ldots \Omega\}$; and
 wherein T comprises $$\begin{cases} q, & \text{when } n = s_1 \\ r, & \text{when } n = s_2 \end{cases},$$

where
 q is a scalar;
 r is a scalar different from q;
 $s_1$ is a first set of samples of n; and
 $s_2$ is a second set of samples of n different from $s_1$.
A weighted average of $F_2(n)$ over $s_1+s_2$ can be approximately equal to a weighted average of $F_1(n)$ over $s_1+s_2$. Members of the first set of samples can alternate with members of the second set of samples. q can be greater than or equal to 0 and r is less than 0. q can be greater than 0 and r is less than or equal to 0. q can be greater than 0 and r is less than 0.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter discussed herein will become apparent in the teachings set forth herein. The summary is provided to introduce a selection of concepts in a simplified form that are further described below in the Detailed Description. This summary is not intended to identify key features or essential features of any subject matter discussed herein.

BRIEF DESCRIPTION OF THE DRAWINGS

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally discussed herein, and illustrated in the Figures, may be arranged, substituted, combined, and designed in a wide variety of different configurations, all of which are explicitly contemplated and made part of this disclosure.

DETAILED DESCRIPTION

The following description of illustrative non-limiting embodiments discloses specific configurations and components. However, the embodiments are merely examples of the present inventions, and thus, the specific features described below are merely used to describe such embodiments to provide an overall understanding of the inventions. One skilled in the art readily recognizes that the present inventions are not limited to the specific embodiments described below. Furthermore, certain descriptions of various configurations and components of the present inventions that are known to one skilled in the art are omitted for the sake of clarity and brevity. Further, while the term "embodiment" may be used to describe certain aspects of the inventions, the term "embodiment" should not be construed to mean that those aspects discussed apply merely to that embodiment, but that all aspects or some aspects of the disclosed inventions may apply to all embodiments, or some embodiments.

Figure 1A:
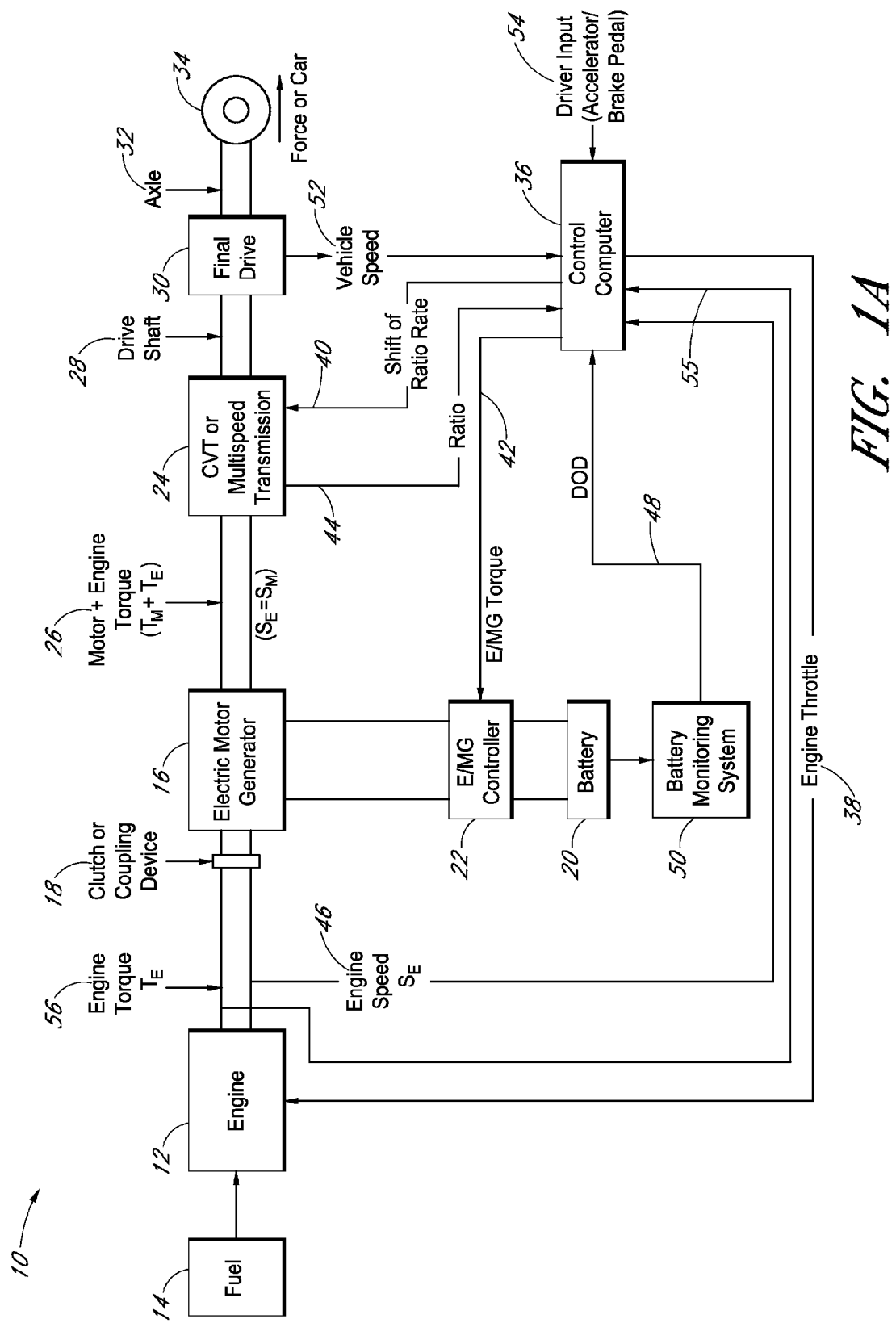
FIG. 1A is a schematic illustration of a certain embodiment.

FIG. 1A is a block diagram of a certain embodiment of the present inventions including energy consuming device system 10. In some embodiments, the energy consuming device system 10 may comprise an internal combustion engine system. In certain embodiments the system 10 may include both a hybrid-electrical portion and a device or an energy consuming device portion. The system 10 is configured for low energy consumption and emissions. As shown in the figure, the energy consuming device 12 is powered by an energy supply 14. In certain embodiments, device 12 may comprise an engine. In certain embodiments, energy supply 14 may comprise a fuel supply. While an electric motor generator (EMG) 16 is shown as coupled to device 12, certain embodiments do not require EMG 16, and in those embodiments device 12 is coupled to CVT or multispeed transmission 24. In certain embodiments, electric motors such as EMG 16 may be coupled into a drive system such as system 10 in different ways. For example, electric motors may be directly coupled to wheels 34 in accordance with certain embodiments.

In certain embodiments, device 12 is coupled to at least one of EMG 16 and CVT/multispeed transmission 24 with either a clutch 18 or other coupling device, such as a torque converter. EMG 16 is powered by battery 20 (that may include a capacitor), and battery energy is controlled with E/MG controller 22. E/MG controller 22 controls the extent of power output torque $T_m$ generated by EMG 16. At certain points along a torque $T_e$ power curve (for instance, one of the power curves shown in FIG. 2 as C1-C1, C2-C2, or C3-C3), E/MG controller 22 controls EMG 16, as instructed by control computer 36 via E/MG torque signal 42, to either produce additional electrical motor torque $T_m$, to reduce a total amount of electrical motor torque $T_m$, or to stop producing electrical motor torque $T_m$.

In certain embodiments, control computer 36 comprises a processing module, and as such may be implemented in either of software means or hardware means. For example, control computer 36 may be a programmable logic controller, a computer comprised of chips and circuits along with firmware and/or software, or an integrated chip containing software instructions for performing the processing described herein. In either example the control computer 36 is in communicative connection with energy consuming device system 10, as one of skill in the art would comprehend and as described herein.

In certain embodiments, EMG 16 may be coupled to a continuously variable transmission (CVT) or multispeed transmission 24 which receives, at its input, at least one of device 12 torque ($T_e$) and electric motor 16 torque ($T_m$) 26. CVT 24 turns a drive shaft 28. Drive shaft 28 is coupled to final drive 30 which turns axle 32 and which is coupled to wheels 34. Thus, at least one of $T_e$ and $T_m$ causes the wheels 34 to turn. Control computer 36 sets control parameters and monitors the overall operation of the system 10, including control of energy 14 to the device 12 via engine throttle control signal 38. While "throttle" typically indicates a carburetor device, one of skill in the art would understand that any controlled input could be used to deliver energy 14 to device 12, such as energy injection, microspray, and/or ultrasonic atomizing. In certain embodiments, energy 14 may be any type of combustible energy including a liquid such as gasoline, gasohol, diesel, bio-energy, or a compressed gas, such as hydrogen, propane, or methane.

Control parameters within control of control computer 36 may include, in addition to engine throttle control signal 38, shift of ratio rate (rate of change ratio) 40 for the CVT or multispeed transmission 24, and E/MG torque parameters 42 for E/MG controller 22. Operational characteristics that may be monitored include ratio 44 of the CVT or multispeed transmission 24, engine speed ($S_e$) 46, depth of discharge (DOD) 48 for the battery, as provided by battery monitoring system 50, vehicle speed 52, and driver input 54 (e.g., accelerator/brake pedal motion). Battery monitoring system 50 may be a computer, or may be controlled by a programmable logic controller (PLC), or other monitoring/control device as may be selected by one of skill in the art.

In certain embodiments, CVT 24 may smooth engine oscillations. For example, when device 12, as an engine, has variations in RPMs that are significant enough to be felt by a driver, CVT 24 may change its shift of ratio rate to compensate. That is, the CVT 24 may change its shift of ratio rate so that the variation in engine RPM speed is either not felt or is felt less by a driver.

In certain embodiments, driver input 54 includes at least a first function that comprises a directive power torque $T_e$ output over a time duration. Driver input 54 need not be provided by a human driver, but nonetheless may be an input such as a depressed acceleration pedal or brake pedal, or it may be an input from a cruise control module, or a pre-determined input, or a patterned input that may be based upon a recent history of the energy consuming device system 10, or an expected usage pattern. The input 54 is provided to control computer 36. Engine torque ($T_e$) 56 is measured at control computer 36 via engine torque feedback loop 55. Engine torque $T_e$ is a function of force applied to a crankshaft of device 12 and as felt at clutch or coupling device 18.

In certain embodiments, control computer 36 is configured to have access to a memory (either internal or external to control computer 36) that includes knowledge of device 12 parameters. Device 12 parameters includes at least knowledge of expected torque $T_e$ for device 12 including knowledge of $T_e$ along a power curve and selected or selectable zones of efficiency within the power curve. Device 12 parameters may include further knowledge, such as cubic inches of chamber space available for ignition of energy 14, type of required or suggested energy 14, shape of the ignition chambers, compression ratios of ignition chambers, friction coefficients, and optimum thermal dynamics.

Figure 1B:
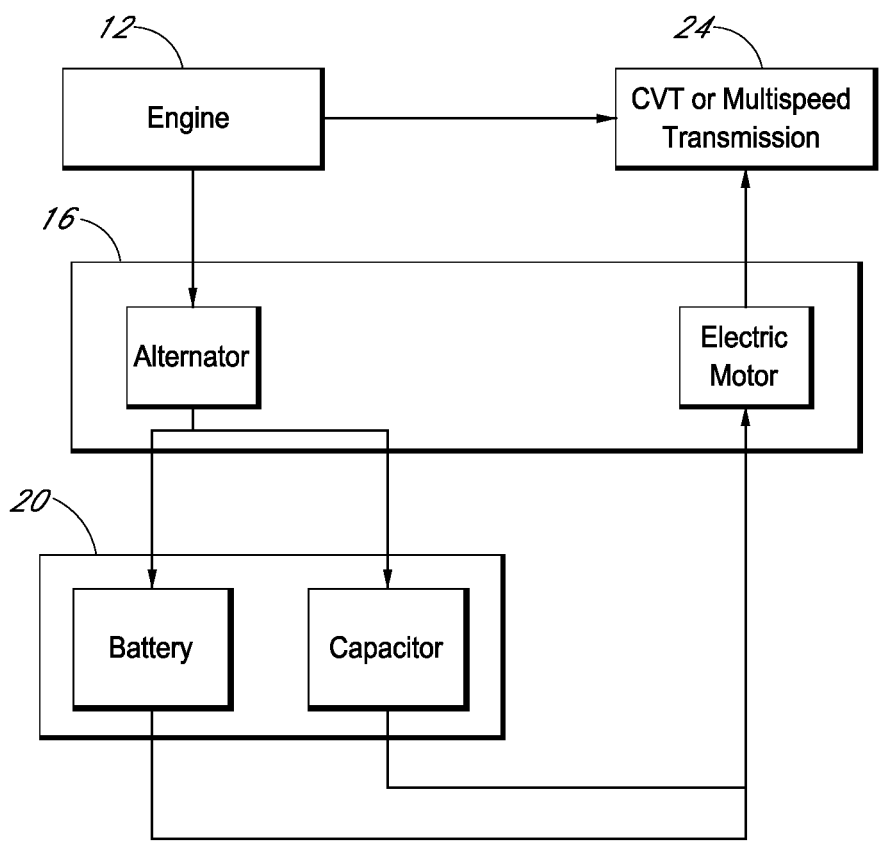
FIG. 1B is a schematic illustration of a certain embodiment.

FIG. 1B illustrates device 12 (e.g., as an engine), EMG 16, battery 20 and CVT/multispeed transmission 24 according to some embodiments. EMG 16 may comprise one or more alternators and one or more electric motors. Battery 20 may comprise one or more batteries and one or more capacitors. The alternator of EMG 16 may convert the mechanical energy produced by device 12 into electrical energy. This electrical energy may charge the battery and/or the capacitor. The capacitor can be useful because the battery may not always be able to charge sufficiently fast enough, especially when a lot of electrical energy (e.g., current) is produced. In such a case, the electrical energy may be lost, thus causing general efficiency to decrease and also causing the loss of energy which could have been applied to supplementing energy from energy consumption. According to certain embodiments, having one or more capacitors may mitigate this problem. The capacitor may charge and discharge very quickly compared to the battery. The charge from the capacitor may be used later to charge the battery or may be used to power an electric motor (e.g., EMG 16) which may supplement the engine's output. For example, the capacitor may be about one to two Farads. Multiple capacitors may be used. In some embodiments, the battery may be in parallel to the capacitor. In some embodiments, the battery may be in series with the capacitor. The stored electrical energy from battery 20 may be applied to the electric motor.

Figure 2:
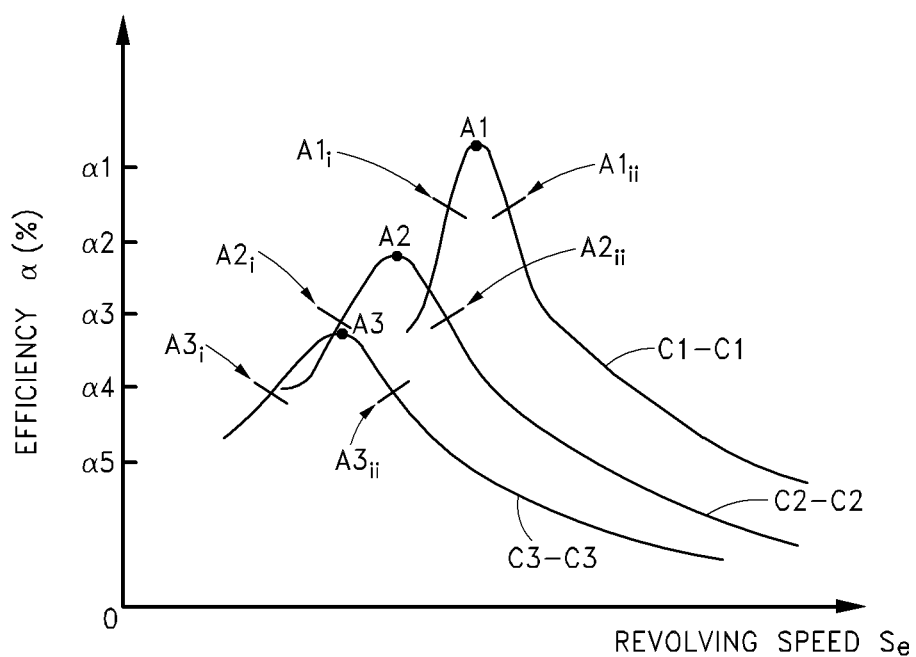
FIG. 2 is a graph that is useful for describing certain embodiments including efficiency against device speed.

FIG. 2 is a graph illustrating maximum efficiency for various devices or energy consuming devices along power curves C1-C1, C2-C2, and C3-C3. Efficiency is shown along the y axis, and speed is shown along the x axis. Each of power curves C1-C1, C2-C2, and C3-C3 are examples of different devices or energy consuming devices and their relative efficiencies in view of torque and revolving speed Se. In some embodiments, each energy consuming device has an initial speed and torque output that begins at zero. Speed $S_e$ increases as a result of the amount of force (Te) applied to a crankshaft. The amount of force ($T_e$) begins at a low point, hits a peak, and then descends across a spectrum of speed. That is, at a speed $S_e$ just above zero and progressing towards a faster revolving engine speed, force $T_e$ initially approaches and then reaches maximum efficiency as shown by points A1, A2, and A3 for respective power curves, C1-C1, C2-C2, and C3-C3. Prior to reaching points A1, A2, and A3, the energy consuming device reaches a zone of efficiency at points $A1_i$, $A2_i$, and $A3_i$, respectively.

A zone of efficiency for many vehicles with devices or energy consuming devices includes a revolving speed Se that equates to a vehicle speed of about 45 to 60 miles per hour. As one of skill in the art would understand, vehicle speed in terms of miles per hour depends upon many factors in addition to torque $T_e$ and revolving speed $S_e$, such as weight of the vehicle and load (if any) in addition to vehicle weight, aerodynamics, transmission ratio, and incline or decline of path traveled.

Individual zones of efficiency $A1_i$-$A1_{ii}$, $A2_i$-$A2_{ii}$, and $A3_i$-$A3_{ii}$ reach a maximum point of efficiency A1, A2, and A3, respectively, and then as revolving speed Se continues to increase, overall efficiency at points $A1_{ii}$, $A2_{ii}$, and $A3_{ii}$, has reached a point of diminishing returns—that is, any increase in energy 14 provided to device 12 past points $A1_{ii}$, $A2_{ii}$, and $A3_{ii}$ results in less and less torque $T_e$ as far as gains in revolutions per minute, or speed $S_e$ is concerned. There may be multiple zones of efficiency for individual power curves, for example, a preferred zone, a secondary zone, and a tertiary zone. For purposes of clarity, FIG. 2 illustrates a preferred zone of efficiency, for example, $A1_i$-$A1_{ii}$, as an aspect of certain embodiments.

According to some embodiments, efficiency may be represented as:

$$\text{Efficiency} = \frac{\text{Output}}{\text{Input}} = \frac{\text{Work}}{\text{Work} + \text{Energy}_{Loss}}$$

Thus, efficiency may be determined in terms of the ratio between the amount of energy going to work and the amount of energy going to work plus any energy that is lost. Energy loss may come from a variety of sources, for example, heat loss and loss of electrical energy because of inefficiencies with battery charging. In certain embodiments, efficiency can be improved by reducing the energy loss relative to a given amount of work performed. In some embodiments, "work" as used herein generally refers to energy expended to perform mechanical work (e.g., kinetic energy) or electrical work, including storing electrostatic potential energy (e.g., in a capacitor) or producing luminescence (e.g., in a light bulb). In this context, this "work" does not substantially include energy dissipated as heat, which is often considered a form of energy loss.

As noted previously, input 54 shown in FIG. 1A includes a user-specified power output as a first function for device 12 over a time duration. By way of example, a user-specified power output may be provided when a user depresses an accelerator pedal or engages a cruise control module. Control computer 36 takes the first function and processes the first function into a second function. The second function comprises a directive power output $T_e$ of device 12 for a time duration and the second function may be delivered to device 12 via engine throttle signal 38. The second function may include both a region of equal or increased power output and a region of decreased power output in relation to the first function. That is, the second function represents a modified version of the first function after having undergone further processing. According to certain embodiments, the power output of the second function may oscillate during the time duration. In some embodiments, the power output of the second function may be periodic during the time duration. Although the first function and/or the second function are described as comprising power outputs, the first function and/or the second function may comprise other types of outputs such as work outputs.

For example, in a certain embodiment, the second function is derived from the first function after having been processed with an algorithm, for instance:

$$P_d = (F_{2reg1} + F_{2reg2}) \approx F_1, \text{ where}$$

$P_d$=directive power output;
$F_{2reg1}$=a region of equal or increased engine power output relative to a user-specified power output $F_1$ ($F_{2reg1} \geq F_1$); and
$F_{2reg2}$=a region of decreased engine power output relative to the user-specified power output $F_1$ ($F_{2reg2} < F_1$).

In a certain embodiment, a driver depresses a gas pedal. The depressed gas pedal provides an input 54 to control computer 36. (Input 54 may be another input, such as a cruise control input.) Control computer 36 is aware of engine speed $S_e$ 46 and also has access to a memory (not shown in FIG. 1A) that is either internal or external to computer 36. The memory includes at least knowledge of expected torque $T_e$ for device 12 including knowledge of $T_e$ along a power curve and selected or selectable zones of efficiency within the power curve. For example, in certain embodiments, the memory includes knowledge of power curve C1-C1 and a preferred zone of efficiency $A1_i$-$A1_{ii}$. Control computer 36 also receives as an input the feedback loop signal 55 for engine torque $T_e$.

With knowledge of the information of the engine's (element 12's) power curve C1-C1, the preferred zone of efficiency $A1_i$-$A1_{ii}$, and with the engine torque $T_e$ signal 56, control computer 36 is configured to process driver input 54, and to produce a second function from driver input 54. The second function includes a region where engine power $T_e$ may be equal or increased when revolving speed $S_e$ is presently less than point $A1_{ii}$ on power curve C1-C1. The second function also includes a region of decreased power where engine revolving speed $S_e$ is presently greater than point $A1_{ii}$ on power curve C1-C1. During a region of equal or increased power, control computer 36 may instruct device 12 using engine throttle signal 38 to provide additional quantities of energy 14 to an internal combustion chamber. During a region of decreased power, control computer 36 may instruct device 12 using engine throttle signal 38 to lessen quantities of energy 14 to an internal combustion chamber.

In certain embodiments, control computer 36 is configured to oscillate energy delivery instructions to device 12 multiple times over a time duration. For example, the control computer 36 may swing back and forth between instructing device 12 to provide additional quantities of energy 14, and instructing device 12 to lessen quantities of energy 14 to an internal combustion chamber. During such energy oscillation, when the engine torque $T_e$ and engine speed $S_e$ is below point $A1_{ii}$, and the driver input (or other signal such as a cruise control input) 54 indicates, for example, a depressed acceleration pedal, the instruction to provide additional quantities of energy 14 will occur over a greater duration during a specified time duration than will the instruction to lessen quantities of energy 14.

In some embodiments, the overall result during such energy oscillation is that less energy is consumed during a time duration than if the engine either had proceeded with a wide-open throttle, or had proceeded with only continuing periods of additional and unrestricted energy consumption. In some embodiments, the overall result during such energy oscillation is that less energy is consumed during a time duration than in a drive system without system 10. In certain embodiments, oscillation of the energy delivery as described above is imperceptible to a driver because the energy quantities can be very finely controlled by the control computer 36, can be smoothed, and can be compensated for by an output from an additional motor, or by varying the ratio on a CVT/multispeed transmission 24. In certain embodiments, oscillation of the energy delivery as described above is imperceptible to a driver because the instruction to lessen, dampen, or cut energy quantities occurs during a short time period, for example, 50 milliseconds, while the instruction to provide additional quantities of energy occurs during a longer time period, for example, 250 milliseconds. In certain embodiments, oscillation of the energy delivery as described above includes a ramp-up period of about 5-7 seconds while the device 12 is coming up to speed, followed by oscillations where the instruction to provide additional quantities of energy occurs during a period of about 1-2 seconds, followed by the instruction to lessen, dampen, or cut energy quantities that occurs during a time period of about 3-4 seconds, in reiterative fashion.

In certain embodiments, the above-noted energy oscillation is stopped during periods of 'hard' acceleration. For example, when a user depresses a gas pedal beyond a certain threshold and/or at a speed that exceeds a certain threshold, the system may in that case cease to apply the second function so that a user may apply as much throttle with as much corresponding torque or power as is needed or desired.

In certain embodiments, when the engine torque $T_e$ and engine speed $S_e$ is above point $A1_{ii}$ and the driver input signal (or other input such as a cruise control signal) 54 indicates a depressed acceleration pedal (or other condition or pattern), the instruction to provide additional quantities of energy 14 will occur over a lesser duration during a specified time duration than the instruction to lessen quantities of energy 14. In some embodiments, the overall result during such energy oscillation is that less energy is consumed during a time duration than if the engine either had proceeded with a wide-open throttle, or had proceeded with only continuing periods of additional and unrestricted energy consumption. In some embodiments, the overall result during such energy oscillation is that less energy is consumed during a time duration than in a drive system without system 10.

In certain embodiments, when the engine torque $T_e$ and engine speed $S_e$ is above point $A1_{ii}$, the energy consuming device system 10 is configured to bring operation of the device 12 back to within the zone of efficiency $A1_i$-$A1_{ii}$. That is, when engine torque $T_e$ and engine speed $S_e$ is above point $A1_{ii}$, and there fails to be a driver input signal (or other input signal such as a cruise control signal) 54 indicating a depressed acceleration pedal (or other condition or pattern indicating a required torque above point $A1_{ii}$), the instruction to provide additional quantities of energy 14 will approximate an energy quantity for mere minimal operation of device 12, and will occur over a lesser duration during a specified time duration than the instruction to lessen quantities of energy 14.

In certain embodiments, EMG 16 is configured to be instructed by control computer 36 via E/MG torque signal 42 to supplement the torque $T_e$ of device 12 with electrical motor torque $T_m$. For example, when torque $T_e$ and Speed $S_e$ for device 12 has reached point $A1_{ii}$ in FIG. 2, and control computer 36 receives driver input 54 (which may be from the driver depressing the gas pedal, from a cruise control unit, or may be derived from a usage history of the energy consuming device system 10) indicating greater speed is desired, control computer is configured to instruct E/MG controller 22 via E/MG torque signal 42 to increase the amount of electrical motor torque $T_m$ such that the device 12 never leaves zone of efficiency $A1_i$-$A1_{ii}$, while still providing a combined electrical motor torque $T_m$ and engine torque $T_e$ that exceeds that of point $A1_{ii}$. In this situation, the EMG 16 and device 12 may be able to contribute to the movement of the vehicle independently.

In certain embodiments, EMG 16 is configured to be instructed by control computer 36 via E/MG torque signal 42 to provide a majority of torque power to CVT or multispeed transmission 24. For example, when torque $T_e$ and speed $S_e$ of device 12 is either below point $A1_i$ or above point $A1_{ii}$ on power curve C1-C1, control computer 36 may instruct E/MG controller 22 through E/MG control signal 42 to have EMG 16 produce some, most, or approximately all of the torque energy felt at CVT/multispeed transmission 24. Then, once device 12 is operating within zone of efficiency $A1_i$-$A1_{ii}$, control computer 36 may instruct E/MG 22 via E/MG control signal 42 to lessen the amount of $T_m$ torque produced, to cease producing $T_m$ torque, and/or to convert some of $T_e$ torque to electrical charging energy to charge battery 20 (battery 20 may include a capacitor).

In certain embodiments, battery 20 is at least partially configured to be charged from an alternator powered by device 12. In certain embodiments, battery 20 is configured to be charged by electric motor generator 16 converting some or all of torque energy $T_e$ (or engine output in general) to electrical charging energy. For instance, when battery monitoring system 50 notes a need to charge battery 20, depth of discharge (DOD) signal 48 notifies control computer 36. Control computer 36 notes the need to charge battery 20, and during opportune moments (such as when a combined torque output of both $T_e$ and $T_m$ is not necessary) E/MG controller 22 instructs electric motor generator 16 to convert a portion of $T_e$ from device 12 to electrical charging energy. The electrical charging energy is then fed to battery/capacitor 20 for charging. Similarly, a certain embodiment provides for recouping energy created by braking or other deceleration to charge the battery/capacitor 20.

In certain embodiments, control computer 36 is configured to process the first function 54 (that is, the driver input, cruise control input, or other input 54) approximately contemporaneously with reception of the first function at control computer 36. In certain embodiments, control computer 36 is configured to process the first function substantially extemporaneously based on a history of the first function over time. For example, control computer 36 may take an instantaneous (e.g., one second) snapshot of first function/driver input 54. During that instant, the driver of the vehicle being run by energy consuming device system 10 may have just begun accelerating on a freeway on-ramp to enable a merge into on-coming traffic. This may be aided by various sensors in the vehicle such as acceleration or yaw sensors.

Because the snapshot indicates that the driver desires acceleration, control computer 36 may process the first function/driver input signal 54 and then extemporaneously apply the second function (discussed above) derived from the first function (discussed above) for a certain duration of time, for example, for five seconds, based upon the one second reception of the first function. During that five seconds, control computer 36 may control and manipulate the energy consuming device system 10 in the manner discussed in relation to FIGS. 1 and 2, above, to achieve a savings in energy 14.

In certain embodiments, a feedback loop is provided that is configured to provide a display of information of possible energy savings and/or the achievement of energy savings. In certain embodiments, a user is provided with a kill switch (for instance, switch 311 described in relation to FIG. 3) that is configured to withhold the second function from being applied to the device 12, thereby allowing device 12 to reach a wide-open throttle across any engine revolving speed $S_e$. In certain embodiments as described above, a hard acceleration request from a user may also allow device 12 to reach a wide-open throttle by withholding the second function.

Efficiency is examined herein as a function of power. Although power is discussed, other parameters could be used for implementation of the second function to produce a directive power output. The following non-exclusive list provides examples of such parameters: engine power output, torque, horsepower, proportional air-fuel mixture, rate of fuel injection, engine timing, throttle setting, the speed or velocity of a fuel pump, the rate of exhaust, and alterations in the ignition of the fuel, among others.

Those skilled in the art will readily appreciate that the control methods, policies and/or algorithms of certain embodiments may be implemented on any conventional computer system under processor control using conventional programming techniques in any of hardware, software, or firmware. Further, those skilled in the art will readily appreciate that the control methods, policies and/or algorithms of certain embodiments may be implemented on any energy consuming device, including without limitation, any internal combustion engine, jet engine, locomotive engine, motor boat engine, diesel engine, hybrid combustion-electric engine, and the like.

Figure 3:
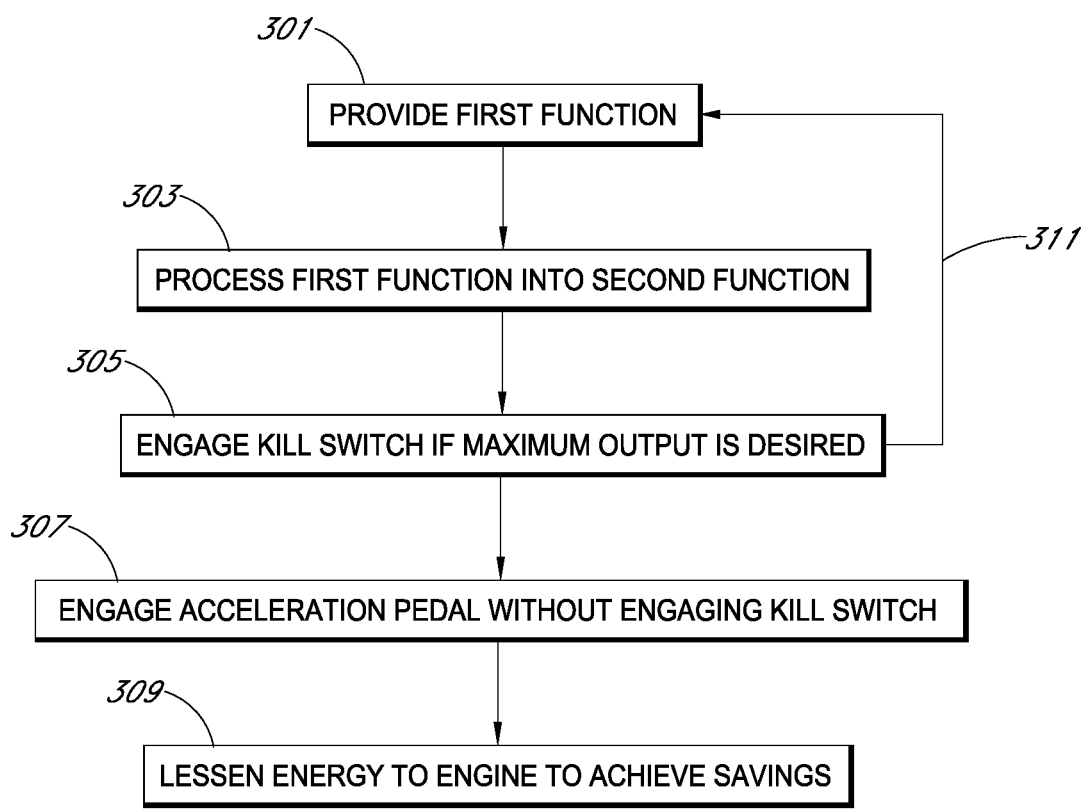
FIG. 3 is a block diagram useful for describing certain embodiments.

FIG. 3 is a block diagram useful for describing certain embodiments, including a method of conserving energy for a device. Block 301 represents providing a first function comprising a user-specified output of a device over a time period to a device power module, for example, the first function as discussed in relation to FIG. 2. Block 303 represents processing (or extrapolating) the first function into a second function comprising a directive power output over a time duration. In certain embodiments, the second function may comprise at least one region of equal or increased engine power output relative to the user-specified engine power output, and also at least one region of decreased engine power output relative to the user-specified engine power output. An example of a second function is that as discussed in relation to FIG. 2. As shown in that figure, the second function may comprise a directive power output $T_e$ of device 12 for a time duration and the second function may be delivered to device 12 via engine throttle signal 38. The second function may include a region of equal or increased power output and a region of decreased power output in relation to the first function. That is, in certain embodiments the second function represents a modified version (or extrapolation) of the first function after having undergone further processing.

Block 305 illustrates the inclusion, in certain embodiments, of a kill switch 311, or a user-provided input 311, that overrides potential energy savings and allows up to a maximum torque such as that provided by a wide-open throttle. In a certain embodiment comprising the features of block 305, a display may provide information regarding present energy savings (or the possibility of energy savings). A user may determine that at that particular moment the engine needs to provide maximum output (e.g., power, torque) and/or speed, and therefore engages switch 311. In certain embodiments, switch 311 may be a threshold on an accelerator pedal, whereupon if the user depresses the pedal past the threshold in terms of either how quick the pedal is depressed and/or how far the pedal is depressed, the switch is engaged. Switch 311 provides an input to a processing module, such as processing module 36 shown in FIG. 1A, and when the user has determined to override any energy savings or potential energy savings, processing module 36 allows the engine to be operated by the user in an unconstrained fashion, that is, to be used for possibly maximum output and/or speed. In other words, the operator is allowed to operate the engine without the directive power output of the second function being applied.

In certain embodiments, the function represented by switch 311 is a 'true' off switch. That is, once the switch 311 is engaged, the operator is allowed to operate the engine without the directive power output of the second function being applied until the operator re-engages the switch 311. In certain embodiments, once the switch 311 is engaged by an operator (and not re-engaged during a course of driving by the operator), the switch is re-engaged by the vehicle automatically upon the device 12 being turned off and then back on. In certain embodiments, when a user-provided input indicates a high demand for vehicle speed (such as by a user 'flooring' a gas pedal), the switch 311 causes a directive engine power output (for instance, that output illustrated by the dashed line in FIG. 5) to cease oscillations above and below the user-specified engine power output (for instance, that output illustrated by the solid line in FIG. 5). In certain embodiments, switch 311 is an engagement switch, i.e., when a user turns the vehicle on, the second function is not automatically implemented but is implemented once a user engages switch 311.

Block 307 represents a certain embodiment, where a user may be provided with energy savings information, and based on that information the user may decide to not engage kill switch 311 while nonetheless engaging an acceleration pedal, thereby informing, for instance, processing module 36 that additional torque output is desired while either maintaining or increasing an energy savings. In such an instance, processing module 36 may instruct an electric torque generator (such as electric motor generator 16 shown in FIG. 1A) to supplement the torque generated by the engine.

Block 309 represents at least a couple of scenarios. First, in a certain embodiment, the processing module 36 may determine that the user is desiring less torque and/or speed, as provided by the first input discussed in relation to FIG. 2. In that instance, processing module 36 may lessen energy to the engine to achieve an energy savings. In another scenario for a certain embodiment represented by block 309, a user may provide an input to processing module 36 by means of a cruise control, or by simply maintaining a present speed for a certain period (such as five seconds), and based on that input the processing module 36 may determine that an electric torque generator (such as electric motor generator 16) may increase its output to maintain a consistent torque or speed as experienced by a user, while still lessening energy to the engine to achieve an energy savings. Finally, in a certain embodiment represented by block 309, the processing module 36 may determine that a user-specified increase, such as a depressed accelerator pedal, falls within a range whereby the electric generator is capable of increasing total torque output while diminishing the torque output of the engine by lessening energy, thereby achieving an energy savings.

Figure 4A:
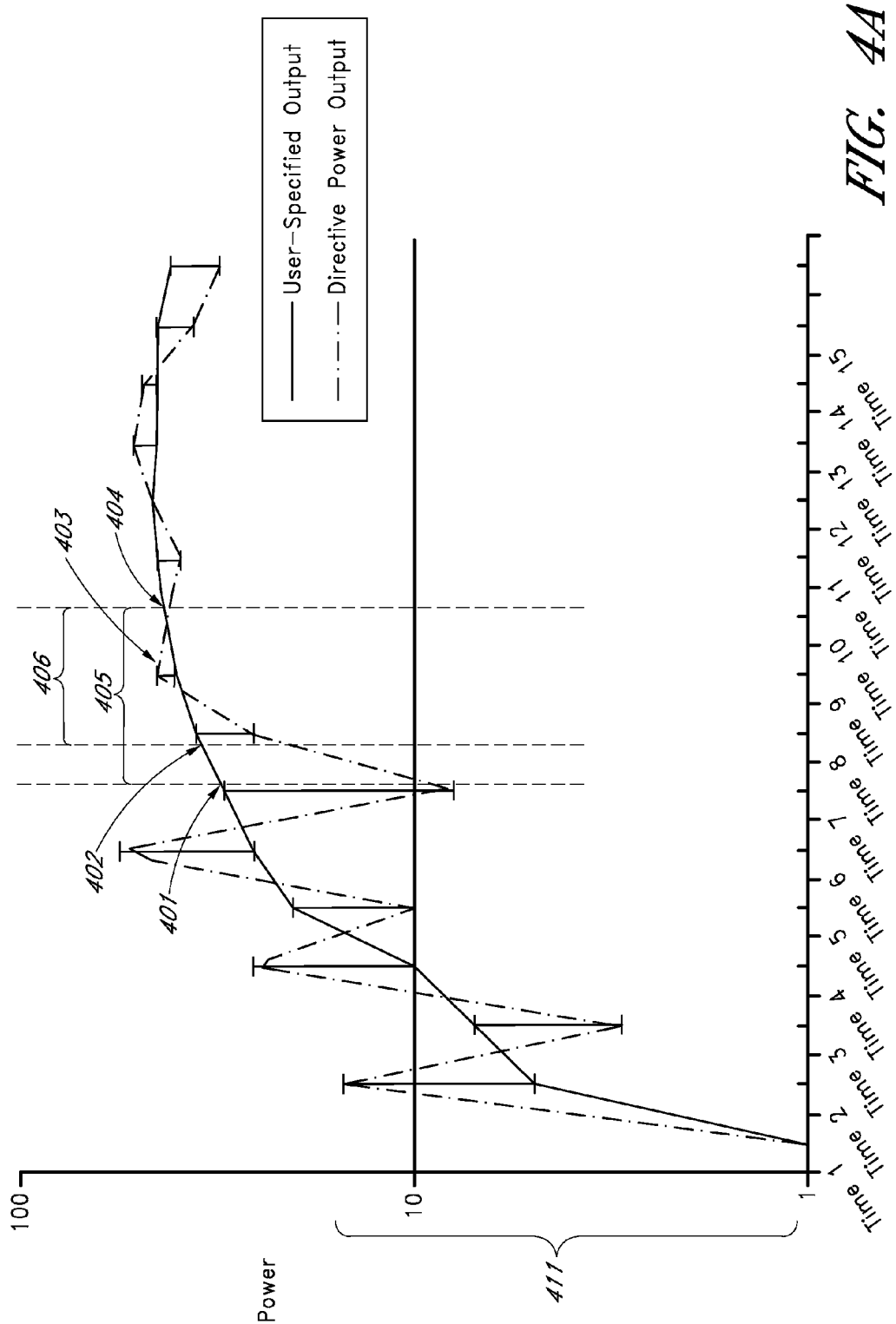
FIG. 4A is a graph that is useful for describing certain embodiments.

FIG. 4A is a graph that illustrates some embodiments including the use of torque/output power/acceleration as a determinant of efficiency in view of a period of acceleration over time. As shown in the figure, prior to point 401 the directive engine power output (shown by the dashed line) oscillates both above and below the user-specified engine power output (shown by the solid line). Between points 401 and 404 lies time frame 405. During time frame 405 the directive power output comprises a region of both increased and decreased engine power output relative to the user-specified engine power output. For example, time frame 406 comprises a directed engine power output that is, substantially, greater than the user-specified engine power output.

Further, the time between points 401 and 402 reflects a region of decreased directive engine power output relative to the user-specified engine power output. Point 403 reflects a peak oscillation of the directive engine power output. Area 411 represents a region where, based on the user accelerating beyond a particular threshold, the system may allow a user to operate the engine without the directive power output of the second function being applied, for instance, in cases of urgency where a user needs a substantially wide-open throttle. In certain embodiments under these circumstances, a user depresses a gas pedal beyond a threshold. By going beyond the threshold (either a physical threshold, such as past a physical point, or a virtual threshold, such as beyond a particular speed), the system allows the operator to use the vehicle without the directive power output of the second function being applied.

Mathematics may be used to describe certain embodiments including the situation where a user is either constantly accelerating a vehicle or maintaining a steady velocity. Consider the user-specified input to be a first function, $F_1$. Further consider that n as an index for the number of a particular discrete sample in an integer series (e.g., 0, 1, 2, . . . n) equals a number, and that T is a transform to apply to the first function to arrive at a second function, $F_2$, that comprises a directive power output. In certain embodiments, $F_2$ may comprise the directive power output illustrated by the solid lines in FIG. 8. In certain embodiments $F_2$ may comprise the directive power output illustrated by the dotted lines in any of FIG. 4A, 4B, 5, 6A, 6B, 7A, or 7B. This may be shown as expressed below.

$$F_2(n) = TF_1(n)$$

Further consider that in some embodiments the transform T comprises $$(ke^{-2\pi i \Omega (n-d)} - Z),$$

where T may be equal to a scalar k times an exponential function, e, where e is an inverse of a natural log that, along with its exponent, makes the second function oscillate. In some embodiments, k can be a real number scalar (e.g., a one-dimensional vector). For example, k can be a constant. As used herein, "constant," can represent a number that does not change in value or a random variable having a value that can vary according to a probability distribution. Additional variables shown include the imaginary number i, and omega ($\Omega$) as a representation of frequency in cycles per sample interval. The variable d is a scalar. In some embodiments, d can be a real number scalar (e.g., a one-dimensional vector). For example, d can be a constant and is an integer that may include zero (e.g., 0, 1, 2, . . . d). If d is a positive integer, it provides a true time delay. If d is negative, it provides a non-causal product because $F_2(n)$ depends on future samples (e.g., n+1 or n+2). The variable Z is a scalar. In some embodiments, Z can be a real number scalar (e.g., a one-dimensional vector). For example, Z can be a constant that provides an offset for the final directive power output. When Z is positive, the offset moves 'down' with respect to efficiency (or other parameter along the y axis). When Z is negative, the offset moves 'up.' Note that Z could be zero. Note that in some embodiments d is optionally implemented as a delay, and that the offset provided by Z may be used to provide, on average, less power output than the user-specified function, $F_1$. In some embodiments, d=0.

The graph of FIG. 4A may also be explained mathematically for a certain embodiment comprising the situation where a user is constantly accelerating a vehicle. Consider that in some embodiments the first function comprises a straight line segment of slope S representing constant acceleration. In some embodiments, slope S of the user-specified output over time is shown by the solid line in FIG. 4A. This may be expressed as shown below.

$$F_1(n)=Sn$$

In view of some embodiments where a user is constantly accelerating a vehicle as described above, the derived second function may be expressed as provided below.

$$F_2(n)=TSn=(ke^{-2\pi i\Omega(n-d)}-Z)Sn$$

Note that the variable n may equal one or more distinct time periods $t_0 \ldots t_n$ (shown on the graph of FIG. 4A as Time 1 through Time 15). Also note that n is a discrete integer. In certain embodiments the above-featured processing algorithm may be used during any instance of acceleration or deceleration. Furthermore, note that while the y axis of the graph of FIG. 4A (in addition to subsequent graphs as shown in later figures) represents power, the y axis may represent other quantities, such as energy consumption, engine revolutions per minute, or velocity of the vehicle.

Figure 4B:
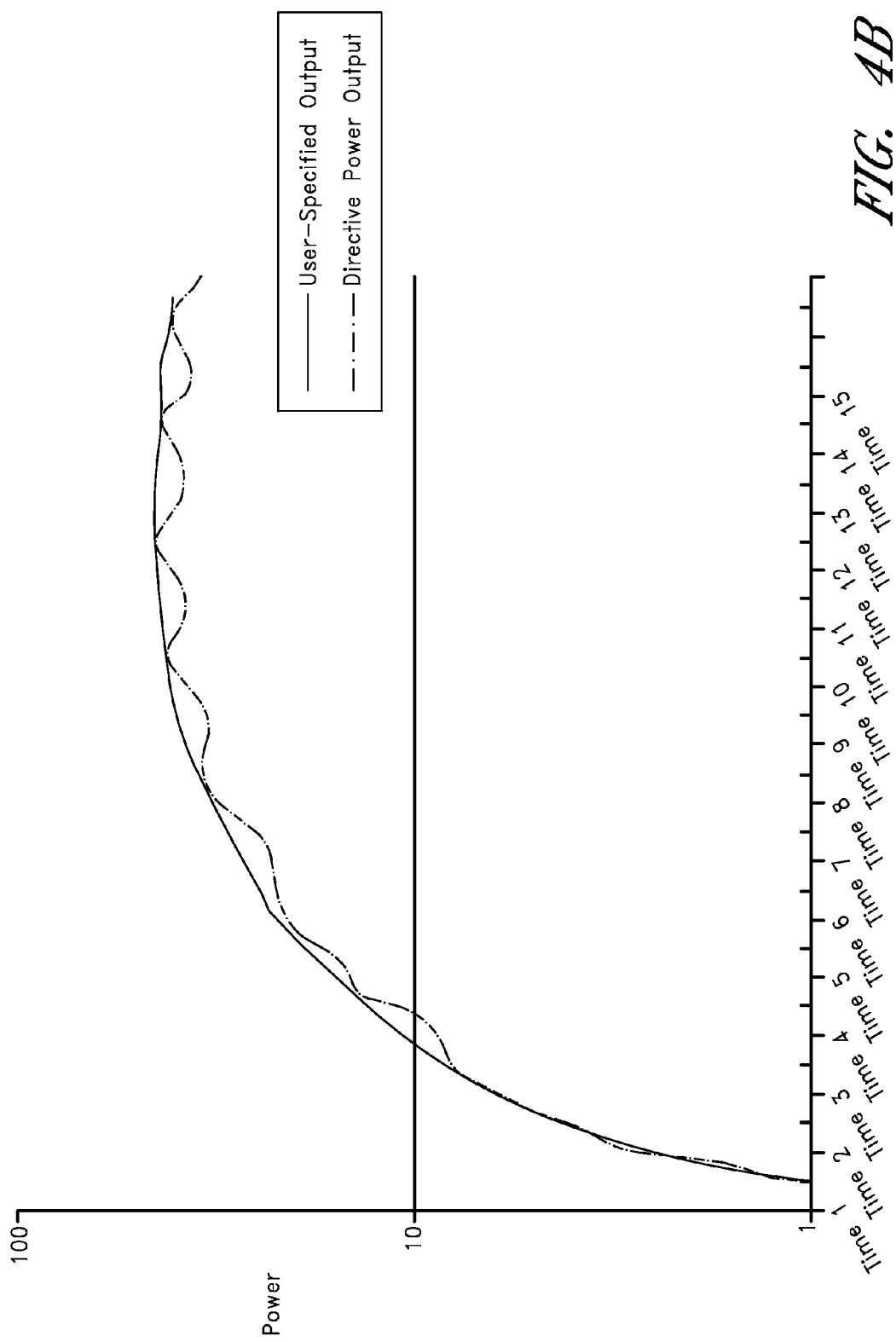
FIG. 4B is a graph that is useful for describing certain embodiments.

FIG. 4B is a graph that illustrates some embodiments similar to FIG. 4A. As shown in FIG. 4B, the directive engine power output (shown by the dashed line) oscillates between being substantially equal to the user-specified function, and being below the user-specified engine power output (shown by the solid line).

The graphs of FIGS. 5, 6A, 6B, 7A, 7B, 8, and/or 9 may be explained mathematically for certain embodiments implementing a cruise control or like device for producing substantially constant velocity (or some other output such as power, energy consumption, engine revolutions per minute, etc.). An algorithm for a cruise control device, as provided below, is similar to that algorithm described above, but comprises a constant C. Constant C represents, for example, a substantially constant input of the user-supplied function $F_1$ shown by the solid lines in FIGS. 5, 6A, 6B, 7A and 7B, or shown by the dotted lines in FIG. 8. In certain embodiments $F_2$ may comprise the directive power output illustrated by the dotted lines in FIGS. 5, 6A, 6B, 7A, and 7B, or illustrated by the solid line in FIG. 8. The first function in this embodiment may be described as shown below.

$$F_1(n)=C$$

In this embodiment, the derived second function may be expressed as shown below.

$$F_2(n)=TC=(ke^{-2\pi i\Omega(n-d)}-Z)C$$

In certain embodiments the above-featured processing algorithms may be used to extrapolate a particular predictive driving behavior. For instance, the transform T may be used to analyze ten discrete and equal time periods of a few hundred milliseconds each. A result of the transform may then be determined by a controller or a processor, and embodiments of the subject technology may then apply the second function, $F_2$, for a certain period of time, for instance, five seconds, with a rolling window of continued application of the second function. That is, the above-noted transform may be repeatedly applied on a rolling basis until a known end event, such as a user applying a brake pedal, applying a switch, pressing the accelerator pedal past a physical threshold or past a speed threshold, or another event.

Figure 5:
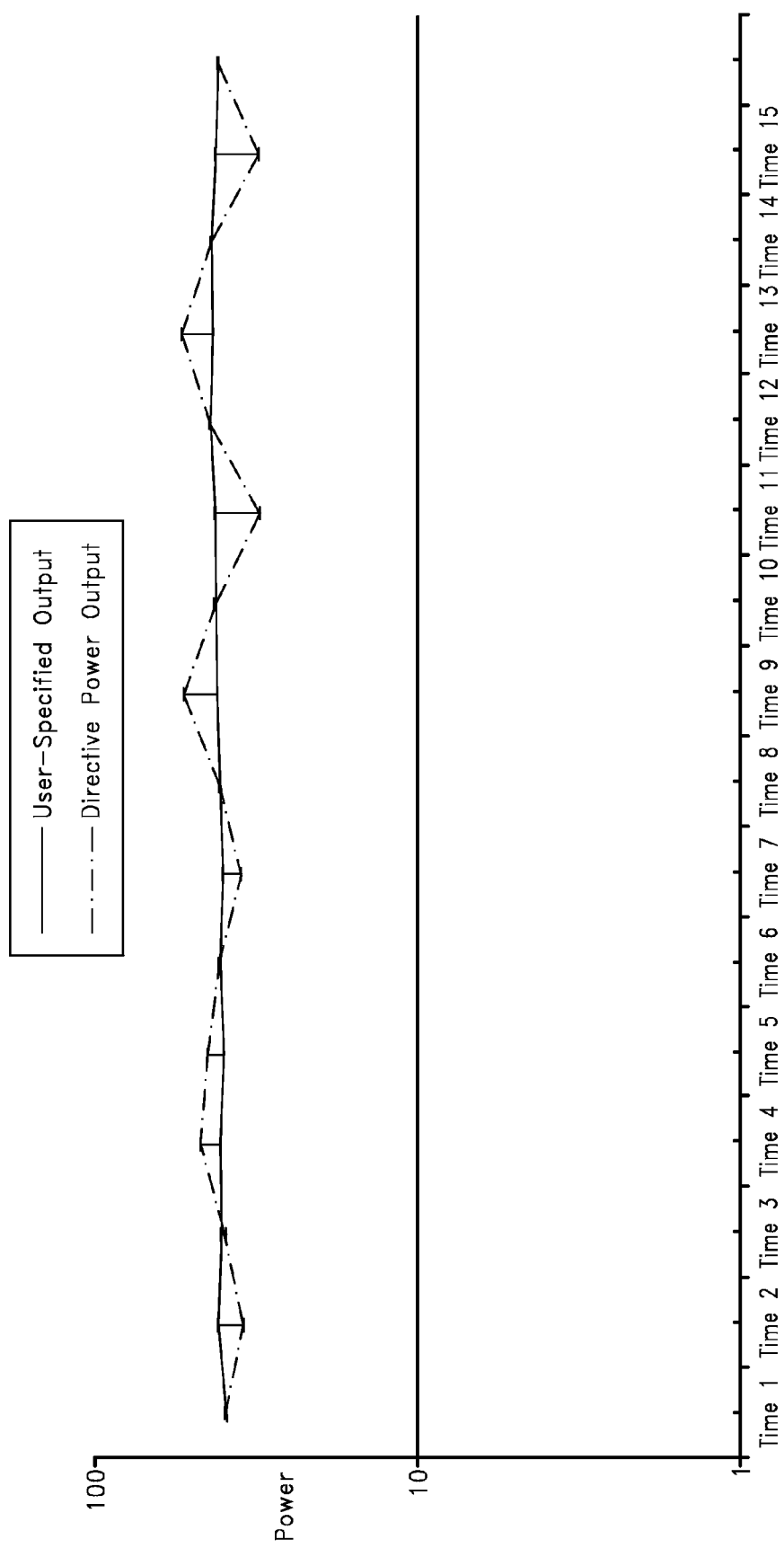
FIG. 5 is a graph that is useful for describing certain embodiments including the application of a directive power output over time in comparison to a user-supplied input.

FIG. 5 is a graph that illustrates some embodiments including the use of torque/output power/acceleration as a determinant of efficiency in view of a substantially steady velocity that is maintained (or anticipated to be maintained), for example, during application of a cruise control input as a first, user-supplied function. As shown in the figure, the directive engine power output (shown by the dashed line) oscillates both above and below the user-specified engine power output (shown by the solid line). At point in time 9, a user has provided a cruise control input that is intended to maintain the speed/velocity of the vehicle. After point 9 the directive power output comprises a region of both increased and decreased engine power output relative to the user-specified engine power output and includes oscillations equal to, above and below the user-supplied function.

The graph of FIG. 5 after point 9 may also be explained mathematically for a certain embodiment as a function of power and time. For instance, assume that at point 9, a directive power function, $F_d$, applies to both power (p) and time (t). The controller 36 (from FIG. 1A, for example) applies the directive power function $F_d$ as a function of both (p) and (t), and extrapolates a projected directive power output over a certain time period. For example, assuming that each time period reflected in FIG. 5 is a discrete moment, for example, 1 second, and that a representative power output is located at each discrete moment in time, then $F_d(p1, t1)=F_d(100$ watts, 1 second), and $F_d(p2, t2)=F_d(150$ watts, 1 second), etc. . . . through $F_d(p_n, t_n)$ . . . , then the controller 36 in certain embodiments, extrapolates a future directive power output for a future time period, for example, 4 seconds. For instance, in certain embodiments, the controller 36 has measured the user-provided input as a first function, and based on a continuity of that input for a certain period (for example, 2 seconds) with a steady engine revolving speed and substantially constant velocity (for instance, as provided by a cruise control input), the controller 36 extrapolates that the velocity will be maintained for at least 1 cycle, which in the example shown in FIG. 5 represents 4 seconds, or the time frame from time periods 9 to 13.

The extrapolation shown in FIG. 5, as monitored and controlled by controller 36, continues past point 13 based on the fact that the user-provided input indicates, as viewed from a short, historical perspective (for example, a second) that the engine revolving speed and the vehicle velocity should continue in status quo fashion for a set future length of time. Although watts are described above, one of skill in the art would comprehend that other qualifiers could be used, such as power out divided by power in, or foot/lbs., or another measure of power.

In certain embodiments where the controller 36 receives a first function that comprising a user-specified power output of the device 12 over time, the first function may be a cruise control setting for velocity that is derivable into a power output of the engine over time. Further, either of the first or second functions discussed above may be derived from either of a series of data points over time, or a single data point over time. If the function is derived from a single data point over time, it may be a constant data point, or it may be a data point that changes over time, for example, a cruise control may provide a single data point that remains constant or changes over time, or it may provide multiple data points that remain constant or change over time. The vehicle may experience varying loads due to variations in terrain or wind.

Figure 6A:
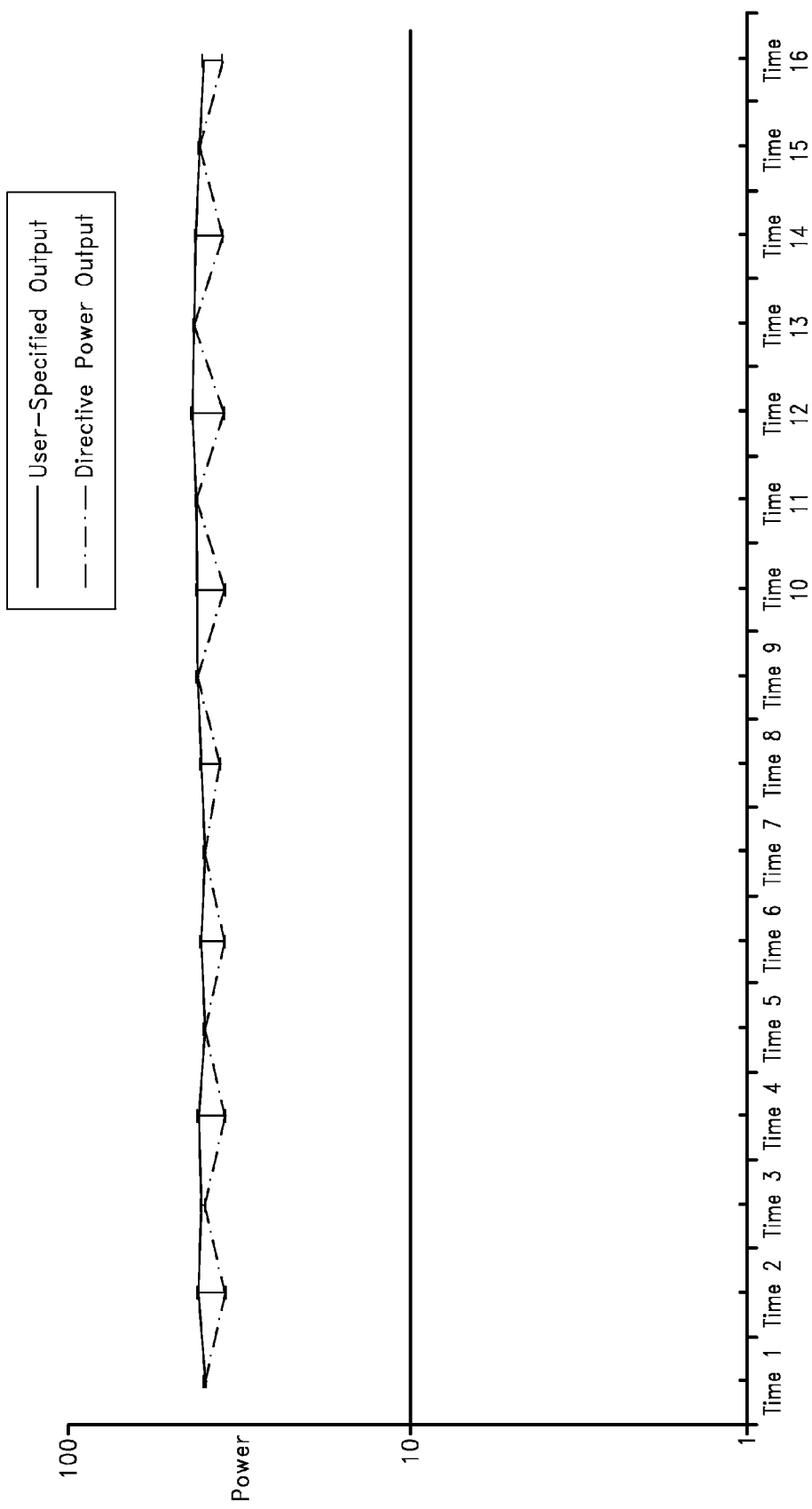
FIG. 6A is a graph that is useful for describing certain embodiments including application of a directive power output over time in comparison to a user-supplied input.

FIG. 6A is a graph that illustrates some embodiments including the use of torque/output power/acceleration as a determinant of efficiency in view of a substantially steady velocity that is maintained (or anticipated to be maintained), for example, during application of a cruise control input as a first, user-supplied function. As shown in the figure, the directive engine power output (shown by the dashed line) oscillates between being substantially equal to the user-specified function, and being below the user-specified engine power output (shown by the solid line). FIG. 6A also reflects certain embodiments where the directive power output has been smoothed, for instance with a binomial, Savitzky-Golay, moving, or other averaging process or algorithm that may make it difficult or even impossible for a user to detect that the directive power output is oscillating. An example using the moving average would simply replace each data value along the time line of the directive engine power output with the average of neighboring values. To avoid an unintended shift in the data, the neighboring values should be averaged using the same methodology.

Figure 6B:
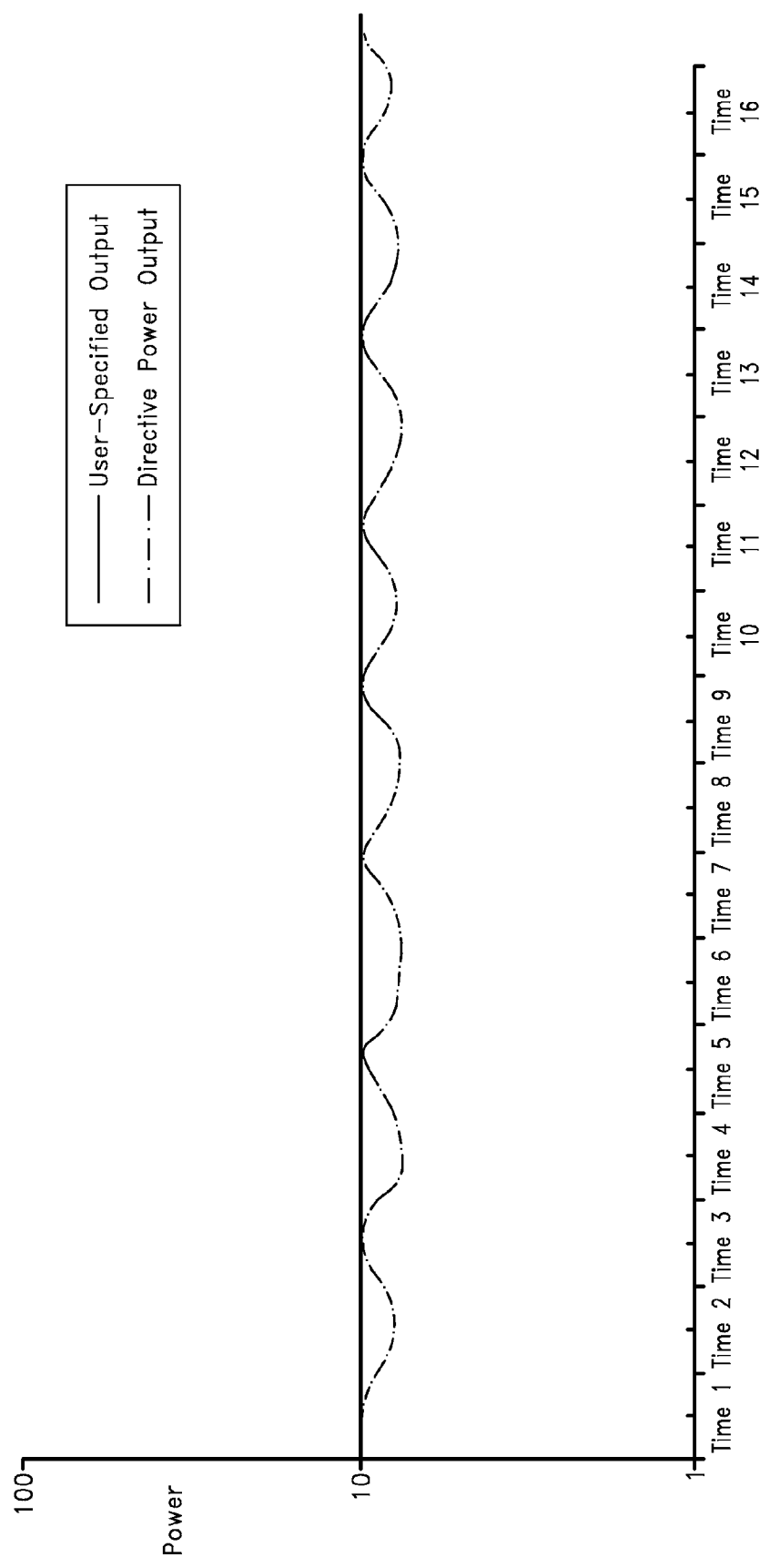
FIG. 6B is a graph that is useful for describing certain embodiments including application of a directive power output over time in comparison to a user-supplied input.

FIG. 6B is a graph that illustrates some embodiments similar to FIG. 6A. As shown in FIG. 6B, the constant C of the user-supplied function $F_1$ is lower than the constant C as illustrated in FIG. 6A. In certain embodiments, the momentum of a vehicle may be capitalized to maintain the vehicle at a desired velocity without having to utilize additional energy. This may be referred to as coasting. For example, the valleys of the directive engine power output may represent instances when the vehicle is coasting to save on energy consumption and yet, maintain a steady velocity (e.g., from cruise control). Less energy may be consumed because more time may be spent in a zone of efficiency for the engine. Furthermore, coasting may result in a reduced power input, which may translate into a decreased heat output of the engine resulting in a more efficient engine (e.g., less energy in the form of heat is lost). In such a case, air conditioning and other cooling requirements may be decreased or relaxed and may increase driver comfort. In certain embodiments, electrical energy from the electric motor may be applied to keep the vehicle at a desired velocity when the vehicle is consuming reduced energy (e.g., during a valley of the directive engine power output).

Figure 7A:
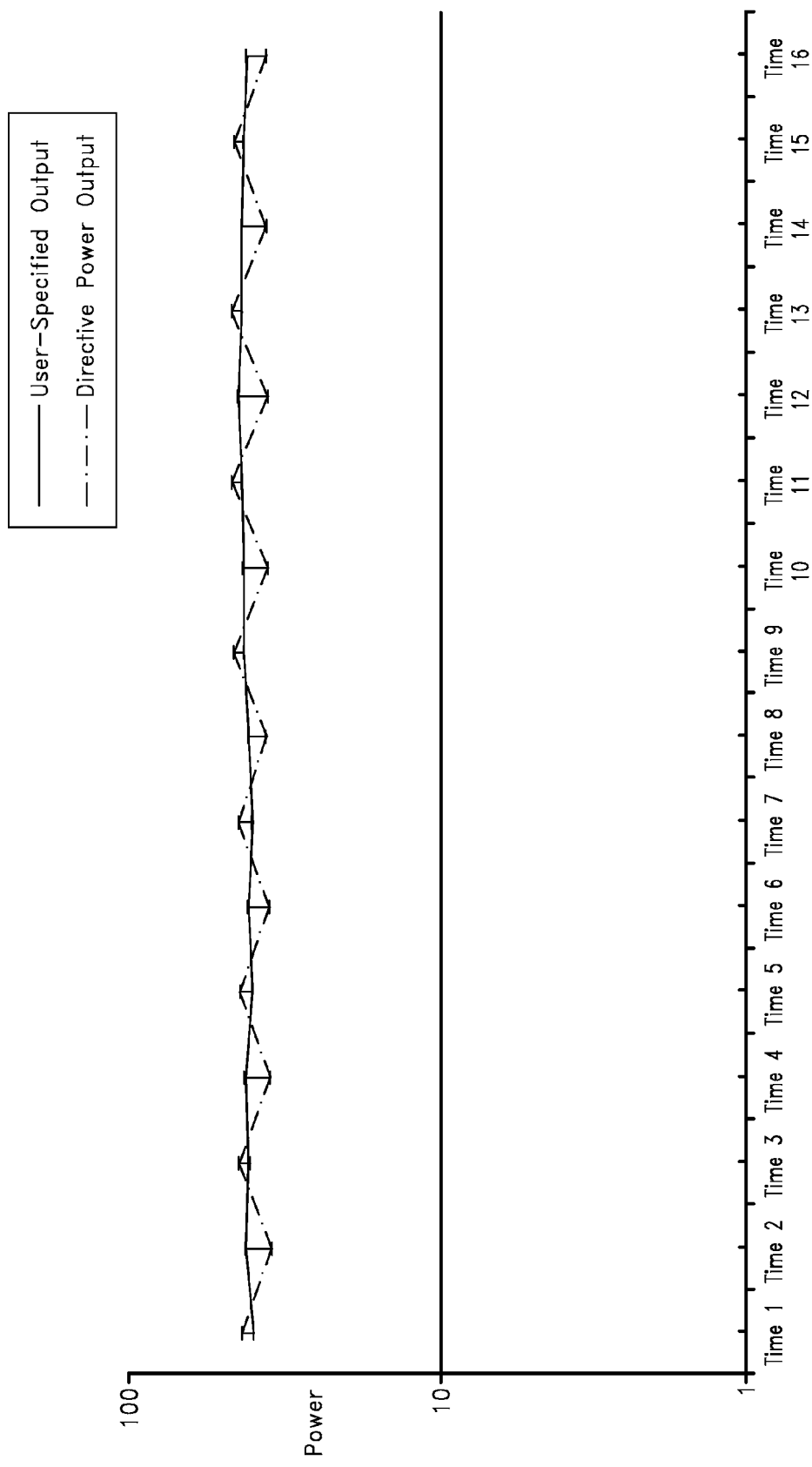
FIG. 7A is a graph that is useful for describing certain embodiments including application of a directive power output over time in comparison to a user-supplied input.
Figure 7B:
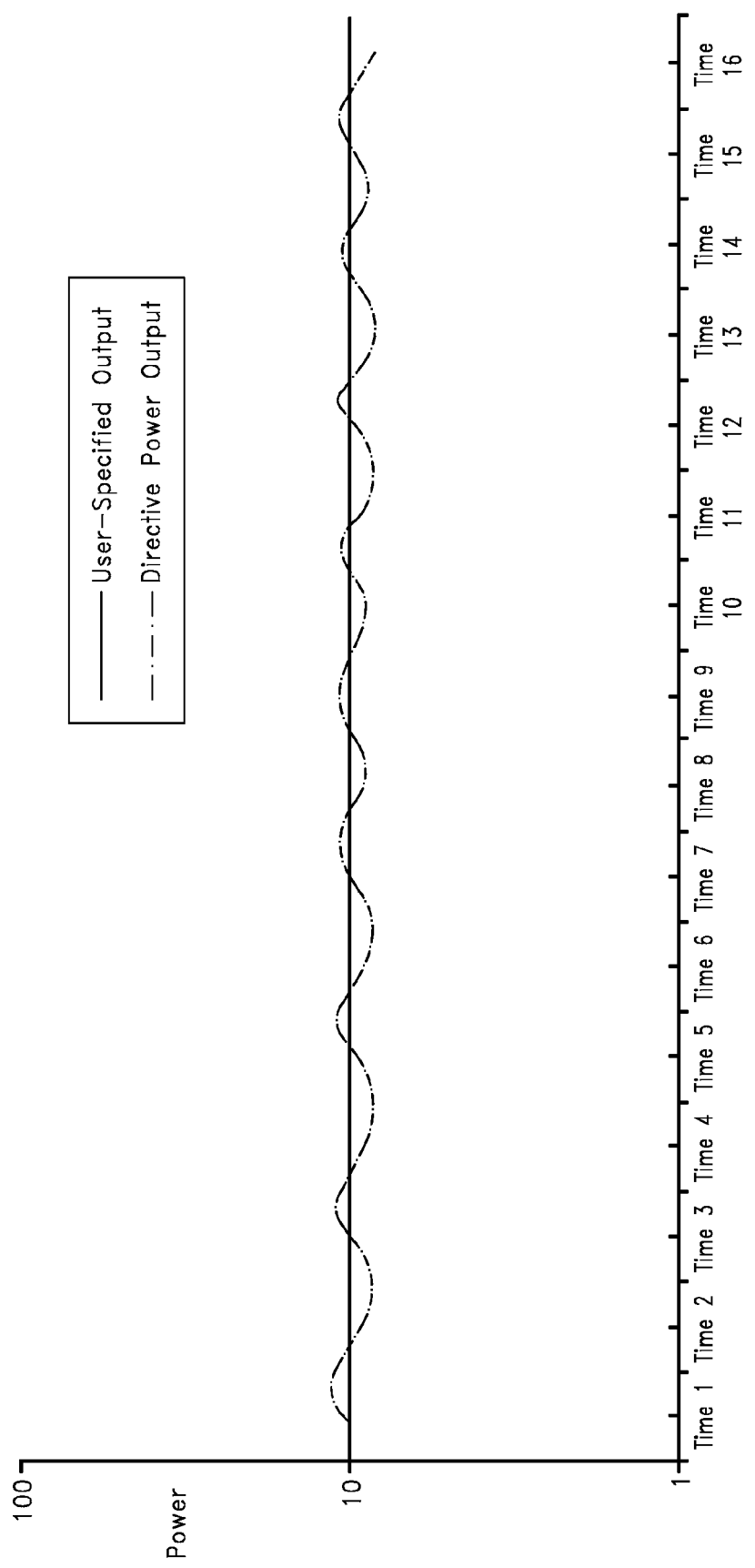
FIG. 7B is a graph that is useful for describing certain embodiments including application of a directive power output over time in comparison to a user-supplied input.

FIG. 7A is a graph that illustrates certain embodiments where the directive power output has been smoothed, for instance as described in relation to FIG. 6A, but wherein the directive power output is instructed to oscillate between slightly above the user-specified function to below the user-specified function. FIG. 7B is a graph that illustrates some embodiments similar to FIG. 7A. As shown in FIG. 7B, the constant C of the user-supplied function $F_1$ is lower than the constant C as illustrated in FIG. 7A. For example, FIG. 7B may illustrate an example where the vehicle may be traveling at a desired steady velocity. In some embodiments, the engine speed may be operating below a zone of efficiency. The directive engine power output may be controlled such that the engine speed can be increased above what would be needed to achieve the desired velocity (e.g., during a peak of the directive engine power output) to reach the zone of efficiency. Then the excess energy generated can be stored in and/or used to charge battery 20 (including the capacitor). When the directive engine power output is modulated such that the power output is decreased (e.g., during a valley of the directive engine power output), electrical energy from the battery 20 may be used (e.g., through the electric motor) to maintain the desired velocity of the vehicle. The changes in engine speed may be perceptible to a user. According to certain embodiments, electrical energy may be used to dampen or balance the modulation of the directive engine power output such that the modulation is not as perceptible to a user via supplemental output from an electric motor. In certain embodiments, the modulation of the directive engine power output may represent a repetition of acceleration followed by coasting to maintain the desired steady velocity. In some embodiments, electrical energy from an electric motor may not be needed to achieve the desired velocity.

In some embodiments, the subject technology may be applicable to a vehicle traveling at low velocities (e.g., city driving speeds below about 35 miles per hour). In some embodiments, the subject technology may be applicable to a vehicle traveling at high velocities (e.g., highway driving speeds above about 35 miles per hour). In some embodiments, other energy (e.g., electrical energy from an electric motor) may be used to supplement energy at either low or high velocities.

In certain embodiments, with respect to references to power and torque as used herein, power may be used instead of torque and vice versa. Those of skill in the art would understand that motors and/or engines may generate both torque and power as outputs. Thus, the reference to output, as used herein, may comprise torque and/or power. According to certain embodiments, the subject technology may be practiced with torque as an output, work as an output, or power as an output, without departing from the scope of the present invention. In some embodiments, torque may refer to the force used to rotate an object (e.g., tendency of force to rotate an object about an axis, fulcrum, or pivot). In some embodiments, power may refer to the work per unit time (e.g., rate at which work is performed, energy is transmitted, or the amount of energy needed or expended for a given unit of time).

In certain embodiments, the energy consuming devices referred to herein can include, without limitation, computer screens (e.g., cathode ray tube (CRT), liquid crystal display (LCD), plasma, or the like), televisions (e.g., high-definition televisions, CRT, LCD, plasma, or the like), personal computers, fans, phones, music players, cameras, clothes dryers, dishwashers, washing machines, electric ranges, home entertainment systems, lights, vacuum cleaners, lawn mowers, refrigerators, microwaves, pool filtration systems, heating systems (e.g., heating elements, blowers, and the like), air conditioning systems (e.g., compressors, blowers, and the like), water heating systems, water well pumps or other pumps, and other appliances. For the foregoing energy consuming devices, the energy conservation systems may or may not include one or more features disclosed above for the energy conservation systems used in connection with engines. For example, an energy conservation system for a clothes dryer may not need to include an accelerator pedal used to receive variable user input.

In certain embodiments, the energy consuming device may comprise devices that emit light, which may include without limitation devices that emit incandescent light and/or fluorescent light, and/or light emitting diodes (LED). In some embodiments, an energy conservation system is provided that can be configured to deliver energy to a light for a period of time, and then dampen and/or cut energy delivery for a period of time. For example, the energy can be delivered to the light and then dampen and/or cut the energy at about 50 times a second. In some embodiments, this cycle can be about 60 times a second, about 70 times a second, about 80 times a second, about 90 times a second, about 100 times a second, or about 110 times a second. In general, this may cause the light to flash on and off. Generally, people can see lights flashing on and off of up to about fifty flashes per second (50 Hertz (Hz)), and in particular, people may be most sensitive to time-varying illumination in the 10-25 Hz range. The actual critical flicker frequency can increase as the light intensity increases up to a maximum value, after which it starts to decrease. When energy is delivered and then dampened and/or cut to the light at a frequency of greater than or equal to about 50 Hz, people generally can no longer distinguish between the individual flashes of light. At this frequency or other similar frequency (e.g., about 45 Hz, 55 Hz, 60 Hz, or 65 Hz), a pulsed fusion threshold can be achieved where the flashes appear to fuse into a steady, continuous source of light while reducing the amount of energy consumed by the light. This energy conservation system can be applied to general household or office lights as well as backlight systems in LCD monitors or televisions, or in discrete light source systems for plasma displays or televisions. In certain embodiments, the energy conservation system for a light can be configured to deliver and then dampen and/or cut energy in a continuous cycle. In certain embodiments, the energy conservation system for a light can be configured to receive user input or input from some other source (e.g., power company, energy management entity, or the like) to adjust the cycle of energy delivery followed by energy dampening and/or cutting, thereby controlling the amount of energy used and/or conserved.

In certain embodiments, the energy consuming device can be a clothes dryer, dishwasher, washing machine, vacuum cleaner, refrigerator, microwave, pool filtration system, heating system (e.g., heating elements, blowers, and the like), air conditioning system (e.g., compressors, blowers, and the like), water well pump or other pump. For example, the energy conservation system can be configured to deliver energy to a clothes dryer for a period of time, and then dampen and/or cut energy delivery for a period of time (e.g., at about ten times a second). In some embodiments, this cycle can be between about 1 Hz and 120 Hz. Specifically, the energy conservation system can deliver gas and then dampen and/or cut delivery of gas used for generating heated air in order to dry clothes. In certain embodiments, an energy conservation system can also be configured to deliver electricity and then dampen and/or cut delivery of electricity used for spinning the clothes in a dryer and/or generating heated air. When electricity is dampened and/or cut to the motor used for spinning the clothes, the momentum in the spinning mechanism may cause the clothes to continue spinning even though the delivery of electricity to the motor has been dampened and/or cut for a period. When gas or electricity is dampened and/or cut to the heating element used for generating heated air, the residual heat in the dryer may continue to dry the clothes. Using this methodology, a pulsed efficiency threshold can be achieved where the clothes continue to spin and/or dry (e.g., due to momentum and/or residual heat) while reducing the amount of energy consumed by the dryer. The foregoing can also be true for other energy consuming devices, including but not limited to dishwashers, washing machines, vacuum cleaners, refrigerators, microwaves, pool filtration systems, heating systems (e.g., heating elements, blowers, and the like), air conditioning systems (e.g., compressors, blowers, and the like), water well pumps or other pumps.

Figure 8:
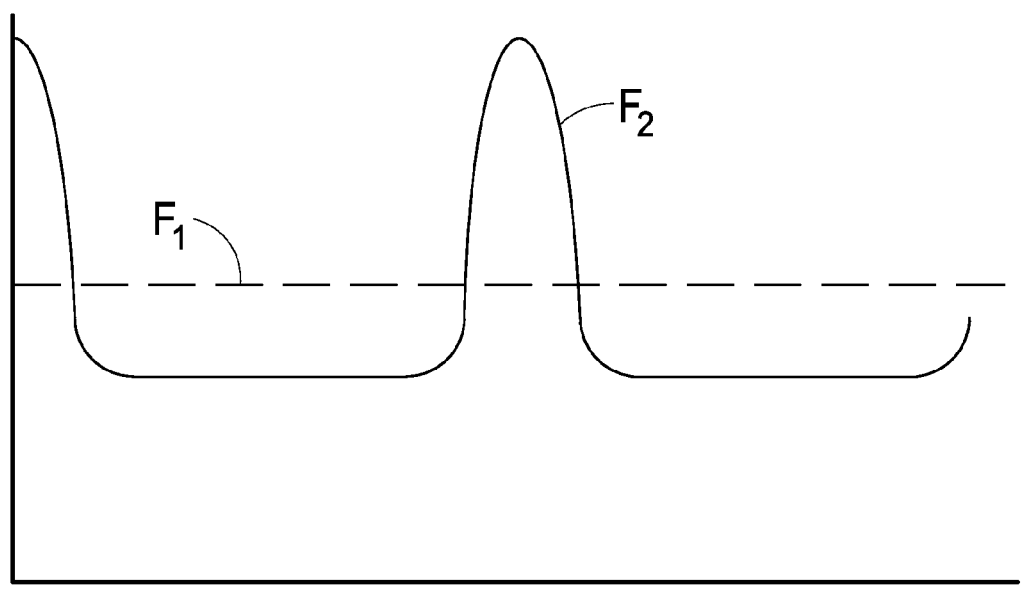
FIG. 8 is a graph that is useful for illustrating examples of a first function and a second function.

FIG. 8 is a graph that describes further examples of the first function $F_1(n)$ and the second function $F_2(n)$, in accordance with various embodiments of the subject technology. In this graph, the first function $F_1(n)$ is illustrated as dotted lines and the second function $F_2(n)$ is illustrated as a solid line. According to certain embodiments, processing the first function into the second function comprises application of a transform T, such that $F_2(n)=T\,F_1(n)$, where T comprises $ke^{-2\pi i\Omega(n-d)}\_Z$, as described above. In some embodiments, processing the first function into the second function comprises application of a transform T, such that $F_2(n)=T+F_1(n)$, where T is of a the form of a discrete Fourier series, comprising:

$$\frac{a_0}{2} + \sum_{j=1}^{\infty} [a_j\cos(j2\pi\Omega n) + b_j\sin(j2\pi\Omega n)]$$

In some embodiments, j is an ordered index number, where $$j\in\{1,2,\ldots\infty\}.$$

In some embodiments, $a_0$ is a real number. In some embodiments, $a_j$ is a series of real numbers. Each $a_j$ can be a real number scalar (e.g., a one-dimensional vector). For example, each $a_j$ can be a constant. In some embodiments, $b_j$ is a series of real numbers. Each $b_j$ can be a real number scalar (e.g., a one-dimensional vector). For example, each $b_j$ can be a constant. $\Omega$ is a frequency in cycles per sample interval. According to certain embodiments, by applying the transform T, the shape of the second function $F_2(n)$ as shown in FIG. 8 can be achieved. In some embodiments, the second function $F_2(n)$ may comprise narrow peaks and gradually formed valleys. However, other suitable shapes of the second function $F_2(n)$ can be achieved using the transform T.

Figure 9:
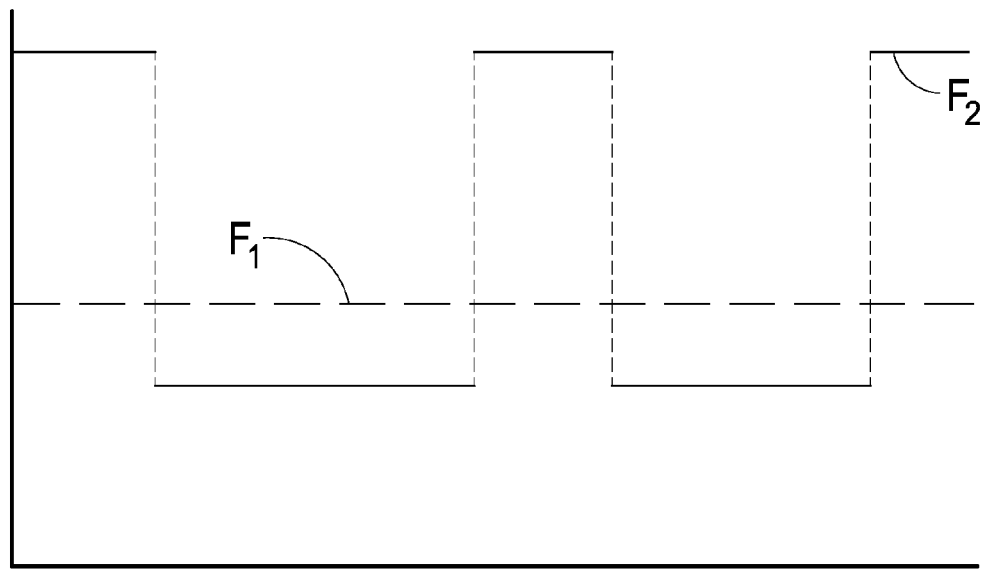
FIG. 9 is a graph that is useful for illustrating examples of a first function and a second function.

FIG. 9 is a graph that describes further examples of the first function $F_1(n)$ and the second function $F_2(n)$, in accordance with various embodiments of the subject technology. In this graph, the first function $F_1(n)$ is illustrated as dotted lines and the second function $F_2(n)$ is illustrated as a solid line. According to certain embodiments, processing the first function into the second function comprises application of a transform T, such that $F_2(n)=T+F_1(n)$, where T comprises:

$$\begin{cases} q, \text{ when } n = s_1 \\ r, \text{ when } n = s_2 \end{cases}$$

In some embodiments, q is a scalar. q can be a real number scalar (e.g., a one-dimensional vector). For example, q can be a constant. In some embodiments, r is a scalar different from q. r can be a real number scalar (e.g., a one-dimensional vector). For example, r can be a constant. In some embodiments, $s_1$ is a first set of samples of n and $s_2$ is a second set of samples of n different from $s_1$. In some embodiments, members of the first set of samples alternate with members of the second set of samples. According to certain embodiments, the weighted average of $F_2(n)$ over $s_1+s_2$ is approximately equal to the weighted average of $F_1(n)$ over $s_1+s_2$. In some embodiments, q is greater than or equal to 0 and r is less than 0. In some embodiments, q is greater than 0 and r is less than or equal to 0. In some embodiments, q is greater than 0 and r is less than 0.

According to certain embodiments, by applying the transform T, the shape of the second function $F_2(n)$ as shown in FIG. 9 can be achieved. In some embodiments, the second function $F_2(n)$ may form a square wave having values greater than $F_1(n)$ and/or values less than $F_1(n)$. However, other suitable shapes of the second function $F_2(n)$ can be achieved using the transform T.

According to various embodiments of the subject technology, an automated system is provided for converting a device's demand for energy into a pulsed signal. For example, the automated system may be a pulsed cruise system that may convert a driver's continuous demand for engine power into a pulsed signal to the engine. Manual hypermiling may serve as an informal validation of the pulsed cruise system. In some embodiments, the pulsed cruise system is not a driver training aid and does not require substantial vehicle integration unlike conventional driver assistance systems. In some embodiments, the pulsed cruise system comprises an active fuel savings device that can dynamically control the consumption of fuel without user intervention. The pulsed cruise system is practical and safe compared to traditional hypermiling. In some embodiments, the pulsed cruise system may comprise systematic modulation of the throttle for fuel savings, with the benefit of essentially imperceptible speed variation. In some embodiments, the pulsed cruise system may comprise automated micro-hypermiling.

According to certain embodiments, a test setup was implemented to generate validation data for the pulsed cruise system. For the test setup, experimental equipment was used. The experimental equipment comprised a General Motors Ecotec Engine (2010 LE5 2.4 liter) configured to simulate a Chevy HHR. The experimental equipment also comprised an engine dynamometer in torque mode, which simulated road load torque and measured the performance of power and torque in addition to fuel economy (e.g., from brake specific fuel consumption).

Figure 10:
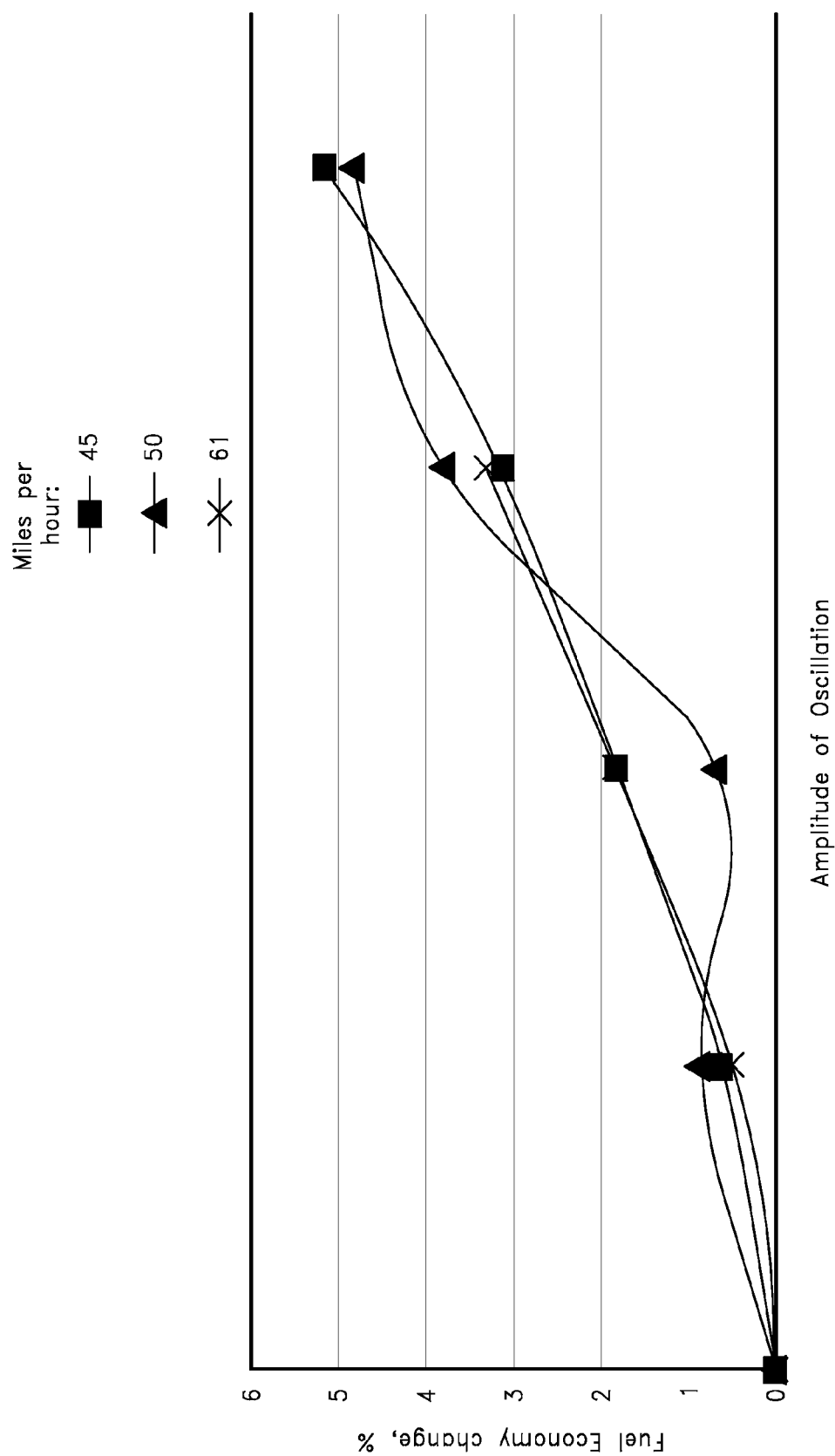
FIG. 10 illustrates validation data results from a test setup.
Figure 11:
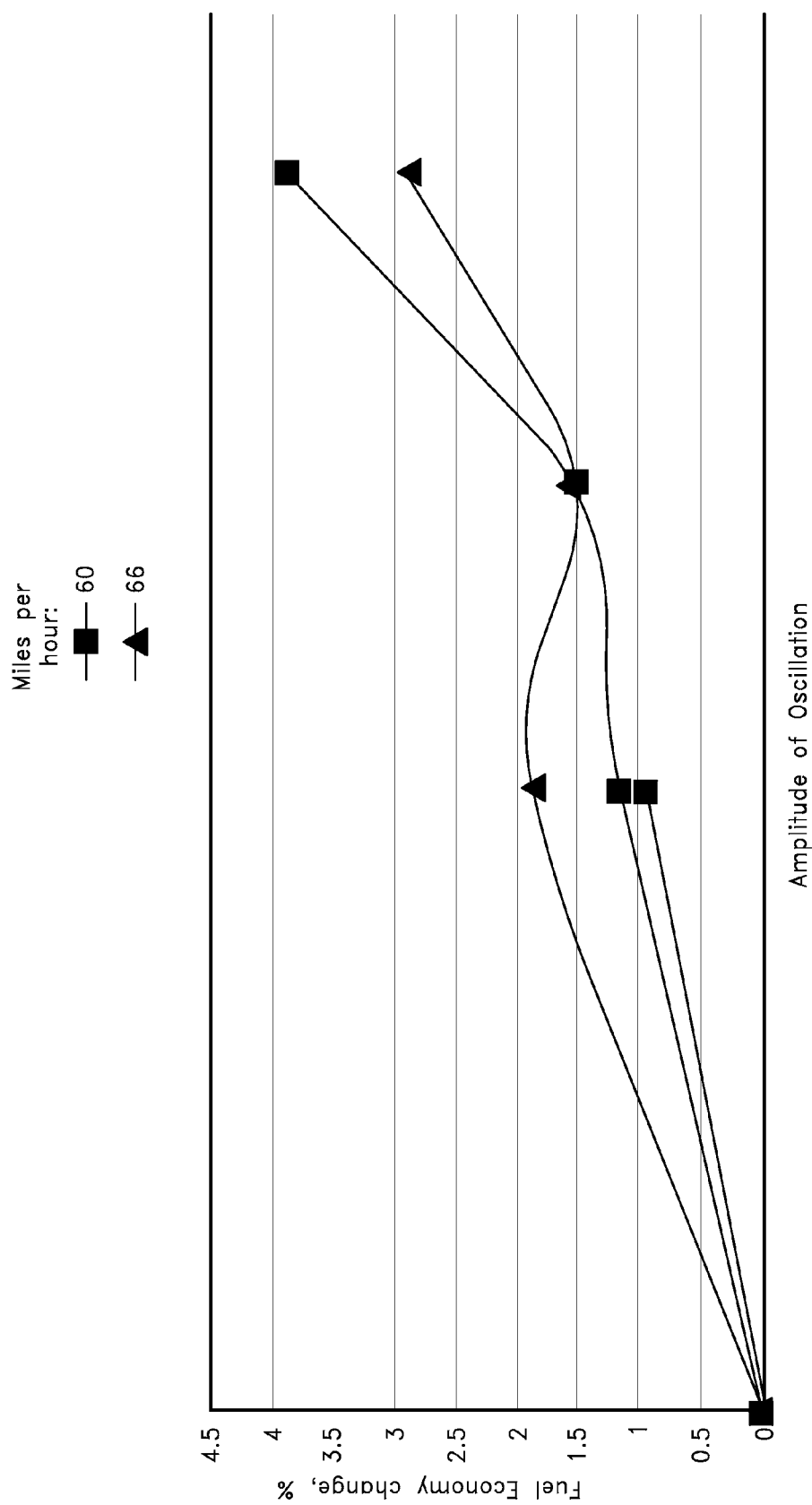
FIG. 11 illustrates validation data results from a test setup.

FIG. 10 illustrates validation data results from the test setup, in accordance with various embodiments of the subject technology. In particular, FIG. 10 is a graph that illustrates pulsed cruise fuel efficiency improvements in fourth gear. In the test setup, the pulsed cruise system increased fuel economy by up to five percent. However, the test setup may be optimized to achieve an even greater amount of savings in fuel. In this particular test setup, the best fuel economy gains were achieved in the fourth gear, as shown in FIG. 10. According to certain embodiments, it can be seen from FIG. 10 that the larger the amplitude of oscillation, the better the improvement in efficiency. FIG. 11 illustrates validation data results from the test setup, in accordance with various embodiments of the subject technology. In particular, FIG. 11 is a graph that illustrates pulsed cruise fuel efficiency improvements in the fifth gear. In the test setup, the pulsed cruise system increased fuel economy by up to four percent in the fifth gear, as shown in FIG. 11.

According to various aspects of the subject technology, the pulsed cruise system may increase fuel economy by periodically operating the engine in a more efficient state and storing kinetic energy from that state. The system may then subsequently release the stored kinetic energy while the engine is operating less efficiently, thereby relieving the engine workload and consequently increasing fuel economy. Using a similar concept, energy savings may be achieved with other devices as noted herein (e.g., display screens, computers, electronics, appliances, air conditioning systems, heating systems, pump systems, light emitters, etc.).

Figure 12:
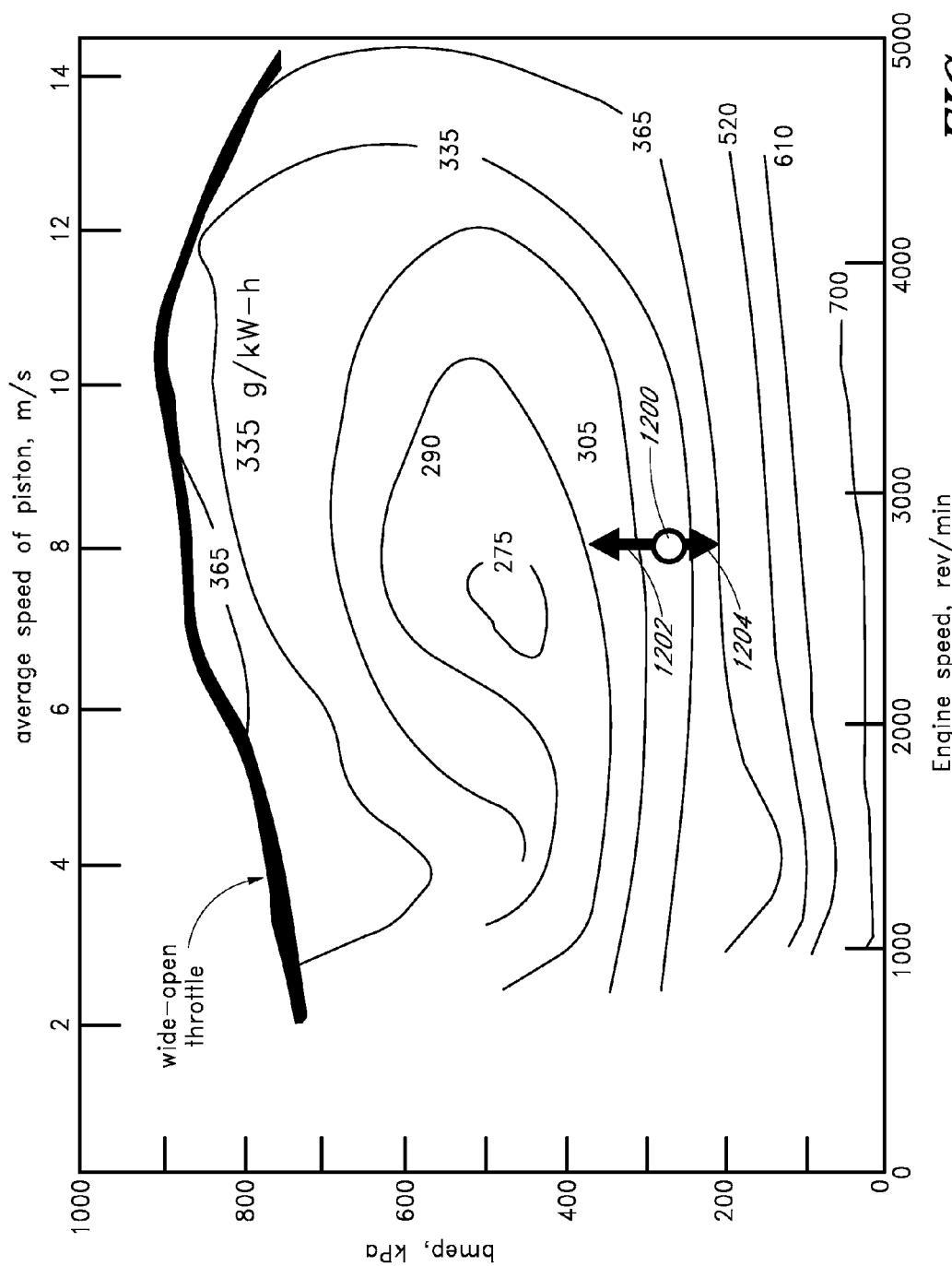
FIG. 12 is a graph illustrating the performance of a simulated engine.

FIG. 12 is a graph illustrating the performance of a simulated engine, in accordance with various embodiments of the subject technology. In particular, FIG. 12 illustrates the engine's brake mean effective pressure (BMEP) relative to the engine speed and relative to the average speed of one or more pistons of the engine. For example, point 1200 represents a vehicle having the simulated engine, with the vehicle traveling in fifth gear at 2800 revolutions per minute (RPM) for the engine speed. In some embodiments, arrow 1202 represents the pulsed cruise system briefly increasing the engine's BMEP. In some embodiments, arrow 1204 represents the pulsed cruise system briefly releasing the throttle. In the area of arrow 1204, the engine is providing only a portion of the load, with the remainder provided by the stored kinetic energy generated by the brief increase in BMEP, as represented by arrow 1202.

According to various embodiments of the subject technology, an example of an implementation of the pulsed cruise system is presented below:

$$\text{Displacement}_{Engine} := 2.4 \cdot l$$

$$N_{Engine} := 2500 \cdot rpm$$

$$BMEP_{WOT} := 870 \cdot kPa$$

$$z := 2 \cdot rev$$

$$\text{Power}_{Brake}(bmep) := \frac{\text{Displacement}_{Engine} \cdot N_{engine} \cdot bmep}{z}$$

$$time_{SS} := 4 \cdot sec$$

$$time_{Dip} := time_{SS} - time_{Blip}$$

$$(time)_{Blip} := 1.25 \cdot sec$$

$$time_{Dip} := 2.75 \, s$$

$$BMEP_{Blip} := 1.50 \cdot kPa$$

$$BMEP_{Dip} := 75 \cdot kPa$$

$$BMEP_{SS} := 100 \cdot kPa$$

$$\frac{BMEP_{Blip}}{BMEP_{WOT}} = 0.172$$

$$\frac{BMEP_{Dip}}{BMEP_{WOT}} = 0.086$$

$$\frac{BMEP_{SS}}{BMEP_{WOT}} = 0.115$$

$$BP_{Blip} := \text{Power}_{Brake}(BMEP_{Blip})$$

$$BP_{Blip} := 7.5 \cdot kW$$

$$BP_{Dip} := \text{Power}_{Brake}(BMEP_{Dip})$$

$$BP_{Dip} := 3.75 \cdot kW$$

$$BP_{SS} := \text{Power}_{Brake}(BMEP_{SS})$$

$$BP_{SS} := 5 \cdot kW$$

$$BSFC_{Blip} := 520 \cdot \frac{gm}{kW \cdot hr}$$

-continued $$BSFC_{Dip} := 615 \cdot \frac{gm}{kW \cdot hr}$$

$$BSFC_{SS} := 610 \cdot \frac{gm}{kW \cdot hr}$$

$$Energy_{SS} := BP_{SS} \cdot time_{SS}$$

$$Energy_{SS} := 2 \times 10^4 \text{ J}$$

$$Energy_{Blip} := BP_{Blip} \cdot time_{Blip}$$

$$Energy_{Blip} := 9.375 \times 10^3 \text{ J}$$

$$Energy_{Dip} := BP_{Dip} \cdot time_{Dip}$$

$$Energy_{Dip} := 1.031 \times 10^4 \text{ J}$$

$$Energy_{Dither} := Energy_{Blip} + Energy_{Dip}$$

$$Energy_{Dither} := 1.969 \times 10^4 \text{ J}$$

$$FuelUsed_{Blip} := BSFC_{Blip} \cdot BP_{Blip} \cdot time_{Blip}$$

$$FuelUsed_{Blip} := 1.354 \cdot gm$$

$$FuelUsed_{Dip} := BSFC_{Dip} \cdot BP_{Dip} \cdot time_{Dip}$$

$$FuelUsed_{Dip} := 1.762 \cdot gm$$

$$FuelUsed_{SS} := BSFC_{SS} \cdot BP_{SS} \cdot time_{SS}$$

$$FuelUsed_{SS} := 3.389 \cdot gm$$

$$\frac{FuelUsed_{SS}}{FuelUsed_{Blip} + FuelUsed_{Dip}} = 1.088 \text{ about 9\% better fuel economy}$$

As shown in the foregoing example, a nine percent improvement in fuel economy is achieved. However, the pulsed cruise system can be optimized such that a greater improvement in fuel economy can be achieved.

Figure 13:
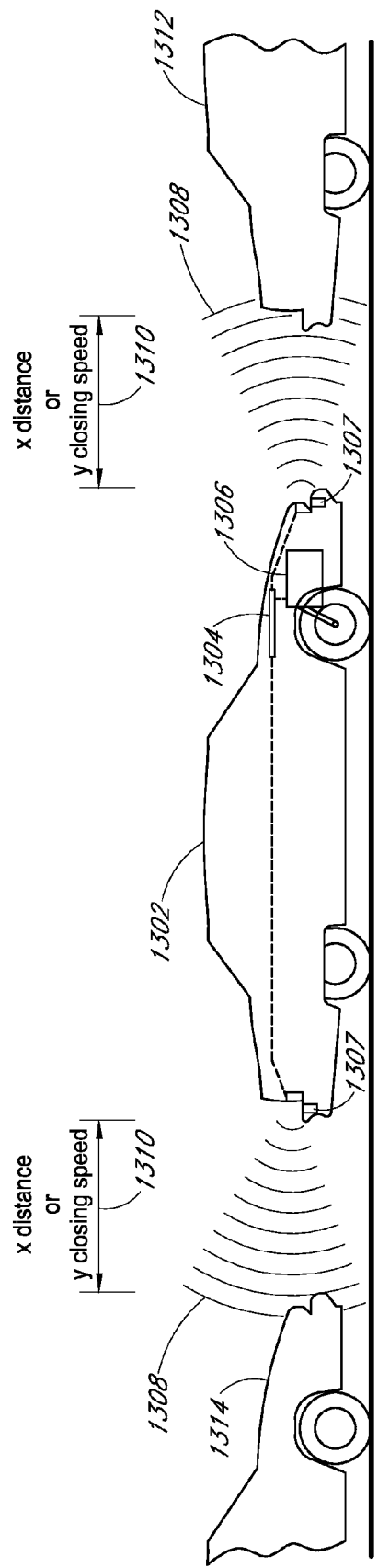
FIG. 13 illustrates an embodiment with object sensors.

FIG. 13 illustrates an embodiment of the fuel conservation system 1304 of a vehicle 1302 connected to object sensors 1307. The object sensors 1307 can detect a position and a change in position of nearby objects, such as for example, nearby vehicles 1312, 1314 as discussed herein. As used herein, the term "vehicle" is a broad term that can refer to automobiles, trucks, tractor trailers, planes, jets, trains, boats, ships, and the like. The fuel conservation system 1304 can be connected to an engine 1306 of the vehicle 1302. In some embodiments, the object sensors 1307 can be a radar LIDAR, camera system 1308 and/or other real-time distance measuring system. The radar, LIDAR, and/or camera system 1308 can have sensors in the front, behind, and/or sides of the vehicle 1302. Generally, a radar system can use electromagnetic waves (such as radio waves or microwaves) to determine distance, range, altitude, direction, and/or speed of moving and/or fixed objects. As an example, the radar system can monitor the position and change in position between the vehicle 1302 and a vehicle in front 1312 and a vehicle behind 1314. When the front vehicle 1312 slows down or is too close, the radar system can automatically activate the brakes to slow the vehicle 1302. When the front vehicle 1312 slows down or is too close, the fuel conservation system 1304 can modify, vary, decrease, and/or increase the frequency, amplitude, and/or waveform of the directive power of the second, or the fuel conservation system 1304 can be deactivated, thereby allowing transmission of the user-specified power output, as discussed herein. When the radar system no longer senses the car in front, the radar system automatically releases the brakes and allows the vehicle 1302 to accelerate to the driver's desired speed. Other examples of radar use include applications such as air traffic control (including aircraft anti-collision systems), nautical radars (to locate landmarks and other ships), air-defense and antimissile systems, etc.

A LIDAR system can function similarly to a radar system. A LIDAR can monitor the position and change in position of an object. Generally, a LIDAR system can use ultraviolet, visible, or near infrared light (such as laser, which can be visible or invisible to the human eye) to illuminate the target/nearby object. A LIDAR system can also be used in surveying and creating elevation maps.

A camera can be used in conjunction with the radar and/or LIDAR systems. The camera can help distinguish between moving and stationary objects, enhancing the reliability of radar and/or LIDAR systems. In some embodiments, the camera can be helpful for radar systems that have a narrow field-of-view of side objects compared to a camera's wider field-of-view.

In some embodiments, a radar system and a LIDAR system can be used together because of their complementary working ranges and/or for redundancy. The radar can have a narrow but long working range. The laser of a LIDAR system can have a wide but short working range. In some embodiments, the radar system and the LIDAR system can provide redundant information to help ensure system integrity. In some embodiments, the radar system and the LIDAR system can fill in blind spots of the complementary system.

Referring to FIG. 13, in some embodiments, the radar LIDAR, and/or camera system 1308 can detect the position and change in position of nearby object, such as vehicles in front 1312, side, and/or behind 1314. A position and change in position of a nearby object can be a distance X 1310 to the vehicle 1302 and/or closing speed Y 1310 relative to the vehicle 1302, respectively. When the radar, LIDAR, and/or camera system 1308 detects thresholds of a distance less than X and/or a closing speed greater than Y 1310, the fuel conservation system 1304 can transmit a directive power output of the engine 1306 that corresponds to a user-specified input as discussed herein. In some embodiments, the fuel conservation system 1304 can engage a kill switch or kill switch step 305 of FIG. 3. The term "kill switch" as used herein is a broad term that can refer to switches that activate/deactivate, engage/disengage, or turn on/off the fuel conservation system 1304. In some embodiments, when the radar, LIDAR, and/or camera system 1308 detects thresholds of a distance less than X and/or a closing speed greater than Y 1310, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output.

In some embodiments, the radar, LIDAR, and/or camera system 1308 can have intricate control logic for determining distance and/or closing speed, which can vary depending on driving conditions. A safe traveling distance X can range from 5 feet to 5,000 feet, depending on the environment and vehicle type. For example, for ground vehicles, the safe traveling distance can be closer to 5 feet; however, for aircraft, the safe traveling distance can be closer to 2000 feet. Closing speeds can also vary greatly depending on the traveling conditions and vehicle type where Y can be 0.3 ft./sec. to 3,000 ft./sec. These foregoing thresholds are examples and can vary depending on user preference, variable inputs, and/or other control parameters.

When the fuel conservation system 1304 modifies, varies, decreases, and/or increases the frequency, amplitude, and/or waveform of the directive power of the second function, or the fuel conservation system 1304 is deactivated, thereby allowing transmission of the user-specified power output, based on radar, LIDAR, and/or camera system 1308 input, the engine 1306 can generate up to the maximum output in case of a need for acceleration (and/or significant acceleration) (for example, avoiding a rear end from a vehicle behind 1314). In some embodiments, acceleration corresponding up to maximum output can be between about 3 to about 20 feet per square second for an automobile. In some embodiments, acceleration corresponding up to maximum output can be about 3 to about 30 feet per square second for an airplane.

In some embodiments, the fuel conservation system 1304 can accommodate lower levels of acceleration (slow acceleration) without modifying, varying, decreasing, and/or increasing the frequency, amplitude, and/or waveform of the directive power of the second function, or deactivating the fuel conservation system 1304, thereby allowing transmission of the user-specified power output. A lower level acceleration threshold can vary depending on user preference, variable inputs, and/or other control parameters. In some embodiments, lower levels of acceleration can be between about 0.3 to about 15 feet per square second for an automobile. In some embodiments, lower levels of acceleration can be between about 0.3 to about 20 feet per square second for an airplane. Thus, the fuel conservation system 1304 can have different acceleration versus "significant" acceleration thresholds that can control when and/or how the fuel conservation system 1304 is active.

An acceleration (and/or significant acceleration) threshold and/or driver signal indicative of desired acceleration can be defined as when acceleration is greater than A % change per unit C of time. For example, when the acceleration pedal position changes at a rate A % greater than about 10% to about 90% in time C of about 0.2 to about 2 seconds, the fuel conservation system can modify, vary, decrease, and/or increase the frequency, amplitude, and/or waveform of the directive power of the second function, or the fuel conservation system 1304 can be deactivated, thereby allowing transmission of the user-specified power output. In some embodiments, the fuel conservation system 1304 can monitor accelerator pedal position as discussed herein. The acceleration threshold can be defined as more than about 10% to about 90% from a minimum to a maximum of a range of accelerator pedal positions. In some embodiments, the fuel conservation system 1304 can monitor brake pedal position.

A brake pedal threshold can function similarly to an acceleration threshold where the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output. The brake pedal threshold can be defined as more than about 10% to about 90% from a minimum to a maximum of a range of brake pedal positions. Further, a signal indicative of desired braking can be the brake pedal position changing at a rate B % greater than about 10% to about 90% in time C of about 0.2 to about 2 seconds, where the fuel conservation system can modify, vary, decrease, and/or increase the frequency, amplitude, and/or waveform of the directive power of the second function, or the fuel conservation system 1304 can be deactivated, thereby allowing transmission of the user-specified power output.

The braking system can achieve increased or maximum braking in case of a need for deceleration (and/or significant deceleration) without RPM oscillations observed in some engines, as discussed herein. An example of a need for maximum braking can include avoiding rear ending the front vehicle 1312.

In some embodiments, the fuel conservation system 1304 can accommodate some lower levels of deceleration without deactivating or disengaging the system. In some embodiments, the fuel conservation system 1304 will continue to operate during low levels of deceleration and/or coasting. The fuel conservation system 1304 can reduce the amplitude and/or extend frequency cycle of the directive power during low level deceleration and/or coasting in order to reduce engine oscillation and/or to increase ride quality. An example of a lower level of deceleration can include decreasing vehicle speed, but not bringing the vehicle 1302 to a complete stop. The deceleration threshold where the fuel conservation system 1304 modifies, varies, decreases, and/or increases the frequency, amplitude, and/or waveform of the directive power of the second function, or the fuel conservation system 1304 is deactivated, thereby allowing transmission of the user-specified power output, can vary depending on user preference, variable inputs, and/or other control parameters. The fuel conservation system 1304 can have different deceleration versus "significant" deceleration thresholds that control when and/or how the fuel conservation system 1304 is active. An example deceleration threshold is brake pedal position as discussed herein. Another example is vehicle sensors that can monitor the rate of deceleration of the vehicle 1302 as discussed herein.

In some embodiments, when the fuel conservation system 1304 is engaged during deceleration or low loads (for example, coasting downhill or when momentum is mainly propelling the vehicle forward), it has been observed that some engines may noticeably oscillate the revolutions per minute (RPM) due to the second function. In some embodiments, braking can override the throttle and decrease engine load. Low loads can also include idling (disengaging the engine) or other low demands on engine output, which can vary depending on the vehicle. To prevent such oscillations, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, during deceleration (or significant deceleration) or low loads.

Figure 14:
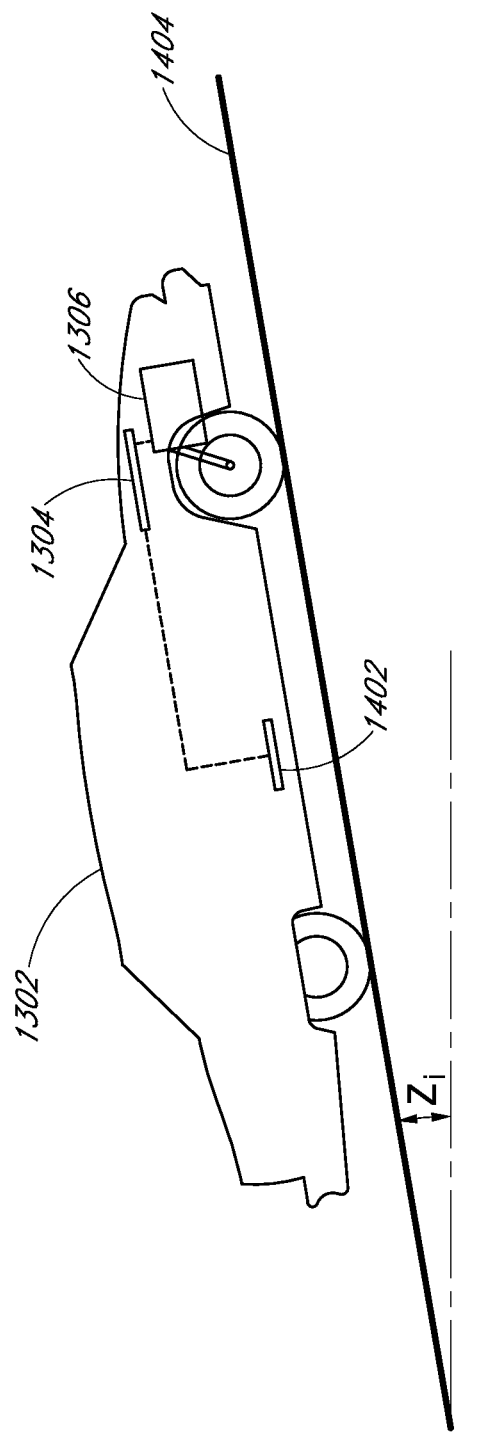
FIG. 14 illustrates an embodiment with a level sensor on an incline road.

FIG. 14 illustrates an embodiment of the fuel conservation system 1304 of the vehicle 1302 connected to a level sensor 1402. The level sensor can be located anywhere on the vehicle that allows for proper function of the level sensor. Proper function can include detecting the gradient orientation of the vehicle 1302 and consequently, a gradient of a road 1404 being traveled on by the vehicle 1302. An example of a level sensor 1402 is liquids or fluidized solids that become level in their containers due to the pull of gravity. The level sensor 1402 then compares the level of the liquid or fluidized solid with the level of the vehicle 1302 to determine the incline gradient of the road 1404 being traveled on by the vehicle 1302.

In some embodiments, when the incline gradient is greater than a threshold $Z_i$, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output. With a modified, decreased, and/or increased the frequency, amplitude, and/or waveform of the directive power of the directive power of the second, or a deactivated fuel conservation system 1304, thereby allowing transmission of the user-specified power output, the engine 1306 can generate up to the maximum power output to sustain the momentum of the vehicle 1302. The range of $Z_i$ can vary depending on the driving conditions, vehicle weight, and/or engine power. $Z_t$ can range from 1 degree to 60 degrees.

Figure 15:
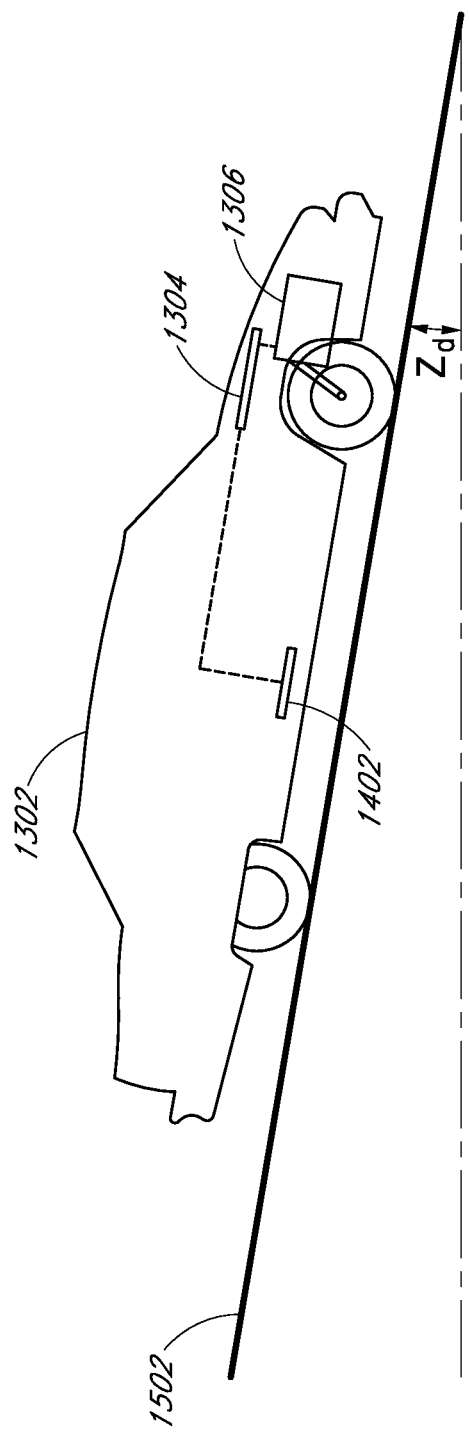
FIG. 15 illustrates an embodiment with a level sensor on a decline road.

FIG. 15 illustrates another embodiment the fuel conservation system 1304 of vehicle 1302 connected to a level sensor 1402. The level sensor 1402 can detect a decline gradient of a road 1502 being traveled on by the vehicle 1302. When the decline gradient is greater than a threshold $Z_d$, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output. Downhill driving can involve periods of low/reduced engine loads where the potential energy of the vehicle 1302 primarily sustains the momentum of the vehicle 1302. As discussed herein for some embodiments, when the fuel conservation system 1304 is engaged during low/reduced engine loads, it has been observed that the oscillation of some engines from the second function, and corresponding oscillation of vehicle 1302 momentum, can be more pronounced. The oscillations of the engine and vehicle 1302 momentum can be negated by modifying, varying, decreasing, and/or increasing the frequency, amplitude, and/or waveform of the directive power of the second function, or deactivating the fuel conservation system 1304, thereby allowing transmission of the user-specified power output.

Figure 16:
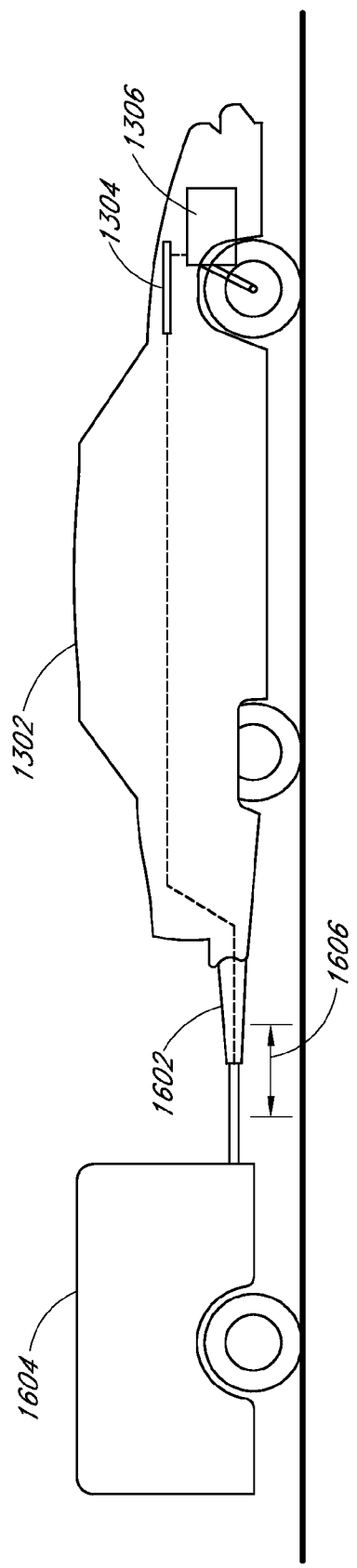
FIG. 16 illustrates an embodiment with a shock hitch system.

FIG. 16 illustrates an embodiment of the fuel conservation system 1304 of the vehicle 1302 connected to a shock hitch system 1602. The shock hitch system 1602 can be an active and/or passive mechanism. In some embodiments, the shock can be pneumatic or hydraulic, such as, for example, magnetrheological shock. An active shock hitch system can decrease the shock range of travel 1606 and/or increase the resistance force to help prevent lurching of the trailer 1604 when the shock hitch system 1602 senses a change in relative momentum between the vehicle 1302 and trailer 1604. For example, an active shock system can be a pneumatic piston that changes the resistance to motion based on axial shocks due to changes in relative momentum. In some embodiments, the shock can pre-compress or pre-release the shock to compensate or dampen motion of the trailer 1604 relative to the vehicle 1302.

A passive shock hitch system can also help prevent lurching by dampening change in momentum of the trailer 1604, but it might not actively alter the shock range of travel 1606 and/or increase the resistance force depending on the change in relative momentum. For example, a passive hitch system can be connecting members that are joined by a resilient membrane, such as rubber or springs, which resists axial shocks due to changes in relative momentum.

Whether the shock hitch system 1602 is active or passive, the shock hitch system 1602 can detect the momentum of the trailer 1604. When the momentum or motion of the trailer 1604 is different or changing relative to the vehicle's 1302 momentum or motion, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output. The fuel conservation can monitor the relative momentum of the trailer 1604 based on a speed of the trailer 1604 relative to the vehicle 1302. The fuel conservation system 1304 can alter second function or deactivate as discussed herein when the fuel conservation system 1304 detects a speed of the trailer 1604 relative to the vehicle 1302 greater than about 0.5 to about 10 miles per hour. With a modified, decreased, and/or increased the frequency, amplitude, and/or waveform of the directive power of the second function, or a deactivated fuel conservation system 1304, thereby allowing transmission of the user-specified power output, the engine 1306 can produce up to the maximum power output or in some engines, not oscillate during low loads. When the relative momentum of the trailer 1604 is decreasing and/or lower relative to the vehicle 1302, the power demand on the engine 1306 can be increased or at a maximum in order to pull the trailer. When the relative momentum of the trailer 1604 is increasing and/or higher relative to the vehicle 1302, the power demand on the engine 1306 can be less for pulling the trailer 1604. As discussed herein, some engines experience increased oscillations during low loads, which can include reduced engine power demand while pulling the trailer 1604 that has a higher relative momentum at the moment relative to the vehicle 1302.

In some embodiments, a fuel conservation system 1304 with a trailer 1604 attached to a trailer shock hitch system 1602 can further increase fuel economy over the just the fuel conservation system 1304 alone because the vehicle 1302 with a trailer 1604 becomes heavier. In some embodiments, heavier vehicles can accommodate larger amplitudes and/or smaller frequencies of directive power from the second function without a driver and/or user being aware of the engine oscillations due to the directive power. Larger amplitudes and/or smaller frequencies of directive power from the second function can achieve greater fuel efficiency. Thus, the fuel conservation system 1304 can achieve greater relative fuel efficiency with heavier loads such as a vehicle 1302 and a trailer 1604 connected together by a trailer shock hitch system 1602.

Figure 17:
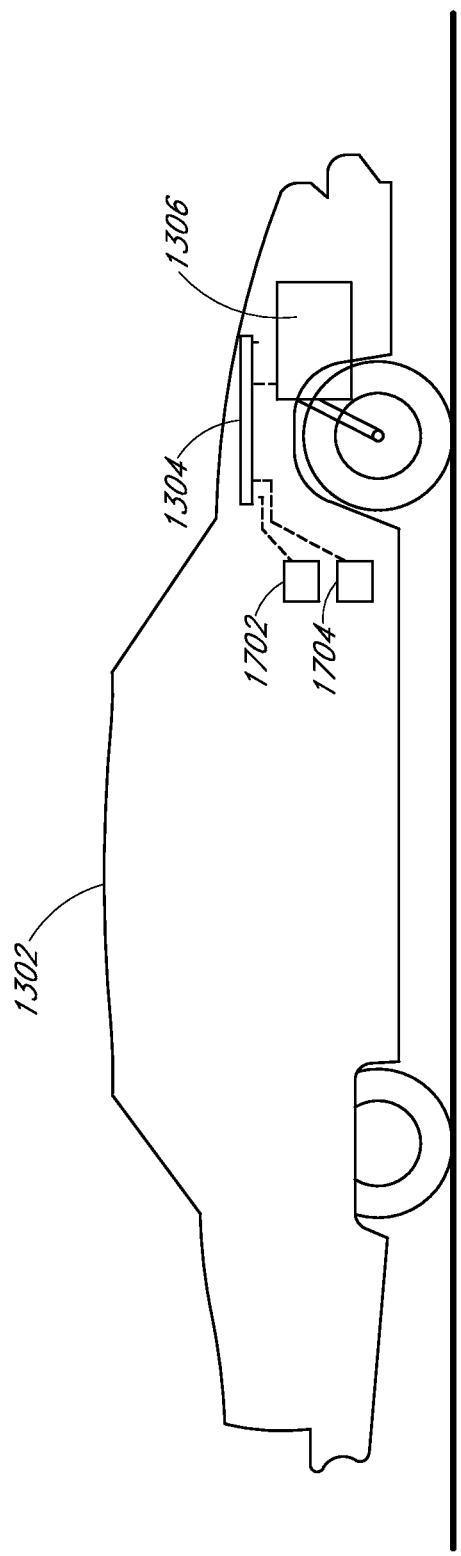
FIG. 17 illustrates an embodiment with an auxiliary system.

FIG. 17 illustrates an embodiment of the fuel conservation system 1304 of the vehicle 1302 connected to an auxiliary system. The auxiliary system can control electrical power to one or more auxiliary devices of the vehicle 1304, such as, for example, an air conditioning system 1702 and/or heating system 1704. As discussed herein, an auxiliary device can be any device on the vehicle 1302, such as, for example, air conditioning, heating, lights, stereo, etc. The fuel conservation system 1304 can be configured to deliver power to the air conditioning system 1702, heating system 1704, and/or other auxiliary device for a period of time, and then dampen and/or cut power delivery for a period of time. The fuel conservation system 1304 can transmit a third function corresponding to a directive output of the auxiliary device over a time duration to the auxiliary system for controlling device output according to the directive output of the auxiliary device over the time duration. In some embodiments, the oscillations of energy delivery and dampening can be such that the driver of the vehicle 1302 does not perceive the cycling of the air conditioning system 1702, heating system 1704, and/or other auxiliary system while the fuel conservation system 1304 decreases the average energy demand of the auxiliary systems. Less average energy demand can decrease the power demand on the engine 1306, resulting in fuel savings.

Because any embodiment described herein can be combined with any other embodiment, the following combination of embodiments is only for illustrative purposes. For example, an embodiment of FIG. 17 can be combined with other embodiments of FIGS. 14, 15, 20, 21, and/or 22 as discussed herein that can determine a gradient of the road presently traversing or an upcoming gradient. The fuel conservation system 1304 can be configured to oscillate the power to any auxiliary system depending on the gradient of the road and/or upcoming gradient of the road. For example, the fuel conservation system 1304 can deliver power to an auxiliary system during highway driving and/or where the gradient of the road is a decline 1502 as discussed herein when the engine load can be relatively low. Conversely, the fuel conservation system 1304 can dampen and/or cut power delivery during city driving, congested driving, and/or where an incline 1404 and/or upcoming incline road 2202 as discussed herein when the engine load can be relatively high.

Figure 18:
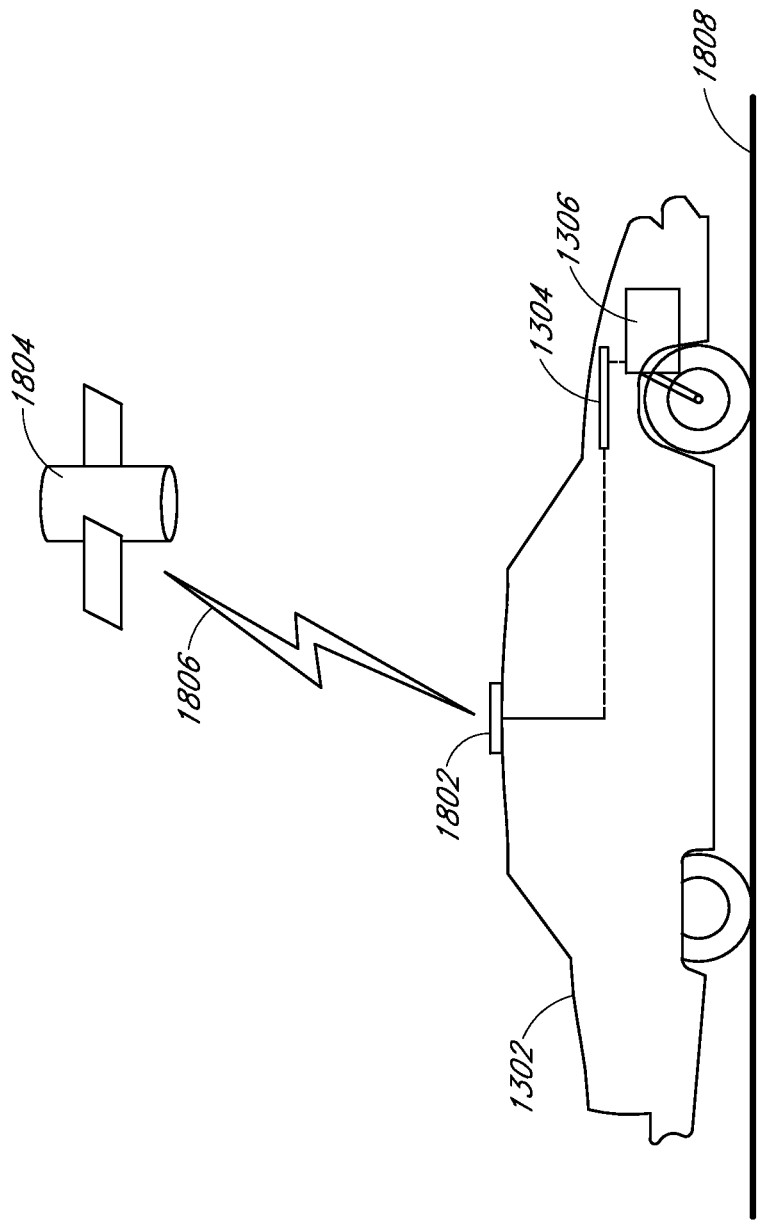
FIG. 18 illustrates an embodiment with a GPS receiving a satellite signal.

FIG. 18 illustrates an embodiment of the fuel conservation system 1304 of the vehicle 1302 connected to a global positioning system (GPS) 1802. The GPS 1802 can receive data from a satellite 1804 via a satellite signal 1806. The GPS 1802 or its satellite signal receiver can be located anywhere on the vehicle 1302 that allows the GPS 1802 to receive the satellite signal 1806, which can be any location without an opaque barrier facing up toward the sky. In some embodiments, the GPS 1802 can be connected to a positional database, traffic database, and/or topographical database (or elevation map). In some embodiments, the GPS software can be updated via the satellite connection or any other suitable network such as, for example, Ethernet, Wi-Fi, satellite, cellular data network of varying speeds such as 3 G, 4 G, LTE, and future variants, satellite, and/or the like. In some embodiments, the fuel conservation system 1304 can be updated via the GPS 1802 or any other suitable network such as, for example, Ethernet, Wi-Fi, cellular data network of varying speeds such as 3 G, 4 G, LTE, and future variants, satellite, and/or the like. In some embodiments, the fuel conservation system 1304 can notify a user of an available update and instruct the user on how perform the update, which can include instructing the user to ensure the vehicle 1302 is stationary before proceeding with the update.

In some embodiments, using the data from the satellite 1804, the GPS 1802 can determine location and/or direction of travel of the vehicle 1302 by accessing a positional database. In some embodiments, using the data from the satellite 1802, the GPS 1802 can also determine the traffic conditions ahead of the vehicle 1302 by accessing a traffic database and/or real time traffic system, and/or by interacting with other nearby vehicles such as vehicle sensors on the vehicle and nearby vehicle able to communicate information to each other about traffic or other vehicle information. In some embodiments, using the data from the satellite 1804, the GPS 1802 can determine a gradient of the road the vehicle is presently traveling on and/or that an upcoming gradient of the road by accessing a topographical database. The foregoing examples of access to databases can provide information that allows the fuel conservation system 1304 to more effectively determine when the engine 1306 1302 can operate in a zone of efficiency to increase fuel economy as well as determine when to modify, vary, decrease, and/or increase the frequency, amplitude, and/or waveform of the directive power of the second function, or deactivate the fuel conservation system 1304, thereby allowing transmission of the user-specified power output, depending on user preference, variable inputs, and/or other control parameters.

When the GPS 1802 determines that the vehicle 1302 is traveling on a highway 1808, the fuel conservation system 1304 can be active. A highway can be defined as including driving speeds of the vehicle 1302 being greater than about 30 to about 50 miles per hour. On a highway, most engines can operate at a steady state. During steady state mode, the fuel conservation system 1304 can increase fuel economy as discussed herein, and in particular in reference to FIGS. 5, 6, and/or 7.

Figure 19:
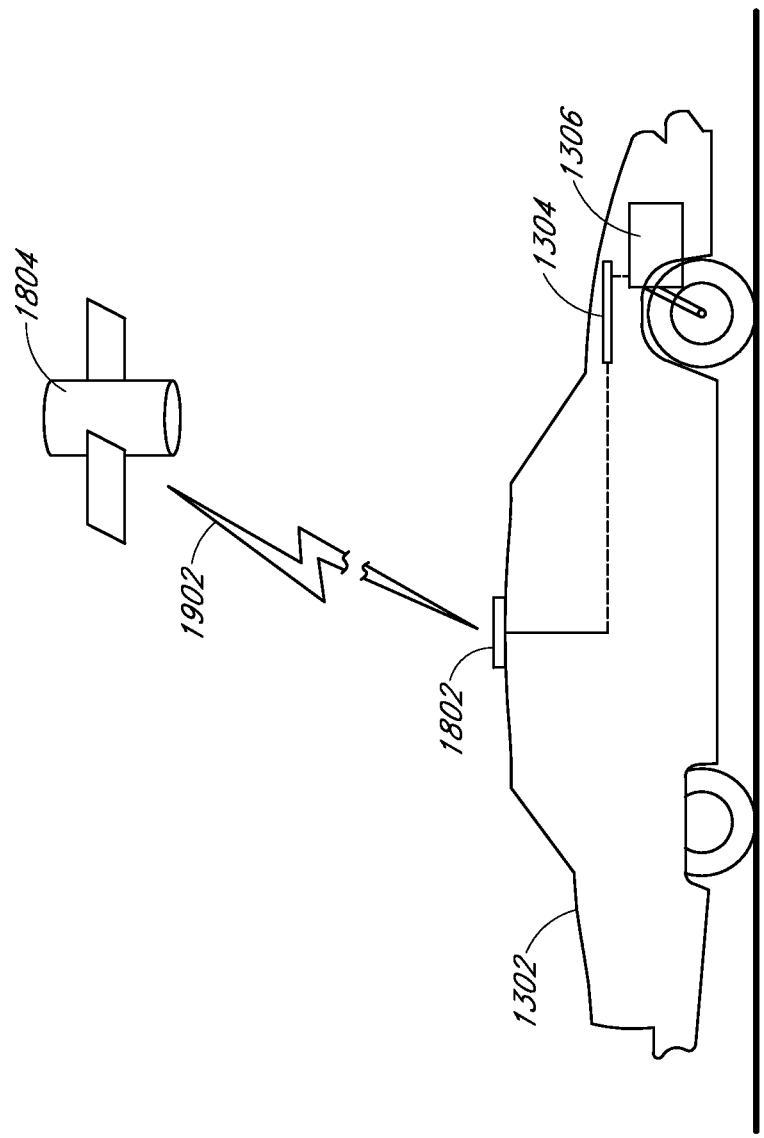
FIG. 19 illustrates an embodiment with a GPS not receiving a satellite signal.

FIG. 19 illustrates an embodiment where satellite signal 1902 is interrupted. The default mode of the fuel conservation system 1304 can be to remain active. The activated default mode can help achieve greater fuel economy by having the fuel conservation system 1304 engaged whenever user preference, variable inputs, and/or other control parameters allow. In some embodiments, the fuel conservation system 1304 can use existing and/or added vehicle sensors (not illustrated) on the vehicle 1302 to determine the directive power output of the engine. The vehicle sensors can determine a cruise parameter of the vehicle 1302. The cruise parameter can include speed and/or acceleration of the vehicle 1302. As discussed herein, the fuel conservation system 1304 can be active during driving speeds of the vehicle 1302 being greater than about 30 to about 50 miles per hour for an automobile, and speeds greater than about 100 to about 400 miles per hour for an airplane. The fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, at driving speeds of the vehicle 1302 less than or equal to about 20 to about 40 miles per hour for an automobile, and speeds less than or equal to about 100 to about 300 miles per hour for an airplane. As discussed herein, the fuel conservation system 1304 can be active during acceleration of the vehicle 1302 being less than about 0.3 to about 15 feet per square second for an automobile, and speeds less than about 0.3 to about 20 feet per square second for an airplane. The fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, during acceleration of the vehicle 1302 greater than or equal to about 3 to about 20 feet per square second for an automobile, and acceleration greater than or equal to about 3 to about 30 feet per square second for an airplane.

In some embodiments, the fuel conservation system 1304 can track driving patterns of the vehicle 1302. The fuel conservation system 1304 can determine if the driving patterns correspond to highway driving or other conditions suitable for the fuel conservation system 1304 to be active as discussed herein. If the driving patterns correspond to city driving, congested driving, uphill driving, and/or downhill driving, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output.

In some embodiments, including load-bearing vehicles such as, for example, long haul trucks, vehicles with trailers, and/or other heavy vehicles, the fuel conservation system 1304 can dynamically refine, modify, and/or vary the parameters that the fuel conservation system 1304 uses to achieve fuel savings based on load of the vehicle (such as speed, grade, and/or power needed on a descent, ascent, or level road) and/or other operating variables of the vehicle as discussed herein. For example, based on the load, the fuel conservation system 1304 can modify, vary, decrease, and/or increase the frequency, amplitude, and/or waveform of the directive power of the second function, or a deactivated fuel conservation system 1304, thereby allowing transmission of the user-specified power output. In some embodiments, the fuel conservation system 1304 can determine from GPS, terrain data, vehicle sensors, and/or other information as discussed herein the load on the vehicle to optimize fuel economy settings, including modifying, varying, decreasing, and/or increasing the frequency, amplitude, and/or waveform of the directive power of the second function, or a deactivated fuel conservation system 1304, thereby allowing transmission of the user-specified power output.

Figure 20:
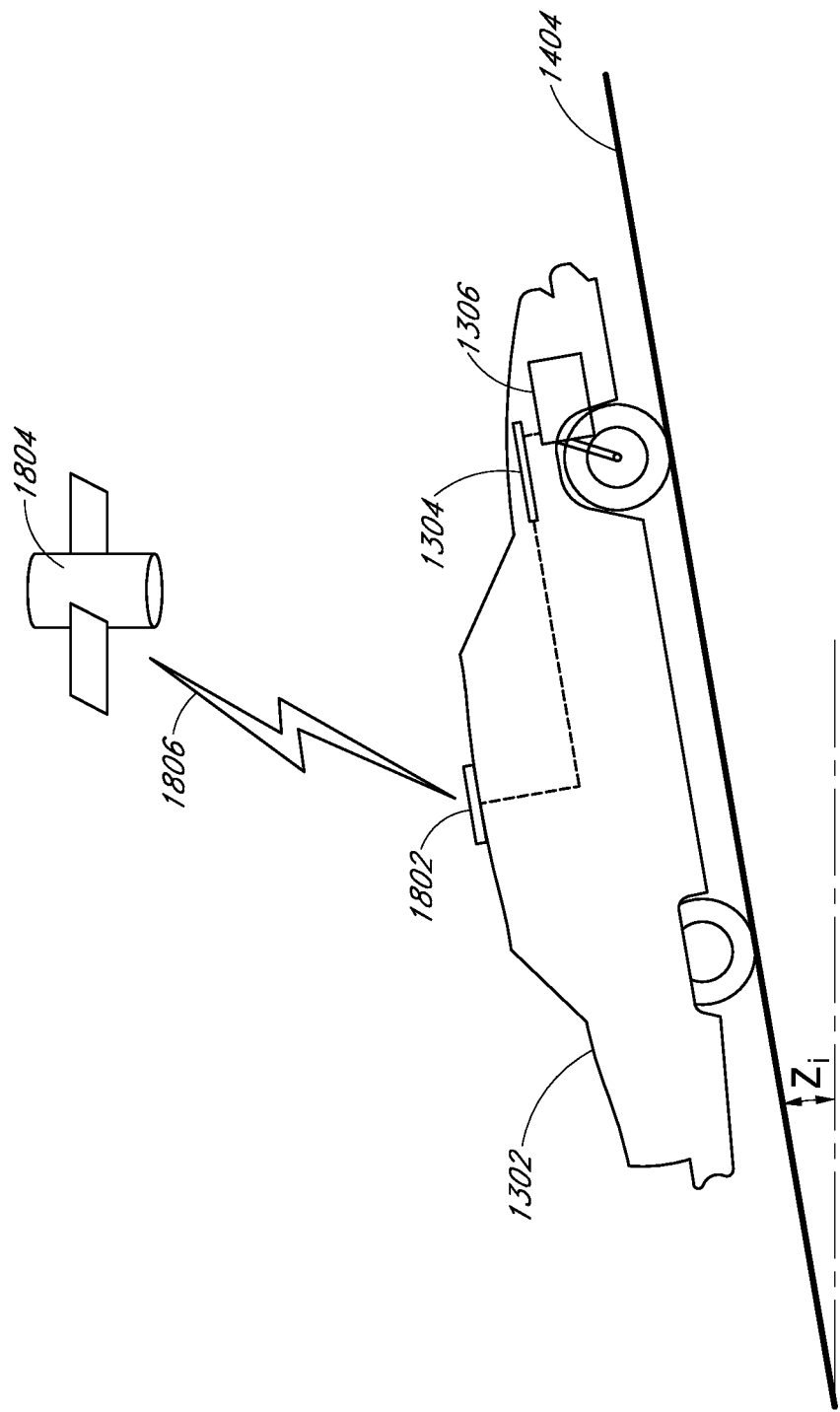
FIG. 20 illustrates an embodiment with a GPS on an incline road.
Figure 21:
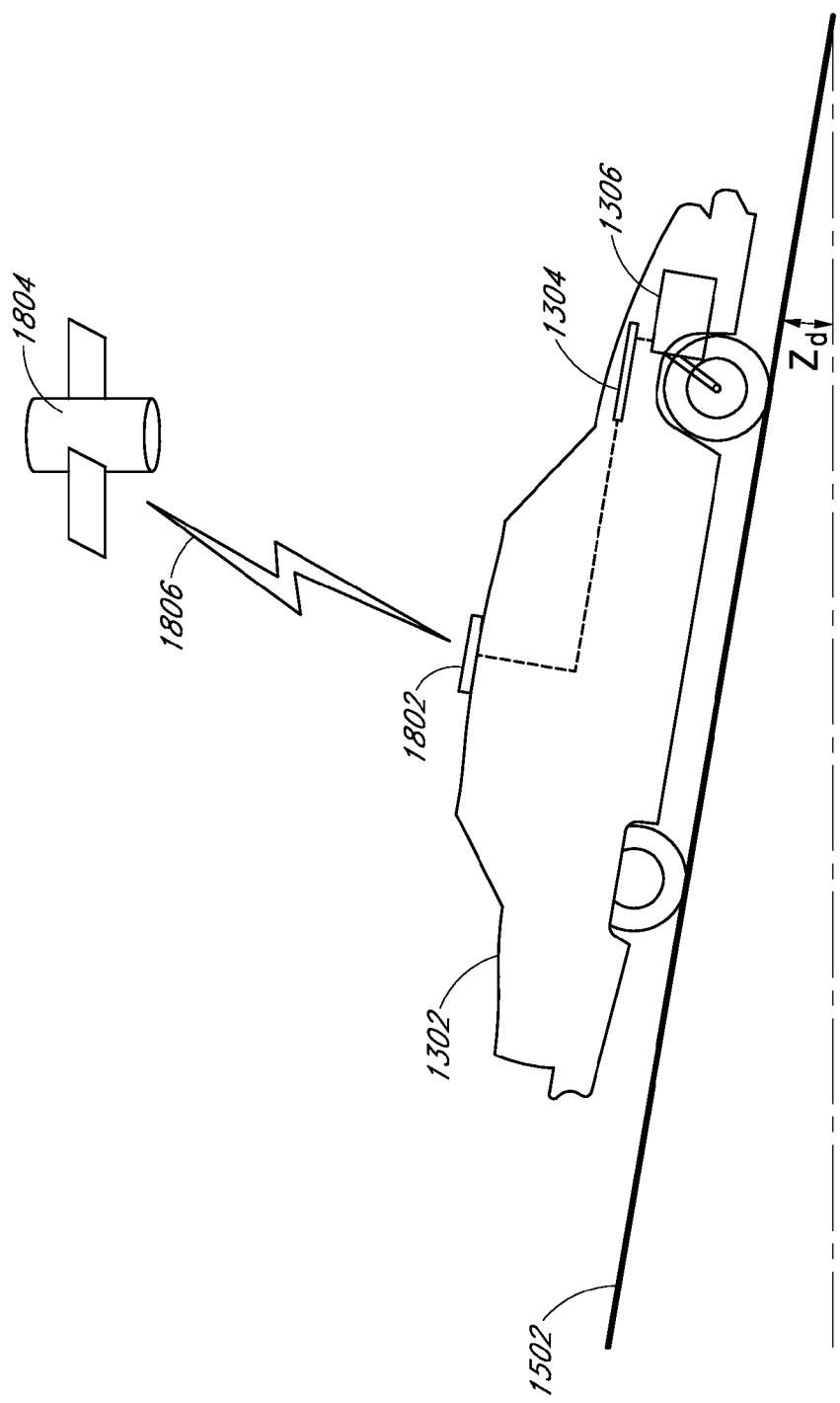
FIG. 21 illustrates an embodiment with a GPS on a decline road.

As for the embodiments discussed in reference to FIGS. 14 and 15, the GPS 1802 can determine the gradient of the road that the vehicle 1302 is presently traveling on. FIG. 20 illustrates an embodiment of the GPS 1802 having access to a topographical database (or elevation map) and based on the vehicle's position and/or direction of travel, determines a gradient of an incline road 1404. FIG. 21 illustrates an embodiment where the GPS 1802 can access the topographical database and based on the vehicle's position and/or direction of travel and can determine a gradient of a decline road 1502. When the incline road 1404 or decline road 1502 has a gradient greater than $Z_i$ or $Z_d$, respectively, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output. In some embodiments, $Z_i$ and/or $Z_d$ can vary between 1 to 60 degrees. As described herein, in particular in reference to for FIGS. 14 and 15, with the fuel conservation system 1304 modifying, varying, decreasing, and/or increasing the frequency, amplitude, and/or waveform of the directive power of the second function, or a deactivated fuel conservation system 1304, thereby allowing transmission of the user-specified power output, the engine can either generate up to the maximum power output during an incline or in some engines, prevent more pronounced oscillations during a decline.

Figure 22:
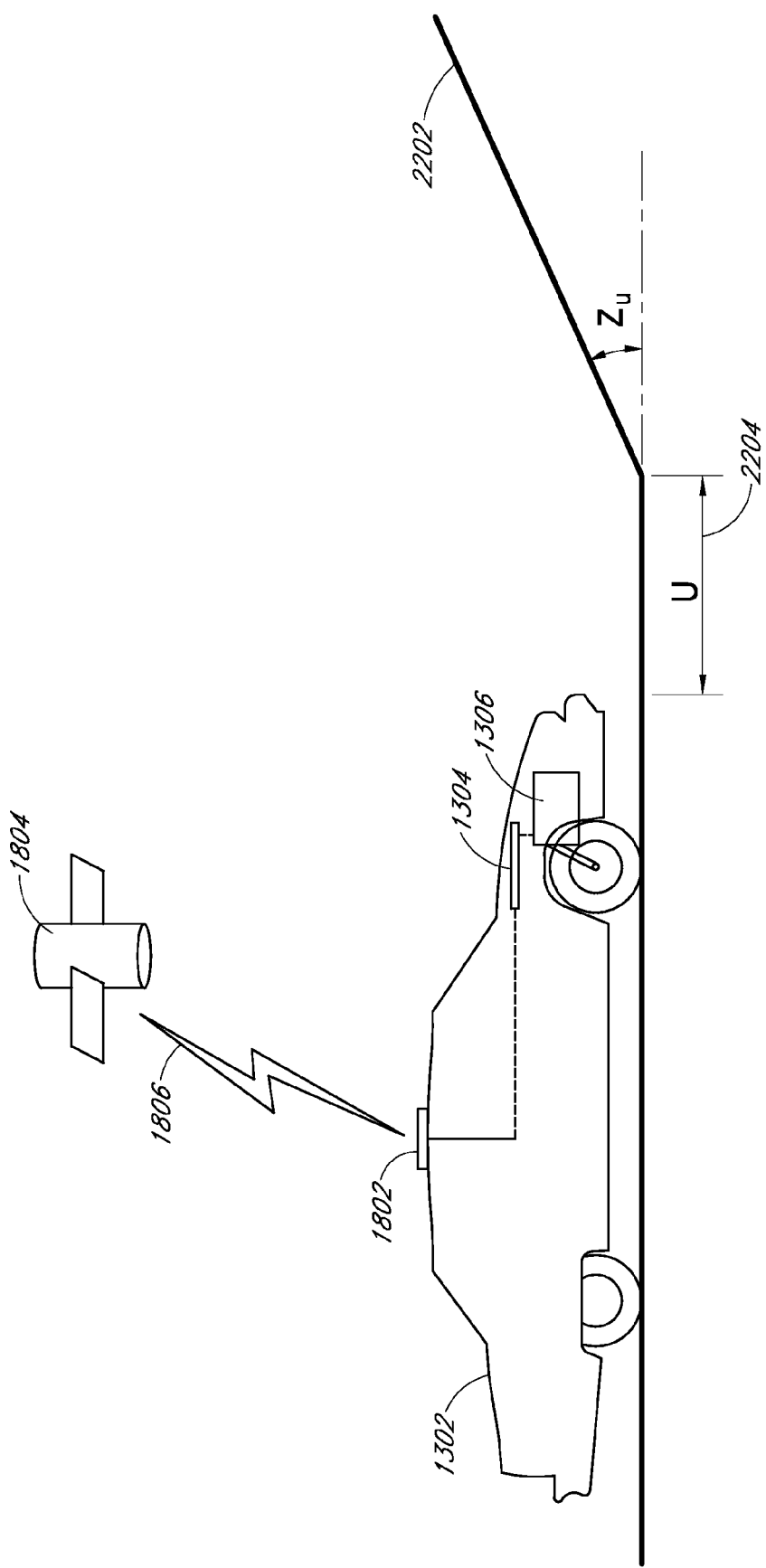
FIG. 22 illustrates an embodiment with a GPS approaching an upcoming incline road.

FIG. 22 illustrates an embodiment showing a one possible advantage of the GPS 1802 over onboard level sensors 1402 discussed in reference to FIGS. 14 and 15. The GPS 1802 can determine when there is an upcoming incline road 2202 before the vehicle 1302 reaches the incline road 2202. The GPS 1802 can access a topographical database (or elevation map). When upcoming gradient of the road 2202 is greater than a threshold $Z_u$ and less than a distance U 2204 away from, for example, the front of the vehicle 1302, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, before reaching the incline road 2204 to allow the vehicle 1302 to build up momentum. The GPS 1802 can calculate the upcoming gradient $Z_u$ based on the elevation of the start and end points of a projected path based on position and/or direction of travel of the vehicle 1302. The driver and/or user of the vehicle can experience a smoother transition from flat to incline road driving. At what threshold distance U 2204 the fuel conservation system 1304 modifies, varies, decreases, and/or increase the frequency, amplitude, and/or waveform of the directive power of the second function, or the fuel conservation system 1304 is deactivated, thereby allowing transmission of the user-specified power output, can vary depending on the user preference, variable inputs, and/or other control parameters (such as the gradient of the upcoming road, weight of vehicle, weight of any attached trailer, etc.).

Figure 23:
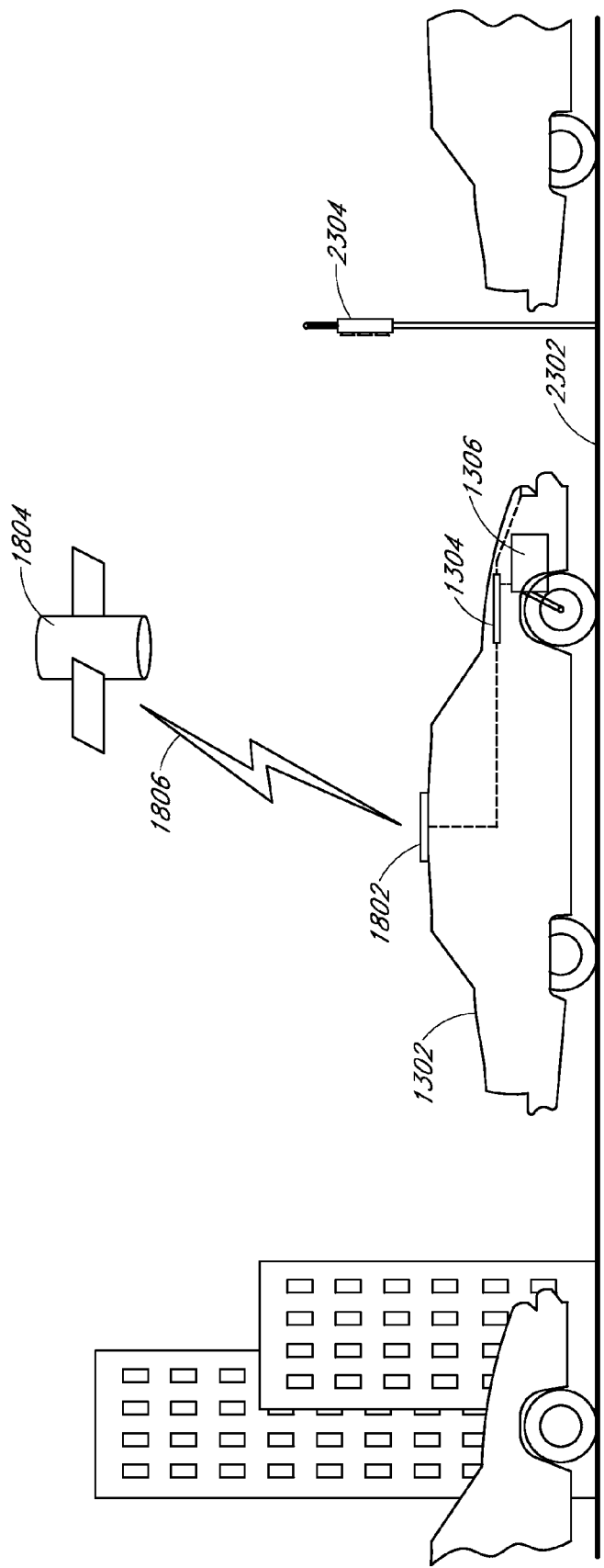
FIG. 23 illustrates an embodiment with a GPS on a city road.

FIG. 23 illustrates an embodiment of the GPS 1802 accessing the positional database to determine when the vehicle 1302 is driving on a city road 2302 with, for example, stoplights and/or stop signs 2304. When the number of stoplights and/or stop signs is greater than a specified threshold S per mile, the fuel conservation system 1304 can modify, vary, decrease, and/or increase the frequency, amplitude, and/or waveform of the directive power of the second, or the fuel conservation system 1304 can be deactivated, thereby allowing transmission of the user-specified power output, to accommodate a possible likelihood of repeated acceleration and deceleration (and/or significant acceleration and deceleration). As an example, the threshold range can be from 0.5 to 10 per mile. In some embodiments, a city road can be defined as driving speeds of the vehicle being less than or equal to about 20 to about 40 miles per hour. Based on the vehicle's 1302 position and/or direction of travel, the GPS 1802 can determine if vehicle is on a city road based on, for example, a speed limit database. As discussed herein, acceleration or deceleration (and/or significant acceleration or deceleration) and/or driver signal indicative of desired acceleration can be defined as when acceleration is greater than A % change per unit C of time and when deceleration is greater than B % change per unit C of time. For example, when the accelerator pedal position or the brake pedal position changes at a rate A % or B % greater than about 10% to about 90% in time C of about 0.2 to about 2 seconds, the fuel conservation system can modify, vary, decrease, and/or increase the frequency, amplitude, and/or waveform of the directive power of the second function, or the fuel conservation system 1304 can be deactivated, thereby allowing transmission of the user-specified power output. When the number of stoplights and/or stop signs is less than S per mile, the GPS 1802 can also access the traffic database to determine when the city road 2302 is congested.

A congested city road 2302 can require repeated acceleration and deceleration (and/or significant acceleration and deceleration). A congested city road 2302 can be defined as the vehicle 1302 traveling slower than speed V, such as less than or equal to about 20 to about 40 miles per hour, for a quarter mile every mile or similar to a city road, more than S stops per mile. In some embodiments, a congested 2302 can be defined as a driving pattern including the vehicle 1302 stopping more than once per a traveled distance X. Distance X can be about 25 to about 100 yards. In congested city roads 2302, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output. While FIG. 23 illustrates a congested city road, the GPS 1802 can also access the traffic database on highway roads 1808. When the highway road 1808 is congested as defined herein or otherwise has driving patterns associated with city driving, uphill driving, and/or downhill driving, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, to accommodate a possible likelihood of repeated acceleration and deceleration (and/or significant acceleration and deceleration).

Figure 24:
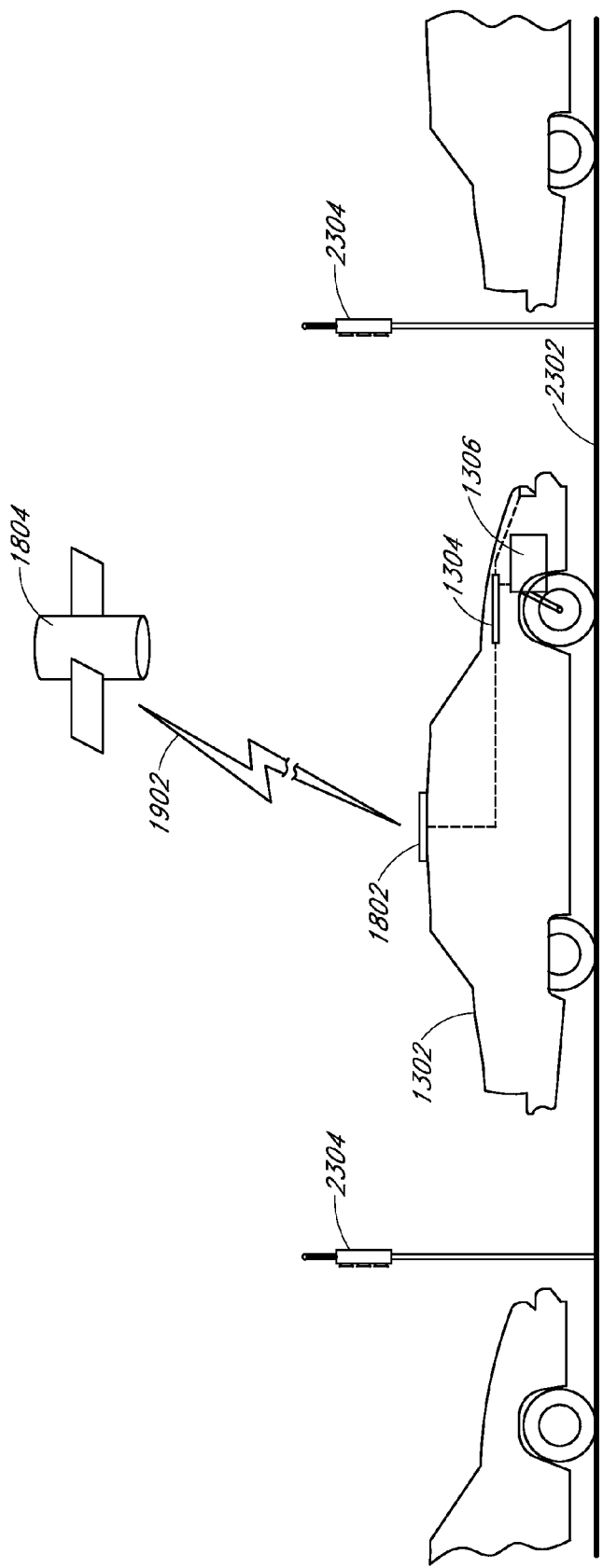
FIG. 24 illustrates an embodiment with a GPS not receiving a satellite signal on a city road.

FIG. 24 illustrates an embodiment where the satellite signal 1902 can be interrupted during city driving. The fuel conservation system 1304 can keep track of the driving pattern by storing information about the frequency and magnitude of vehicle stops, and/or accelerations and/or decelerations as discussed herein. When the driving pattern resembles either congested roads or city roads with many stoplights and/or stop signs as discussed herein, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, to accommodate repeated acceleration and deceleration (and/or significant acceleration and deceleration).

Any combination of the above disclosed embodiments illustrated in FIGS. 13 through 24 can be combined to work with the fuel conservation system 1304. Each embodiment can be a variable(s) that provides information to the fuel conservation system 1304 to more effectively determine when the vehicle 1302 is operating in a zone of efficiency to increase fuel economy as well as determine when to modify, vary, decrease, and/or increase the frequency, amplitude, and/or waveform of the directive power of the second function, or deactivate the fuel conservation system 1304, thereby allowing transmission of the user-specified power output, depending on user preference, variable inputs, and/or other control parameters. The system flow diagram of FIG. 25 illustrates many of the embodiments discussed herein working cohesively.

Figure 25:
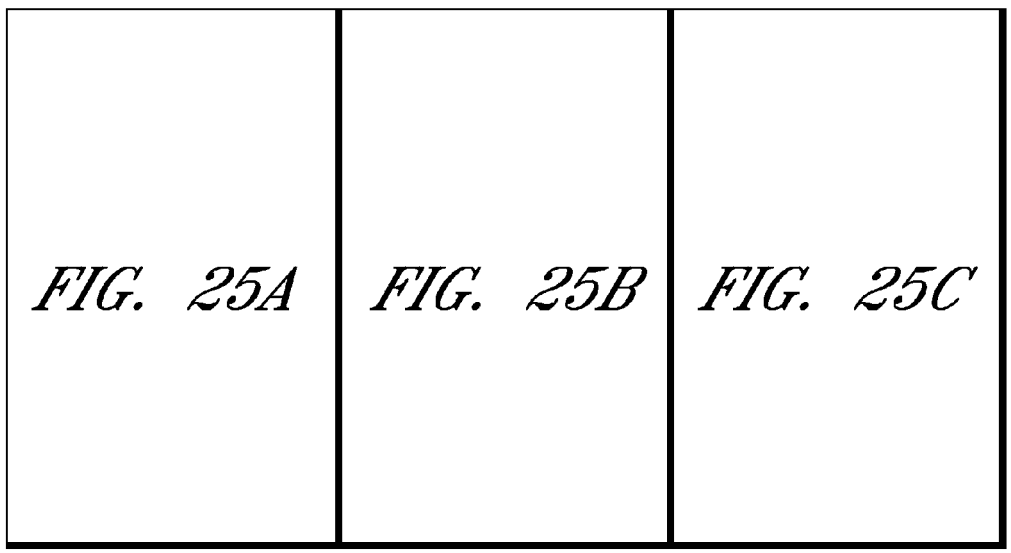
FIG. 25 depicts a simplified example of one embodiment of a process flow diagram illustrating system inputs, determining whether the fuel conservation system is active or inactive (process flow diagram expanded into FIGS. 25A, 25B, and 25C)
Figure 25A:
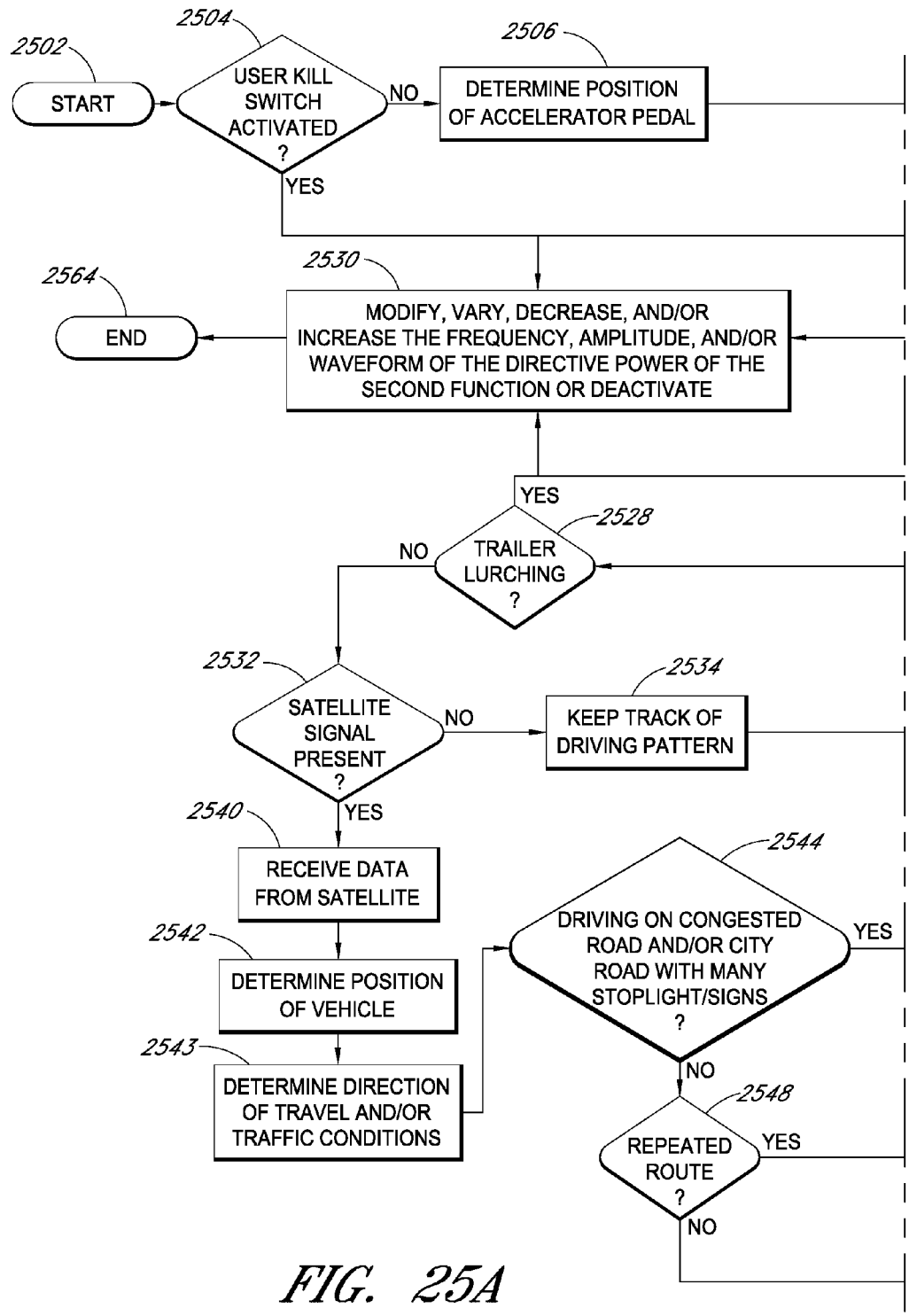
Figure 25B:
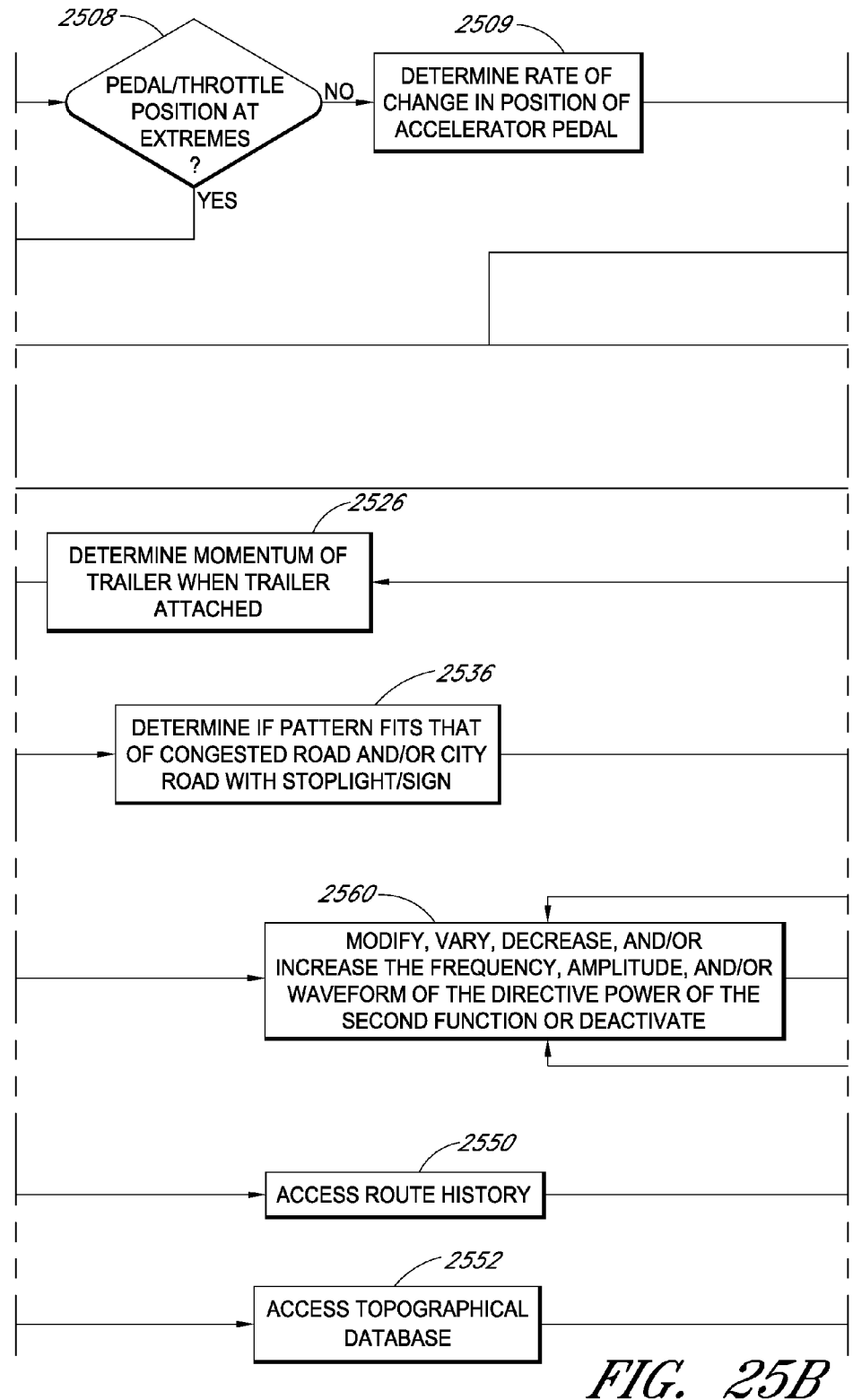
Figure 25C:
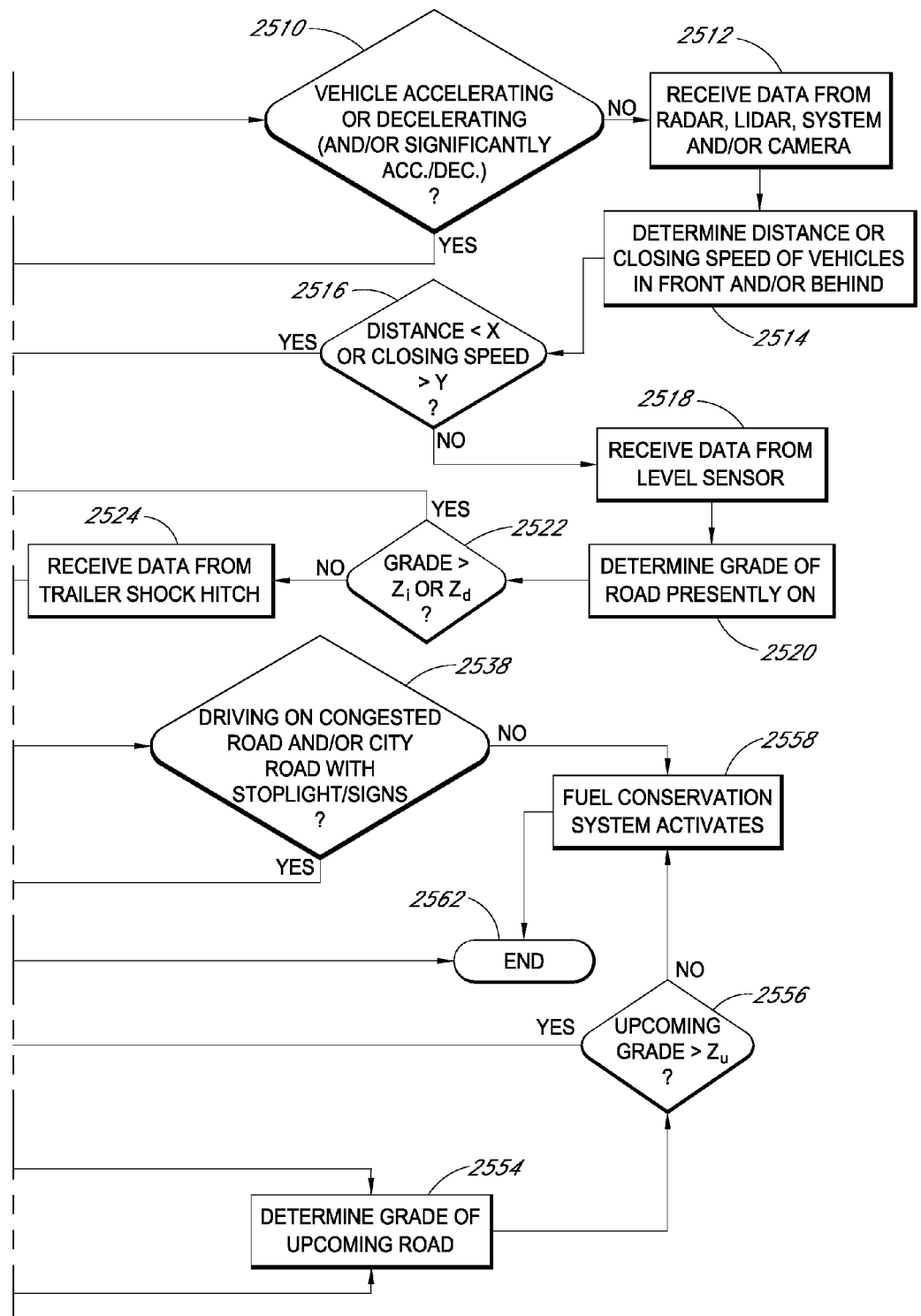

At the start 2502 of FIG. 25, the fuel conservation system 1304 can deactivate at block 2530 when the user has turned on the kill switch 305 at decision point 2504. When the kill switch 305 is not activated, the fuel conservation system 1304 can determine the position of the accelerator pedal at block 2506. At decision point 2508, when the pedal position (and correspondingly the throttle position) is at the extremes of the pedal's range, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, at block 2530. An extreme pedal position can be defined as above a threshold H % of the range on the high end and below a threshold L % on the low end. For example, when the pedal is depressed 10% or higher of its maximum or when the pedal is depressed only 10% or lower from its minimum, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output. The percent can vary or change depending on other variables, such as, for example, the gradient of a road and/or an attached trailer.

When the accelerator pedal position (and/or brake pedal position) is not at the extremes of its range of motion as discussed herein, the system can determine the rate of change in accelerator pedal position (and/or brake pedal position) at block 2509. At decision point 2510, the fuel conservation system 1304 can determine if the vehicle is accelerating or decelerating (and/or significantly acceleration or decelerating). As discussed above, the acceleration or deceleration threshold can be informed by the change in accelerator pedal position (and/or brake pedal position) over time. When the acceleration or deceleration and/or driver signal indicative of desired acceleration or deceleration is above the aforementioned thresholds of greater than A % or B % change per unit C of time, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, at block 2530.

When the vehicle 1302 is not accelerating or decelerating (and/or significantly acceleration or decelerating), the system can receive information from the radar, LIDAR, and/or camera system 1308 at block 2512. The radar, LIDAR, and/or camera system 1308 at decision point 2516 can inform the fuel conservation system 1304 when any vehicle(s) in front 1312 and/or behind 1314 has a distance of less than X from the vehicle 1302 or a closing speed is greater than Y relative to the vehicle 1302. When less than X or greater than Y, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, at block 2530 in case acceleration or deceleration above a specified threshold will be needed.

When the radar and/or LIDAR system's readings are not less than X or greater than Y, the fuel conservation system 1304 can receive data from the level sensors 1402 at block 2518. The fuel conservation system 1304 can determine the grade of the road that the vehicle 1302 is presently traveling on at block 2520. At decision point 2522, when the grade of the road is greater than $Z_i$ or $Z_d$, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, at block 2530 to help maintain the momentum of the vehicle 1302 while climbing an incline road or help prevent oscillations in some engines while descending a decline road.

When the grade of the road is less than $Z_i$ or $Z_d$, the fuel conservation system 1304 can receive data from the trailer shock hitch 1602 at block 2524. When a trailer 1604 is attached, the fuel conservation system 1304 can determine the momentum of the trailer 1604 relative to the vehicle 1302 as discussed herein, and in particular as discussed in reference to FIG. 16. When the trailer 1604 is lurching relative to the vehicle 1302 at decision point 2528, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, at block 2530. With the fuel conservation system 1304 modifying, varying, decreasing, and/or increasing the frequency, amplitude, and/or waveform of the directive power of the second function, or a deactivated fuel conservation system 1304, thereby allowing transmission of the user-specified power output, the engine can either generate up to maximum output when necessary to pull the trailer 1604 or in some engines, not oscillate during low loads.

When a trailer 1604 is not attached or it is not lurching, the GPS 1802 can determine when a satellite signal 1806 is present at decision point 2532. When a satellite signal 1806 is not present, the fuel conservation system 1304 as can track the driving pattern at block 2534. The fuel conservation system 1304 at block 2536 can determine when the driving pattern fits that of a congested road and/or city road with many stoplights and/or stop signs 2302 as discussed herein, and in particular as discussed in reference to FIG. 23. When the driving pattern does fit at decision point 2528, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, at block 2560. When the driving pattern does not fit at decision point 2528, the fuel conservation system 1304 can activate at block 2558.

Returning to decision point 2532, when the satellite signal 1806 is present, the GPS 1802 can receive data from the satellite at block 2540. The GPS 1802 can determine the position of the vehicle 1302 by accessing a positional database at block 2542. The GPS 1802 can determine the direction of travel and/or determine traffic conditions by accessing a traffic database at block 2543. When the vehicle 1302 is driving on a congested road and/or city road with many stoplights and/or stop signs 2302 at decision point 2544 as discussed herein, and in particular as discussed in reference to FIG. 23, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, at block 2560. When the driving pattern does not fit that of a congested or city road at decision point 2544, the GPS 1802 can determine whether the route the vehicle 1302 is presently traversing is a repeated route at decision point 2548.

The GPS system can be connected to a route history database that records all routes traveled by the vehicle 1302, recording the vehicle's position, direction of travel, and/or elevation (based on sensors or by accessing a topographical database). Based on the position and travel direction of the vehicle 1302, the GPS 1802 can determine at decision point 2548 whether the vehicle 1302 has traveled on this route before by accessing the route history database. When the route is repeated, the GPS 1802 can access the route history database at block 2550 and determine the gradient of the upcoming road at block 2554. When the route is not a repeated route, the GPS 1802 can access the topographical database at block 2552 and determine the gradient of an upcoming road at block 2554. When the GPS 1802 does not have a route history database, the GPS 1802 can use just the topographical database or vice versa. When the grade of the upcoming road is greater than $Z_u$ at decision point 2556, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, at block 2530 at a distance U 2204 from the upcoming gradient as discussed herein, and in particular as discussed in reference to FIG. 22. When the upcoming gradient is less than $Z_u$ at decision point 2556, the fuel conservation system 1304 activates at block 2558. The fuel conservation system flow diagram then ends at block 2560.

Figure 26:
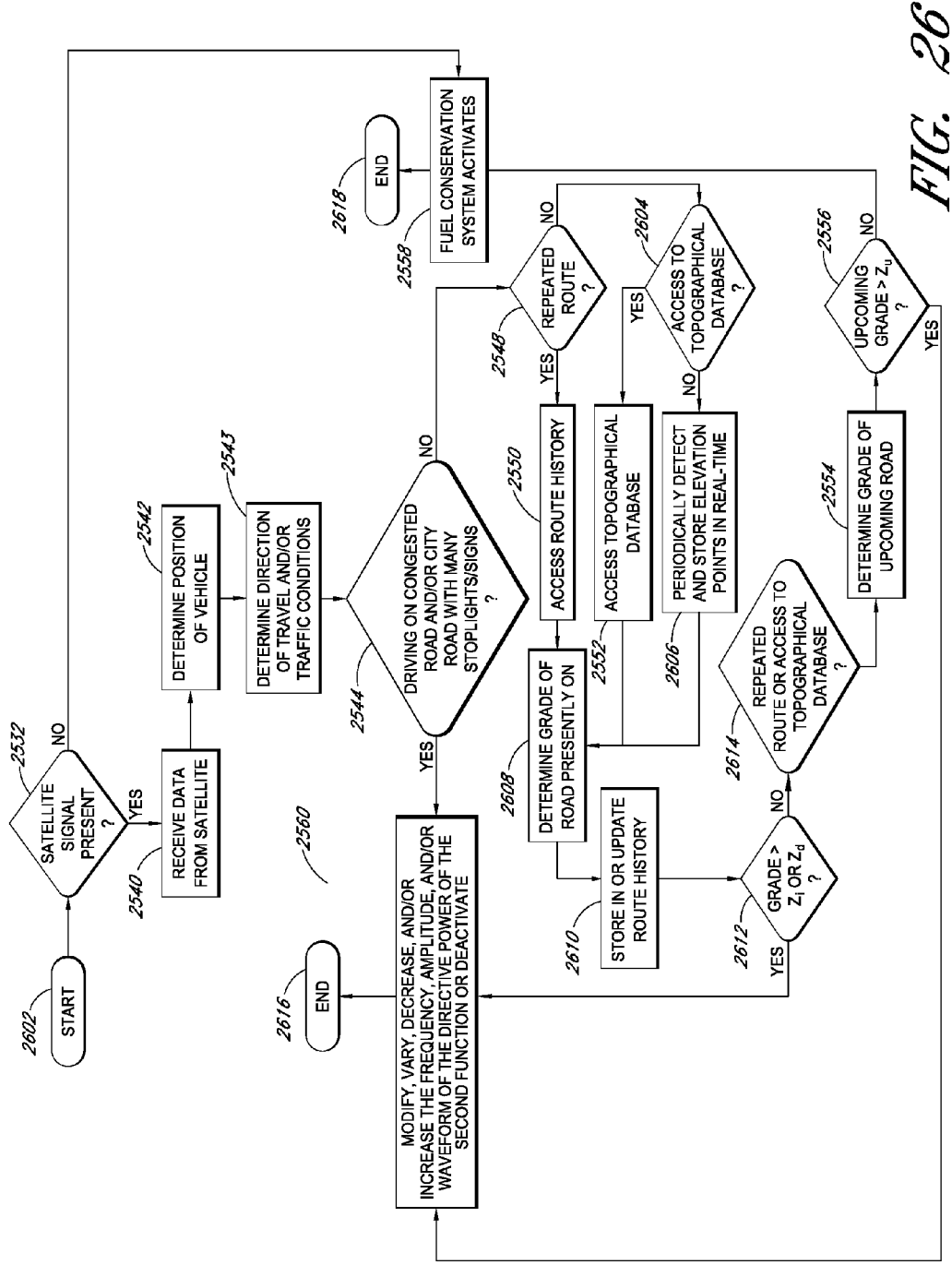
FIG. 26 depicts a simplified example of one embodiment of a process flow diagram illustrating GPS and elevation system inputs, determining whether the fuel conservation system is active or inactive.

The system of FIG. 26 is a simplified version of FIG. 25 with an added step of calculating road grade in real-time. FIG. 25 illustrates an embodiment of how the fuel conservation system 1304 can work when the GPS 1802 is connected. At the start 2502, the GPS 1802 can determine when a satellite signal is present at decision point 2532. When a satellite signal 1902 is not present, the fuel conservation system can activate at block 2558. Active state can be the default mode when no other variable directs the fuel conservation system 1304 to deactivate. When the satellite signal 1806 is present, the GPS 1802 can receive the satellite data at block 2540 and can determine the position, direction, and/or traffic conditions at blocks 2542 and 2543, respectively. When the vehicle 1302 is driving on a congested road and/or city road with many stoplights and/or stop signs 2302 at decision point 2544, the fuel conservation system 1304 can modify, vary, decrease, and/or increase the frequency, amplitude, and/or waveform of the directive power of the second function, or the fuel conservation system 1304 can be deactivated, thereby allowing transmission of the user-specified power output, at block 2560. When not on a congested or city road, the GPS 1802 can determine whether the route presently traversing is a repeated route at decision point 2548.

When the route is repeated, the GPS 1802 can access the route history at block 2550 and can determine the gradient of the road the vehicle 1302 is presently traveling on at block 2608. When the route is not repeated, the GPS 1802 can determine whether there is a topographical database at decision point 2604. When the GPS 1802 has access to a topographical database at block 2552, the GPS 1802 can determine the gradient of the road the vehicle 1302 is presently traveling on at block 2608.

When the GPS 1802 does not have access to a topographical database, the GPS 1802 can detect and store at periodic short intervals elevation points as the vehicle 1302 moves at block 2606. The GPS can either determine elevation data based on the satellite signal and/or use an auxiliary instrument that determines elevation. The GPS 1802 can use the stored data to determine in real-time the gradient of the road presently traveling at block 2608. The GPS 1802 then can store in and/or update the route history for the present position and direction that the vehicle is traveling at block 2610. After block 2610, the GPS 1802 can follow the same system flow as discussed above for FIG. 25.

Figure 27:
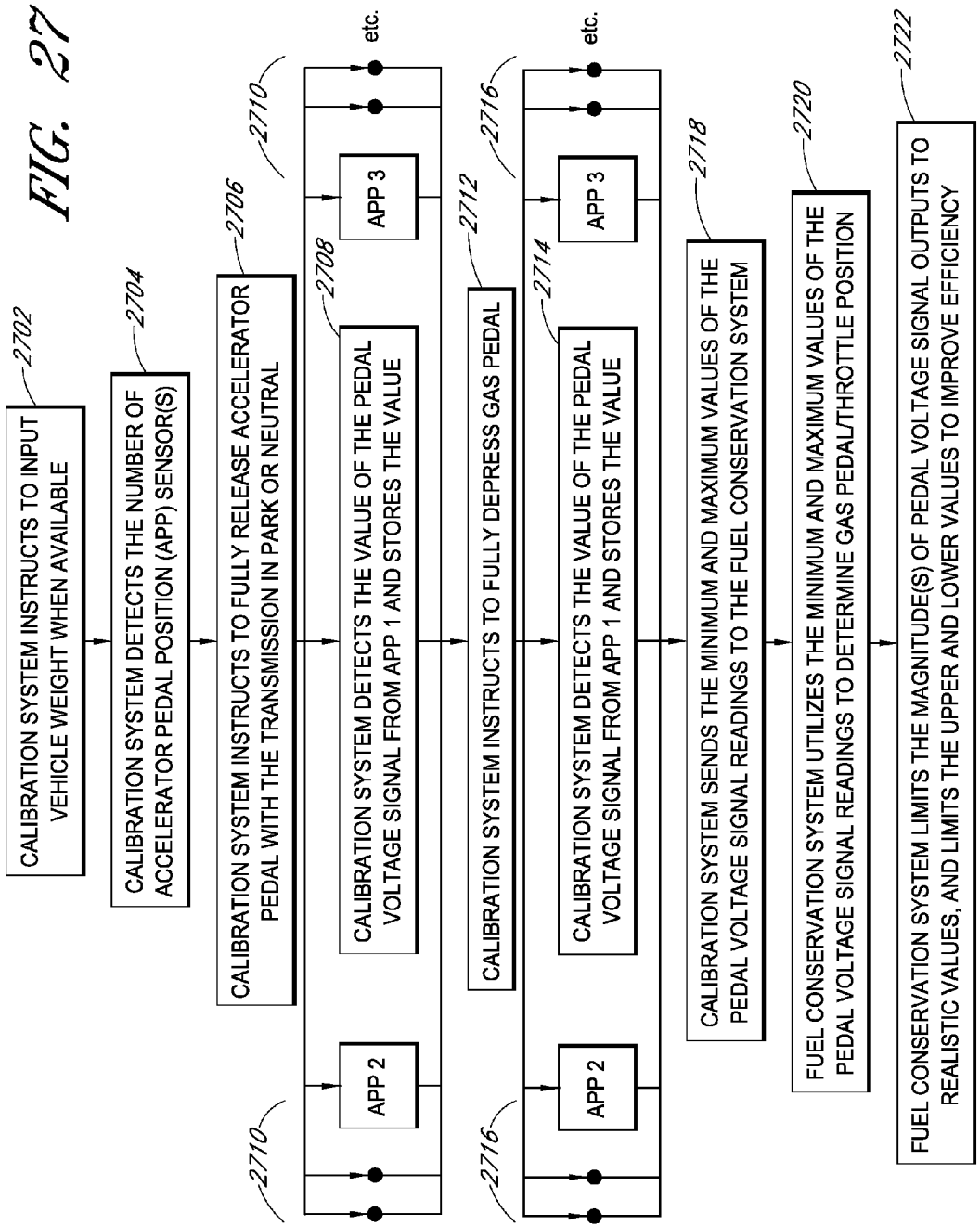
FIG. 27 depicts a simplified example of one embodiment of a process flow diagram illustrating the calibration of the fuel conservation system.

The system of FIG. 27 shows the basic steps for calibrating the fuel conservation system. Because the accelerator pedal position can determine the throttle position, the fuel conservation system 1302 can use the accelerator pedal position to determine the user-specified load on the engine. The user can calibrate the system manually as discussed herein. Or the user can calibrate the system through a series of parameter inputs that are known beforehand for a particular make and model of a vehicle.

FIG. 27 illustrates a combination of steps the user and/or consumer would use for system calibration. The combination of steps can vary depending on existing vehicle manufacturer inputs used for other vehicle systems calibration. To calibrate the fuel conservation system 1304 as illustrated in an embodiment of FIG. 27, the calibration system at block 2702 instructs the user to input the vehicle weight when it is available. Providing the vehicle weight can increase the learning curve of the fuel conservation system 1304. Larger vehicles can accommodate larger amplitudes and/or frequencies of directive power of the second function without a driver and/or user being aware of engine oscillations from the directive power of the second function. Thus, larger vehicles, such as, for example, buses and trucks, can achieve greater fuel economy with the fuel conservation system 1304 because a larger amplitude and/or frequency of the second function can result in greater fuel efficiency.

The calibration system at block 2704 can detect the number of Accelerator Pedal Position (APP) sensors. APP sensors deliver a voltage signal depending on the accelerator pedal position. Generally, accelerator pedal position can correlate to control throttle position, which in turn can control engine load. Generally, vehicles can have multiple APP sensors as a safety precaution to help ensure that the APP sensors are reading the accelerator pedal position correctly. APP sensor voltages can be the inverse of each other. For example, in a car with three APP sensors, a fully depressed gas pedal can have an APP1 reading of 5 volts, an APP2 reading of 1 volt, and an APP3 of 5 volts. A fully released gas pedal can have an APP1 reading of 1 volt, an APP2 reading of 5 volts, and an APP3 of 1 volt. In the preceding example, APP1 and APP2 are the inverse of each other. APP3 serves as a confirmation signal. When one of the three values from the APP sensors does not correctly correspond with the other APP values, the engine control unit can illuminate a service-engine indicator, limit engine output and/or vehicle speed, and/or idle the engine for safety. For example, some engine control units may limit the vehicle speed to 30 miles per hour to allow the driver and/or user to reach a place of safety. A vehicle can have any number or combination of APP sensors.

After detecting the number of APP sensors, the calibration system at block 2706 can instruct the user to fully release the accelerator pedal with the vehicle transmission in park or neutral. The calibration system can detect the value of the accelerator pedal voltage signal from APP1 and store the value at block 2708. The calibration system at blocks 2710 can simultaneously detect and store for any other APP sensors it detected earlier. The calibration system at block 2712 can instruct the user to fully depress the accelerator pedal. The calibration system can detect the value of the accelerator pedal voltage signal from APP1 and can store the value at block 2714. The calibration system at blocks 2716 can simultaneously detect and store for any other APP sensors it detected earlier.

The calibration system can then send the minimum and maximum values of the pedal voltage signal readings to the fuel conservation system at block 2718. The fuel conservation system can utilize the minimum and maximum values of the pedal voltage readings to determine the position of the gas pedal at block 2720. The fuel conservation system can limit the magnitude(s) of pedal voltage signal outputs for the second function to realistic values at block 2722. The threshold limits on the magnitude(s) help ensure that the engine control unit does not receive unrealistic values such as negative values or values above full pedal depression values. As discussed above, a voltage value from an APP sensor that does not correctly correspond with voltage value(s) from other APP sensor(s) can cause the engine control unit to illuminate a service-engine indicator, limit engine output and/or vehicle speed, and/or idle the engine for safety.

At block 2722, the fuel conservation system can further limit the upper and lower values of the voltage signals to improve fuel economy. The fuel conservation system should not store energy at a less efficient condition than the steady state or average gas pedal position. Because many engines can exhibit peak efficiency at a moderate to heavy load, improved fuel economy can be achieved when the fuel conservation system momentarily increases the load on the engine to put the engine in a more efficient state. The higher load and more efficient engine state is illustrated by arrow 1202 of FIG. 12. The momentary increase in load can then be stored as an increase in kinetic and rotational potential energy of the vehicle. During a subsequent decrease in engine load, illustrated by arrow 1204, the fuel conservation system can draw on the stored energy to meet part of the vehicle energy demand. Thus, on average over time, the energy demand of the vehicle can be met to move along a particular section of road at a desired speed, while consuming less energy. Therefore, the fuel conservation system should operate in a regime where the average load on the engine leads to an operating condition which is less efficient than at a higher load. The fuel conservation system should not momentarily increase the engine load if the higher load leads to less efficient operation. To maintain operation in the efficiency regime discussed herein, the system can limit the pedal voltage signal values that would cause the engine to operate at a higher load that may be above the an efficient operating regime.

Because an engine at lower loads can be less efficient, the system can limit the pedal voltage signal values that cause the engine to operate at lower inefficient states. A lower inefficient state can occur when any efficiency gains during an increased engine load are negated by the magnitude of the inefficiency losses during a subsequent decreased engine load. The overall energy loss occurs because the energy stored as an increase in kinetic and rotational potential energy of the vehicle during an efficient higher engine load is negated by the energy lost during the subsequently more inefficient lower engine load. This lower inefficient state is illustrated by FIG. 12 when the increase in efficiency during the higher load of arrow 1202 is negated by the decrease in efficiency during the lower load of arrow 1204. Thus, to increase the time the fuel conservation system is able to operate in a more efficient state, the calibration system can limit the pedal voltage signal values that cause the engine to operate at these lower inefficient states.

Figure 28:
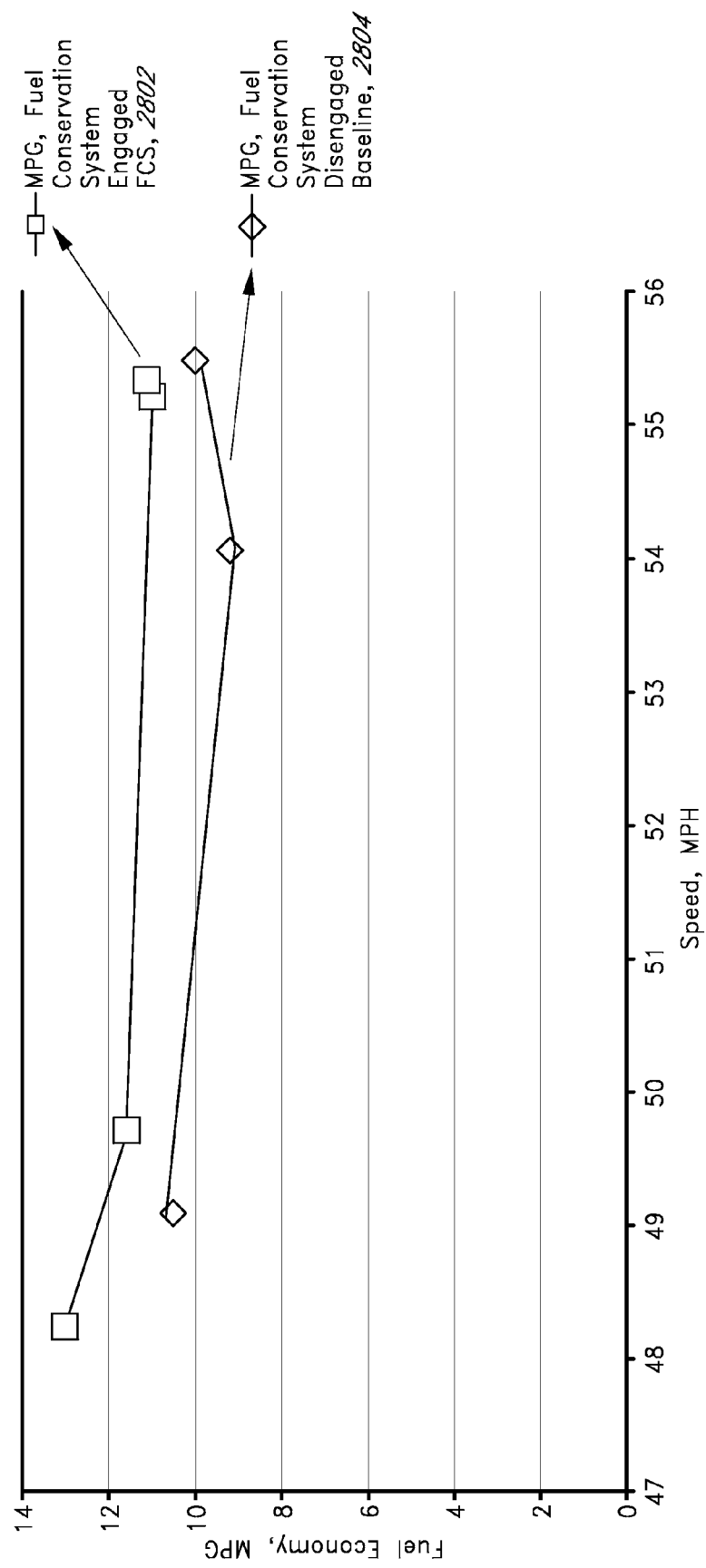
FIG. 28 is a graph that illustrates fuel economy comparisons in a vehicle with the fuel conservation system active and inactive.

In an embodiment, the fuel conservation system 1304 can achieve a 10% fuel economy improvement as illustrated in FIG. 28. The graph of FIG. 28 illustrates the results of testing the fuel conservation system on a vehicle. The speed miles per hour (MPH) is plotted on the x-axis. The fuel economy miles per gallon (MPG) is plotted on the y-axis. The baseline 2804 shows the fuel economy of the vehicle with the fuel conservation system 1304 inactive. The FCS line 2802 shows the fuel economy of the vehicle with the fuel conservation system 1304 active. As illustrated in FIG. 28, the fuel conservation system in an embodiment can result in an approximate 10% improvement in fuel economy, which is the difference between baseline 2804 and FCS line 2802. For example, at the 50 MPH, the graph illustrates that the fuel conservation system can achieve an approximate fuel economy of 11 to 12 MPG versus the baseline fuel economy of approximately 10 MPG. The fuel economy savings with the fuel conservation system 1304 activated can vary depending on variables such as vehicle weight, user preference, variable inputs, road conditions, and/or other control parameters discussed herein. In an embodiment, to achieve the approximate 10% improvement in fuel economy, the fuel conservation system used an approximate 10% signal overlay (for example, the fuel conservation system increased the input signal by 10% during a peak cycle and decreased the input signal by 10% during a bottom cycle) at a 0.25 frequency (for example, 0.25 cycles per second or 0.25 hertz). In an embodiment, the vehicle did not experience a noticeable change in vehicle speed when the fuel conservation was active.

Figure 29:
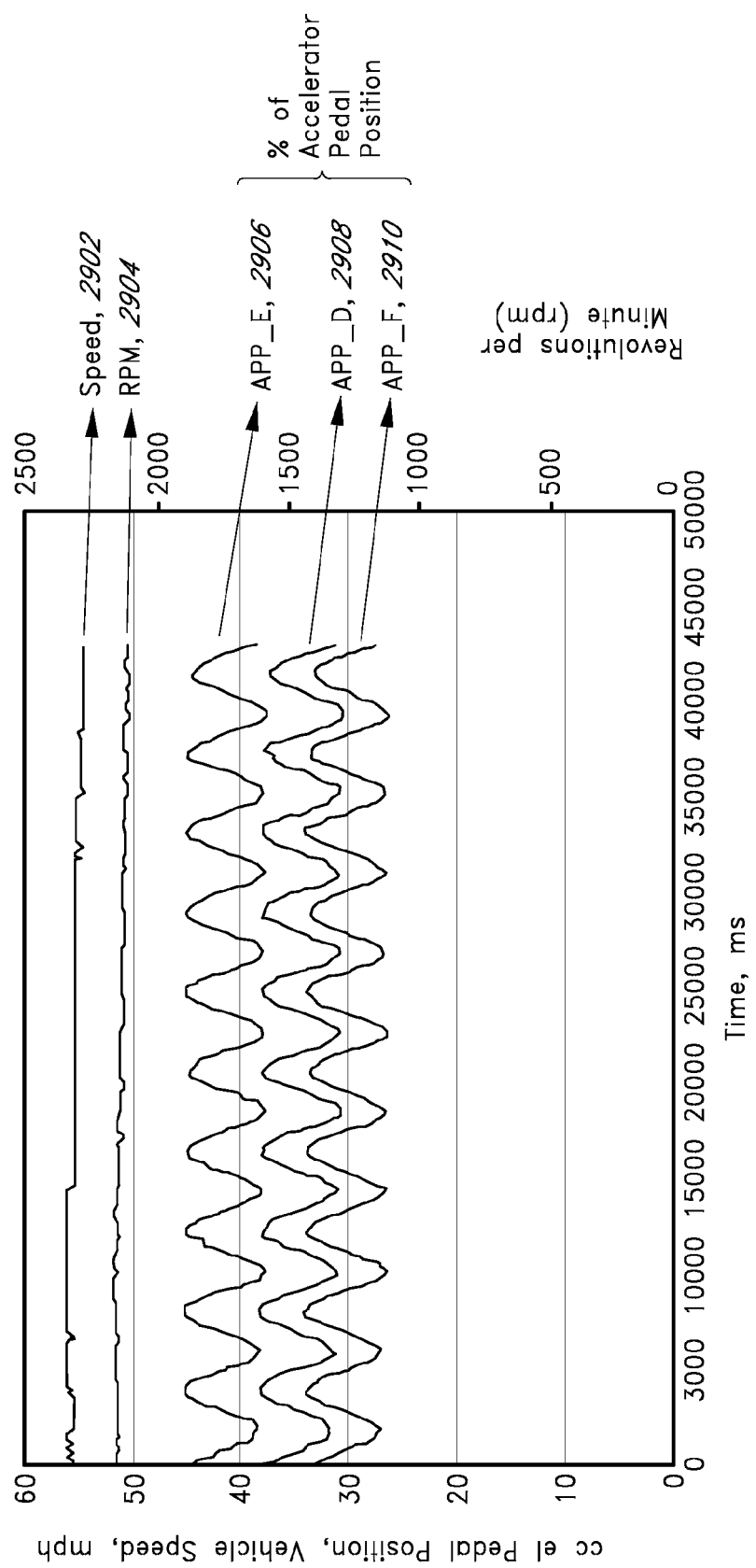
FIG. 29 is a graph that illustrates speed of a vehicle and revolutions per minute of a vehicle engine with the fuel conservation system active.

In an embodiment, the graph in FIG. 29 illustrates certain fuel conservation system variables when the fuel conservation system 1304 is active. The x-axis is time in milliseconds. For speed line 2902, the y-axis on the left side of the graph is the speed in miles per hour (MPH) of a vehicle. For the lines 2906, 2908, and 2910, the y-axis on the left side of the graph is percent of depression of the accelerator pedal, which is an indicator of the accelerator pedal position. The y-axis on the right of the graph is the revolutions per minute (RPM) of the engine of the vehicle. In an embodiment, the vehicle can have three APP (accelerator pedal position) sensors for redundancy purposes, wherein the APP sensors are used to detect the accelerator pedal position and generate a signal (for example, a voltage signal) to be transmitted to the ECU as the directive power output. In certain embodiments, at least one of the APP sensors produces a signal that is the inverse of one of the signals produced by one of the other APP sensors. The signals generated by the APP sensors can be transmitted to the ECU, and the ECU can be configured to interpret and/or analyze the signals from the APP sensors in order to determine the accelerator pedal position and/or desired directive power output signal to be sent to the engine. The lines 2906, 2908, and 2910 illustrate APP sensor signals that can be sent over the CAN (controller area network) bus, or other network, to the engine controller (for example, ECU) for the engine controller to interpret and analyze the voltage signals from the APP sensors. The fuel conservation system 1304 can vary the directive power of the second function as illustrated by the sine-like wave function of the three APP sensor output signals: APP_D, 2908; APP_E, 2906; APP_F, 2910. The fuel conservation system 1304 can vary the sine-like waves of the second function for the three APP sensor output signals (APP_D, 2908; APP_E, 2906; APP_F, 2910) to the ECU at approximately the same frequency, amplitude, and/or phase. The fuel conservation system 1304 can be configured to produce any frequency, amplitude, and/or phase of second function needed to integrate the system with engine redundancy mechanisms described herein for APP1, APP2, and APP3, which can vary depending the on the type of vehicle.

In an embodiment, the graph in FIG. 29 illustrates that the fuel conservation system 1304 can vary the three directive power output signals (APP_D, 2908; APP_E, 2906; APP_F, 2910) to the ECU such that the speed of the vehicle remains relatively unchanged as illustrated by line 2902. Further, the fuel conservation system 1304 can vary the three directive power output signals (APP_D, 2908; APP_E, 2906; APP_F, 2910) to the ECU such that the RPM 2904 of the vehicle engine remains relatively unchanged as illustrated by line 2904. For example, between the times of 5,000 to 40,000 milliseconds in FIG. 29, the speed 2902 remains approximately 55 MPH, and the RPM 2904 remains approximately 2,100 revolutions per minute. In an embodiment, as illustrated by the lines 2902 and 2904, the momentum and/or potential energy of the vehicle is used to maintain the vehicle speed and/or engine RPM during the periods of reduced directive power output (for example, the dips in the directive power output signals as illustrated by lines 2906, 2908, and 2910). In an embodiment, the driver and/or user may hear audible engine oscillations, however, the driver and/or user may not observe a change, or substantial change, in speed 2902 and/or RPM 2904. In an embodiment, a substantial change can be 1%, and in other embodiments, a substantial change can be 2%, 3%, 4% or 5% of the speed 2902 and/or RPM 2904.

Figure 30:
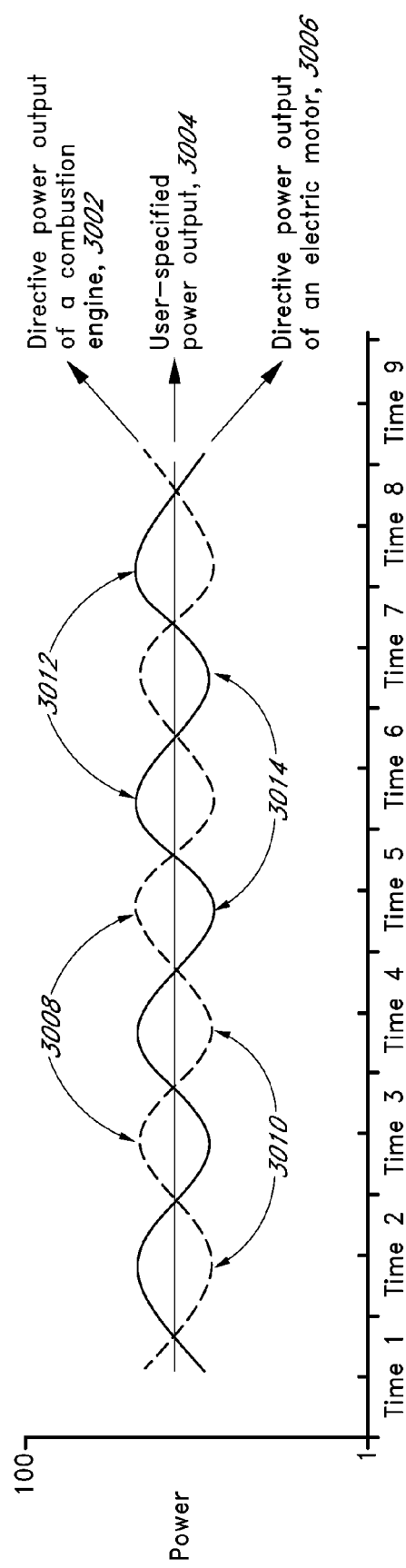
FIG. 30 is a graph that illustrates a directive power output of a combustion engine and a directive power output of an electric motor with the fuel conservation system active.

In an embodiment, the graph in FIG. 30 illustrates certain fuel conservation system variables when the fuel conservation system 1304 is active. In FIG. 30, power is on the y-axis, and time is on x-axis. A user-specified power output 3004 (which can be based on an accelerator pedal position or cruise control setting) is assumed to substantially be constant and illustrated as a straight line.

A directive power output of a combustion engine 3002 is illustrated as dashed-line sine wave. The directive power output of the combustion engine 3002 can have a plurality of regions of increased (blip) 3008 combustion engine power output 3002 and a plurality of regions of decreased (dip) 3010 combustion engine power output 3002. A directive power output of an electric motor 3006 is illustrated as a solid-line sine wave. The directive power output of the electric motor 3006 can have a plurality of regions of increased (blip) 3012 electric motor power output 3006 and a plurality of regions of decreased (dip) 3014 electric motor power output 3006. The plurality of regions of increased 3012 electric motor power output 3006 can compensate for the plurality of regions of decreased 3010 combustion engine power output 3002 to dampen oscillations of the directive power output of the combustion engine 3002 over a time duration (x-axis) as discussed herein.

The fuel conservation system 1304 can transmit a second function to a combustion engine control unit for controlling combustion engine power output according to the directive power output of the combustion engine 3002 over the time duration. The second function can include the plurality of regions of increased 3008 combustion engine power output 3002 relative to the user-specified power output 3004 of an engine over the time duration and a plurality of regions of decreased 3010 combustion engine power output 3002 relative to the user-specified power output 3004 of the engine over the time duration.

In some embodiments, the fuels conservation system 1304 can transmit a third function to an electric motor control unit for controlling electric motor power output according to the directive power output of the electric motor 3006 over the time duration. The third function can include the plurality of regions of increased 3012 electric motor power output 3006 relative to the user-specified power output 3004 of the engine over the time duration and the plurality of regions of decreased 3014 electric motor power output 3006 relative to the user-specified power output 3004 of the engine over the time duration.

In some embodiments, the combustion engine power output 3002 is the illustrated sine wave. The electric motor power output 3006 can also be the illustrated sine wave. In some embodiments, the combustion engine power output 3002 and the electric motor power output 3006 can be any suitable combination of a sine wave, a cosine wave, a sawtooth wave, a step wave, and/or the like.

The plurality of regions of increased 3012 electric motor power output 3006 can be out-of-phase over the time duration with the plurality of regions of increased 3008 combustion engine power output 3002. The plurality of regions of decreased 3014 electric motor power output 3006 can be out-of-phase over the time duration with the plurality of regions of decreased 3010 combustion engine power output 3002. In some embodiments, the sine wave of the electric motor power output 3006 is out-of-phase with the sine wave of the combustion engine power output 3002 by about π or about 180 degrees. In some embodiments, the third function of the electric motor power output 3006 is out-of-phase with the second function of the combustion engine power output 3002 by about 30, about 60, about 90, about 120, about 160, about 190, about 220, about 250, about 280, about 300, or about 330 degrees, including ranges bordering and ranges in between the foregoing values, such that the oscillations of the directive power output of the combustion engine 3002 are dampened and are substantially imperceptible to the driver by reducing changes in momentum of the vehicle 1302 as described herein.

Although the description above contains many specificities, these should not be construed as limiting the scope of the inventions but as merely providing illustrations of some of the presently preferred embodiments. Therefore, it will be appreciated that the scope of the present inventions fully encompasses other embodiments which may become obvious to those skilled in the art, and that the scope of the present inventions are accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the inventions, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

Conditional language, such as, among others, "may," "could," "might," or "may," unless specifically stated otherwise, or otherwise understood within the context as used, is generally intended to convey that certain embodiments include while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or steps are included or are to be performed in any particular embodiment.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the following disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" or "one of the A, B, or C," etc. is used, in general such a construction is intended in the sense one having skill in the art would understand the convention (e.g., "a system having at least one of A, B, and C (or one of the A, B, or C)" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

It is understood that any specific order or hierarchy or steps in the processes disclosed herein are merely exemplary illustrations and approaches. Based upon design preferences, it is understood that any specific order or hierarchy of steps in the process may be re-arranged. Some of the steps may be performed simultaneously.

The previous description is provided to enable persons of ordinary skill in the art to practice the various aspects described herein. Various modifications to these aspects will be readily apparent to those skilled in the art, and the general principles defined herein may be applied to other aspects. Thus, the claims are not intended to be limited to the aspects shown herein, but are to be accorded the full scope consistent with the claim language. Headings and subheadings, if any, are used for convenience only and do not limit the inventions. All structural and functional equivalents to the elements of the various aspects described throughout the disclosure that are known or later come to be known to those of ordinary skill in the art are intended to be encompassed by the inventions.

What is claimed is:

1. A fuel efficiency engine control system for a vehicle, the system comprising:
    an input module configured to access from an accelerator pedal position sensor a first function corresponding to a user-specified power output of an engine of the vehicle over a time duration;
    a global positioning system module configured to determine a geographic location of the vehicle; and
    an engine power control module in communication with the input module, the global positioning system module, and an engine control unit, the engine power control module configured to transmit a second function corresponding to a directive power output of the engine over the time duration to the engine control unit for controlling engine power output according to the directive power output of the engine over the time duration;
    wherein the second function corresponds to an oscillating directive power output of the engine over the time duration based on the global positioning system module detecting a first geographic location of the vehicle, the second function including a plurality of regions of equal or increased engine power output relative to the user-specified power output of the engine over the time duration and a plurality of regions of decreased engine power output relative to the user-specified power output of the engine over the time duration;
    wherein the second function corresponds to the user-specified power output of the engine over the time duration based on the global positioning system detecting a second geographic location of the vehicle;
    wherein the engine remains engaged during the plurality of regions of decreased engine power output when the engine outputs power according to the directive power output of the engine over the time duration; and
    wherein the fuel efficiency engine control system includes an electronic memory configured to store modules and a computer processor configured to execute the modules.

2. The system of claim 1, wherein the first geographic location of the vehicle comprises a highway.

3. The system of claim 1, wherein the second geographic location of the vehicle comprises a city road.

4. The system of claim 1, wherein the second function corresponds to the user-specified power output of the engine over the time duration based on the global positioning system module detecting the first geographic location of the vehicle and the engine power control module detecting a congested driving pattern.

5. The system of claim 1, wherein the global positioning system module is configured to receive real-time traffic information, and wherein the second function corresponds to the user-specified power output of the engine over the time duration based on the global positioning system module detecting the first geographic location of the vehicle and detecting a congested road based on the real-time traffic information.

6. The system of claim 1, wherein the first geographic location of the vehicle comprises a road being traveled on by the vehicle with an incline gradient less than or equal to a first predetermined gradient angle, and wherein the second geographic location of the vehicle comprises a road being traveled on by the vehicle with an incline gradient greater than the first predetermined gradient angle.

7. The system of claim 1, wherein the first geographic location of the vehicle comprises a road being traveled on by the vehicle with a decline gradient less than or equal to a second predetermined gradient angle, and wherein the second geographic location of the vehicle comprises a road being traveled on by the vehicle with a decline gradient greater than the second predetermined gradient angle.

8. The system of claim 1, wherein the global positioning system module includes a topographical database and wherein the global positioning system module is configured to detect an upcoming gradient of a road being traveled on by the vehicle;
wherein the first geographic location of the vehicle comprises the upcoming gradient of the road being at least one of an incline gradient of less than or equal to a first predetermined gradient angle or a decline gradient of less than or equal to a second predetermined gradient angle;
and wherein the second geographic location of the vehicle comprises the upcoming gradient of the road being at least one of an incline gradient greater than the first predetermined gradient angle or a decline gradient greater than the second predetermined gradient angle, and further comprises a geographic location of a start point of the upcoming gradient being less than a predetermined distance from the geographic location of the vehicle.

9. The system of claim 1, wherein the global positioning system module is configured to store gradient information of a road being traveled on by the vehicle based on the geographic location and wherein the global positioning system module is configured to determine between the first geographic location of the vehicle and the second geographic location of the vehicle based on the stored gradient information and the geographic location of the vehicle.

10. The system of claim 1, wherein software stored on the electronic memory of fuel efficiency engine control system can be updated.

11. A fuel efficiency engine control system for a vehicle, the system comprising:
an input module of an engine control unit in communication with an engine of the vehicle, the input module configured to access from an accelerator pedal position sensor a first function corresponding to a user-specified power output of the engine of the vehicle over a time duration;
an object sensor module of the engine control unit, the object sensor module configured to determine at least one of a position or a change in position of a nearby object relative to the vehicle; and
an engine power control module of the engine control unit, the engine power control module in communication with the input module and the object sensor module, the engine power control module configured to transmit a second function corresponding to a directive power output of the engine over the time duration to the engine for controlling engine power output according to the directive power output of the engine over the time duration;
wherein the second function corresponds to an oscillating directive power output of the engine over the time duration based on the object sensor module detecting at least one of a first position or a first change in position relative to the vehicle, the second function including a plurality of regions of equal or increased engine power output relative to the user-specified power output of the engine over the time duration and a plurality of regions of decreased engine power output relative to the user-specified power output of the engine over the time duration;
wherein the second function corresponds to the user-specified power output of the engine over the time duration based on the object sensor module detecting at least one of a second position relative to the vehicle or a second change in position relative to the vehicle;
wherein the engine remains engaged during the plurality of regions of decreased engine power output; and
wherein the fuel efficiency engine control system includes an electronic memory configured to store modules and a computer processor configured to execute the modules.

12. The system of claim 11, wherein the object sensor module is in communication with vehicle sensors configured to detect the at least one of the position or the change in position of the nearby object relative to the vehicle.

13. The system of claim 12, wherein the vehicle sensors comprise at least one of a radar, a LIDAR, or a camera.

14. The system of claim 11, wherein the first position of the nearby object comprises a distance greater than or equal to a predetermined distance from the vehicle, and wherein the second position of the nearby object comprises a distance less than about X the predetermined distance from the vehicle.

15. The system of claim 11, wherein the first change in position of the nearby object comprises a change in position less than or equal to a predetermined change in position relative the vehicle, and wherein the second change in position of the nearby object comprises a change in position greater than the predetermined change in position relative the vehicle.

16. A fuel efficiency engine control system for a vehicle, the system comprising:
an input module of an engine control unit in communication with an engine of the vehicle, the input module configured to access from an accelerator pedal position sensor a first function corresponding to a user-specified power output of the engine of the vehicle over a time duration; and
a motor power control module of the engine control unit, the motor power control module in communication with the input module and an electric motor control unit, the motor power control module configured to transmit a second function corresponding to a directive power output of the combustion engine over the time duration to the combustion engine control unit for controlling combustion engine power output according to the directive power output of the engine over the time duration and configured to transmit a third function corresponding to a directive power output of an electric motor of the vehicle over the time duration to the electric motor control unit for controlling electric motor power output according to the directive power of the electric motor over the time duration;

wherein the second function includes a plurality of regions of equal or increased combustion engine power output relative to the user-specified power output of the engine over the time duration and a plurality of regions of decreased combustion engine power output relative to the user-specified power output of the engine over the time duration;

wherein the third function includes a plurality of regions of equal or increased electric motor power output relative to the user-specified power output of the engine over the time duration and a plurality of regions of decreased electric motor power output relative to the user-specified power output of the engine over the time duration;

wherein the plurality of regions of equal or increased electric motor power output relative to the user-specified power output of the engine over the time duration are configured to compensate for the plurality of regions of decreased combustion engine power output relative to the user-specified power output of the engine over the time duration to dampen oscillations of the directive power output of the combustion engine over the time duration;

wherein the engine is engaged during the plurality of regions of decreased combustion engine power output; and wherein the fuel efficiency engine control system includes an electronic memory configured to store modules and a computer processor configured to execute the modules.

17. The system of claim 16, wherein the plurality of regions of equal or increased electric motor power output are out-of-phase over the time duration with the plurality of regions of equal or increased combustion engine power output, and the plurality of regions of decreased electric motor power output are out-of-phase over the time duration with the plurality of regions of decreased combustion engine power output.

18. The system of claim 16, wherein the plurality of regions of equal or increased combustion engine power output and the plurality of regions of decreased combustion engine power output are a sine wave.

19. The system of claim 16, wherein the plurality of regions of equal or increased electric motor power output and the plurality of regions of decreased electric motor power output are a sine wave.

20. The system of claim 16, wherein the directive power output of the engine and the directive power output of the electrical motor are imperceptible to a driver.

* * * * *